US006937667B1

United States Patent

(12) United States Patent
Fullerton et al.
(10) Patent No.: US 6,937,667 B1
(45) Date of Patent: Aug. 30, 2005

(54) APPARATUS, SYSTEM AND METHOD FOR FLIP MODULATION IN AN IMPULSE RADIO COMMUNICATIONS SYSTEM

(75) Inventors: Larry W. Fullerton, Brownsboro, AL (US); James L. Richards, Fayetteville, TN (US); Ivan A. Cowie, Madison, AL (US); David M. Dickson, Huntsville, AL (US); Vernon R. Brethour, Owens Cross Roads, AL (US); Preston Jett, Huntsville, AL (US)

(73) Assignee: Time Domain Corporation, Huntsville, AL (US)

(*) Notice: Subject to any disclaimer, the term of this patent is extended or adjusted under 35 U.S.C. 154(b) by 0 days.

(21) Appl. No.: 09/537,692

(22) Filed: Mar. 29, 2000

(51) Int. Cl.[7] .............................. H04B 1/02; H04B 1/04

(52) U.S. Cl. ......................... 375/295; 455/91; 455/102; 455/42; 375/256; 375/261; 375/298

(58) Field of Search ............................ 455/42, 91, 102, 455/110, 111, 119, 550.1, 46, 69, 113; 375/256, 260, 261, 295, 298, 219

(56) References Cited

U.S. PATENT DOCUMENTS

| | | | | |
|---|---|---|---|---|
| 3,818,378 A | | 6/1974 | Phillips | 332/23 |
| 4,641,317 A | | 2/1987 | Fullerton | 375/1 |
| 4,743,906 A | | 5/1988 | Fullerton | 342/27 |
| 4,813,057 A | | 3/1989 | Fullerton | 375/37 |
| 4,979,186 A | | 12/1990 | Fullerton | 375/23 |
| 5,363,108 A | | 11/1994 | Fullerton | 342/27 |
| 5,523,758 A | | 6/1996 | Harmuth | 342/22 |
| 5,677,927 A | * | 10/1997 | Fullerton et al. | 375/130 |
| 5,687,169 A | * | 11/1997 | Fullerton | 370/324 |
| 5,832,035 A | | 11/1998 | Fullerton | 375/210 |
| 6,111,536 A | | 8/2000 | Richards et al. | 342/125 |
| 6,351,652 B1 | * | 2/2002 | Finn et al. | 455/552.1 |
| 6,539,213 B1 | * | 3/2003 | Richards et al. | 455/226.3 |
| 6,700,939 B1 | * | 3/2004 | McCorkle et al. | 375/295 |
| 2003/0053554 A1 | | 3/2003 | McCrokle et al. | |

OTHER PUBLICATIONS

Scholtz, R.A., "Multiple Access with Time–Hopping Impulse Modulation," *Invited Paper. IEEE MILCOM '93*, Boston, MA., Oct. 11–14, 1993, as printed from http://www.tinme–domain.com/pulson/milcom–/scholtz.html, 10 pages.

(Continued)

*Primary Examiner*—Simon Nguyen
(74) *Attorney, Agent, or Firm*—Venable LLP; Robert Babayi

(57) ABSTRACT

Apparatuses, systems and methods for transmitting and receiving modulated impulse radio signals. An impulse radio receiver includes a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

80 Claims, 34 Drawing Sheets

OTHER PUBLICATIONS

Ramirez–Mireles, Fernando and Scholtz, Robert A. "Multiple–Access with Time Hopping and Block Waveform PPM Modulation", *IEEE Conference*, Jun. 7, 1998, pp. 775–779.

Withington, P. et al., "Preliminary Results of an Ultra–Wideband (Impulse) Scanning Receiver", *IEEE Military Communications Conference Proceedings*, Oct. 31, 1999, pp. 1186–1190.

International Search Report issued Jan. 29, 2002 for Appln. No. PCT/US01/09948, 8 pages.

Pulse and Waveform Generation with Step Recovery Diodes, Application Note 918, Hewlett Packard, pp. 1 and 2. Date Unknown.

Selection of SRD and A–Mode Multiplier Diodes, Alpha Industries, pp. 8–28 and 8–29. Date Unknown.

* cited by examiner

APPARATUS, SYSTEM AND METHOD FOR FLIP MODULATION IN AN IMPULSE RADIO COMMUNICATIONS SYSTEM

BACKGROUND OF THE INVENTION

1. Field of the Invention

The present invention relates generally to apparatus, systems and methods for wireless communication. More particularly, the present invention relates to apparatuses, systems and methods for modulation in an impulse radio communication system. The present invention also relates to apparatuses, systems and methods for transmitting and receiving modulated impulse radio signals.

2. Related Art

The radio transmission of both analog and digital communications intelligence has normally been effected by one of two methods. In one, referred to as an amplitude modulation, a continuous sinusoidal radio frequency carrier is modulated in amplitude according to an intelligence or communications signal. When the amplitude modulated signal is received at a receiving location, the reverse process (that is, demodulation of the carrier) is effected to recover the intelligence. The other method employs what is termed frequency modulation. In frequency modulation, instead of amplitude modulation of the carrier signal, the carrier signal is frequency modulated according to the intelligence. When a frequency modulated signal is received, circuitry is employed which performs what is termed discrimination wherein changes in frequency are changed to changes in amplitude in accordance with the original modulation, and thereby a communications signal is recovered. In both systems a continuous sinusoidal carrier is assigned to and occupies a distinctive frequency band width, or channel. In turn, this channel occupies spectrum space which, if interference is to be avoided, cannot be utilized by other transmissions.

Today almost every nook and cranny of spectrum space (also referred to as the frequency spectrum) is being utilized. According, there is a tremendous need for some method of expanding the availability of medium for communications. In consideration of this, new methods and systems of communications have been developed that employ a wider frequency spectrum, rather than discrete frequency channels, for radio communications links. More specifically, new methods and systems of communications have been developed that utilize wide band or ultra wide band (UWB) technology, which is also called impulse radio communications.

Impulse radio communications was first fully described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents include U.S. Pat. Nos. 5,677,927 (issued Oct. 14, 1997), 5,687,169 (issued Nov. 11, 1997) and 5,832,035 (issued Nov. 3, 1998) to Fullerton et al. Each of these patent documents are incorporated herein by reference.

Basic impulse radio transmitters emit short pulses approaching a Gaussian monocycle with tightly controlled pulse-to-pulse intervals. Impulse radio systems typically use pulse position modulation (also referred to as digital time shift modulation), which is a form of time modulation where the value of each instantaneous sample of a modulating signal is caused to modulate the position of a pulse in time.

More specifically, in pulse position modulation, the pulse-to-pulse interval is typically varied on a pulse-by-pulse basis by two components: a pseudo-random code component and an information component. That is, when coding is used each pulse is shifted by a coding amount, and information modulation is accomplished by shifting the coded time position by an additional amount (that is, in addition to PN code dither) in response to an information signal. This additional amount (that is, the information modulation dither) is typically very small relative to the PN code shift. For example, in a 10 mega pulse per second (Mpps) system with a center frequency of 2 GHz, the PN code may command pulse position variations over a rang of 100 nsec; whereas, the information modulation may only deviate the pulse position by 150 ps (which is typically less then the wavelength of a pulse).

Although the above described information modulation scheme has proved effective for certain applications, there is a desire to create information modulation schemes that increase data throughput and/or decrease the probability of bit errors. Further, there is a desire to create modulation schemes that exploit the unique aspects of impulse radio communications.

SUMMARY OF THE INVENTION

The present invention relates to apparatuses, systems and methods for modulation in an impulse radio communications system. The present invention also relates to apparatuses, systems and methods for transmitting and receiving modulated impulse radio signals. According to an embodiment, the present invention is directed to transmitting and receiving flip modulated impulse radio signals in an impulse radio communications system. The present invention is also directed to transmitting and receiving flip with shift modulated (also referred to as quadrature flip time modulated (QFTM) impulse radio signals in an impulse radio communications system. Accordingly, the present invention can be used to create two, four, or more different data states.

According to an embodiment of the present invention, an impulse radio receiver includes a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

In an embodiment, the data detector produces the data signal based on the first correlator output signal and the second correlator output signal.

In an embodiment, the time base adjustor produces a time base adjustment signal based on the first correlator output signal and the second correlator output signal.

In an embodiment of the present invention, the received impulse radio signal consists of first pulses and second pulses that are the inverse (i.e., flip) of the first pulses. In another embodiment, the received impulse radio signal consists of first pulses, second pulses that are the inverse of the first pulses, delayed first pulses, and delayed second pulses that are the inverse of the delayed first pulses.

In an embodiment of the present invention, the data detector includes a data path signal selector/inverter and a maximum value selector. The data path signal selector/inverter receives the first correlator output signal and outputs a plurality of data state signals corresponding to a plurality of data states (e.g., bit or bits). The maximum value selector then determines which of plurality of data state signals is greatest and produces the data signal based on the determination.

In an embodiment of the present invention, the time based adjustor includes a lock path signal selector/inverter and an output selector. The lock path signal selector/inverter receives at least the second correlator output signal and outputs a plurality of timing adjustment related signals. The output selector receives the data signal and the plurality of timing adjustment related signals and determines which of the plurality of timing adjustment related signals should comprise the timing adjustment signal that is used to synchronize the time base with the received signal.

According to an embodiment of the present invention, an impulse radio transmitter includes a precision timing generator, a first pulser, a second pulser and a combiner. The precision timing generator produces a first enable signal and a second enable signal based on an information signal and a periodic timing signal. The first pulser produces, in response to the first enable signal, a first impulse radio signal consisting of a first type of impulse waveform. The second pulser produces, in response to the second enable signal, a second impulse radio signal consisting of a second type of impulse waveform. The second type of impulse waveform is substantially an inverse (i.e., flip) of the first type of impulse waveform. The combiner combines the first impulse radio signal and the second impulse radio signal to thereby produce a flip modulated impulse radio signal.

In an embodiment, the precision timing generator also produces a common trigger signal. In this embodiment the first pulser and the second pulser are adapted to receive the common trigger signal. The first pulser produces the first impulse radio signal in response to simultaneously receiving the common trigger signal and the first enable signal, and the second pulser produces the second impulse radio signal in response to simultaneously receiving the common trigger signal and the second enable signal.

In an embodiment, the precision timing generator produces, based on the information signal and the periodic signal, a first enable signal, a delayed first enable signal, a second enable signal, and a delayed enable signal. In this embodiment, the first pulser produces a first impulse radio signal, in response to the first enable signal, and a delayed first impulse radio signal, in response to the delayed first enable signal. The first impulse radio signal and the delayed first impulse radio signal consist of a first type of impulse waveform. The second pulser produces a second impulse radio signal, in response to the second enable signal, and a delayed second impulse radio signal, in response to the delayed second enable signal. The second impulse radio signal and the delayed second impulse radio signal consist of a second type of impulse waveform. The second type of impulse waveform is substantially an inverse (i.e., flip) of the first type of impulse waveform. The combiner combines at least one of the first impulse radio signal and the delayed first impulse radio signal with at least one of the second impulse radio signal and the delayed second impulse radio signal, and thereby produces a flip modulated impulse radio signal.

Further features and advantages of the present invention, as well as the structure and operation of various embodiments of the present invention, are described in detail below with reference to the accompanying drawings.

BRIEF DESCRIPTION OF THE FIGURES

Within the accompanying drawings, the convention used to describe signal connections requires that a signal line end at a junction with another signal line to indicate a connection. Two signal lines that cross indicate no connection at the crossing. The present invention is described with reference to the accompanying drawings, wherein.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Table of Contents

Figure 1B:
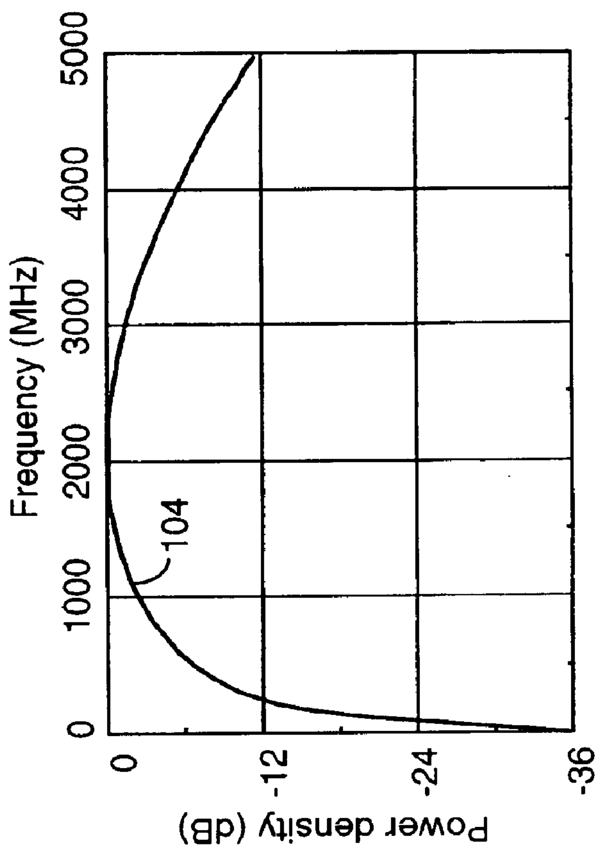
FIG. 1B illustrates the frequency domain amplitude of the Gaussian Monocycle of FIG. 1A.

| | |
|---|---|
| I. | Overview of the Invention |
| II. | Impulse Radio Basics |
| II.1. | Waveforms |
| II.2. | Pulse Trains |
| II.3. | Coding for Energy Smoothing and Channelization |
| II.4. | Modulation |
| II.5 | Reception and Demodulation |
| II.6. | Interference Resistance |
| II.7. | Processing Gain |
| II.8. | Capacity |
| II.9. | Multipath and Propagation |
| II.10. | Distance Measurement |
| II.11. | Exemplary Transmitter |
| II.12 | Exemplary Receiver |
| III. | Preferred Embodiments |
| III.1. | Flip Modulation |
| III.1.A. | Transmitter |
| III.1.A.i. | Pulsers |
| III.1.A.i.a. | Positive Polarity Pulsers |
| III.1.A.i.b. | Negative Polarity Pulsers |
| III.1.A.i.c. | Bi-Polar Polarity Pulsers |
| III.1.A.i.d. | On-Chip Bi-Polar Polarity Pulser |
| III.1.A.ii. | Alternative Transmitter |
| III.1.B. | Receiver |
| III.1.B.i. | Correlation Process |
| III.1.B.ii. | Data Path Signal Selector/Inverter |
| III.1.B.iii. | Max Value Selector |
| III.1.B.iv. | Illustrative Examples |
| III.1.B.v. | Lock Loop Function |
| III.1.B.v.a. | Lock Loop Correlation |
| III.1.B.v.b. | Lock Path Signal Selector/Inverter and Output Selector |
| III.1.B.v.c. | Alternative Embodiments |
| III.1.C. | Use of a Subcarrier |
| III.2. | Flip With Shift Modulation |
| III.2.A. | Transmitter |
| III.2.B. | Receiver |
| III.2.B.i. | Correlation Process |
| III.2.B.ii. | Data Path Signal Selector/Inverter |
| III.2.B.iii. | Max Value Selector |
| III.2.B.iv. | Lock Loop Function |
| III.2.B.iv.a. | Lock Loop Correlation |
| III.2.B.iv.b. | Lock Path Signal Selector/Inverter and Output Selector |
| III.2.B.iv.c. | Use of a Subcarrier |
| III.2.B.iv.d. | Variable Delay |
| III.2.B.iv.e. | Gain Controlled Lock Loop |
| IV. | Conclusion |

I. Overview of the Invention

The present invention relates to new types of modulation schemes for use in impulse radio communications systems. Additionally, the present invention relates to the transmitters and receivers that can be used to transmit and receive signals that have been modulated using these new types of modulation schemes.

In one embodiment, what shall be referred to as "flip modulation" is used. In "flip modulation" a first data state corresponds to a first impulse signal and a second data state corresponds to an inverse (i.e., flip) of the first impulse signal. In another embodiment, what shall be referred to as "flip with shift moudlation" or "quadrature flip time modulation" (QFTM) is used. In this embodiment, two additional data states are created. Of course the teachings of the present invention can be used to develop modulation schemes that include even more data states, while still being within the spirit and scope of the present invention.

The modulation schemes of the present invention provide for increased data speeds in impulse radio communications systems because they enable additional data states to be represented by a pulse or pulse train. Additionally, the modulation schemes of the present invention provide for increased signal to noise ratio and decreased bit error rates over conventional impulse radio modulation schemes.

The present invention builds upon existing impulse radio techniques. Accordingly, an overview of impulse radio basics is provided prior to a discussion of the specific embodiments of the present invention. This overview is useful for understanding the present invention.

II. Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggest, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts and electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is then used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

II.1. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst offtime attenuation. For system analysis purposes, it is convenient to model the desired waveform in an ideal sense to provide insight into the optimum behavior for detail design guidance. One such waveform model that has been useful is the Gaussian monocycle as shown in FIG 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1A:
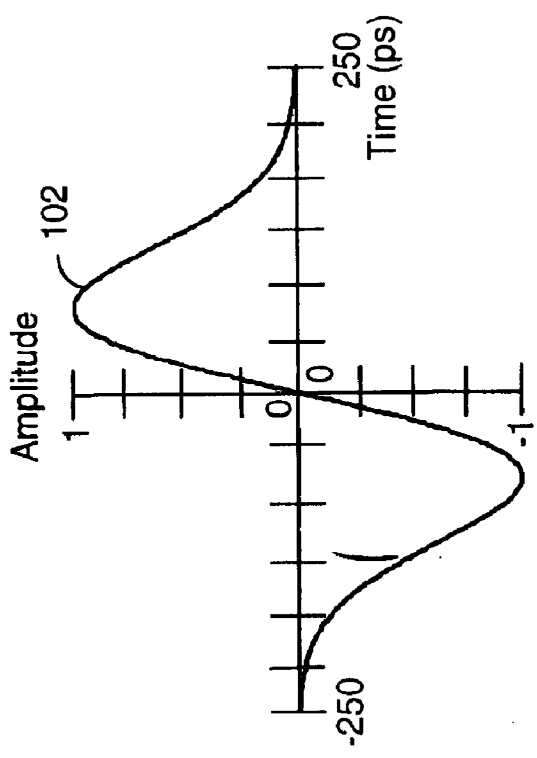
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

II.2 Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
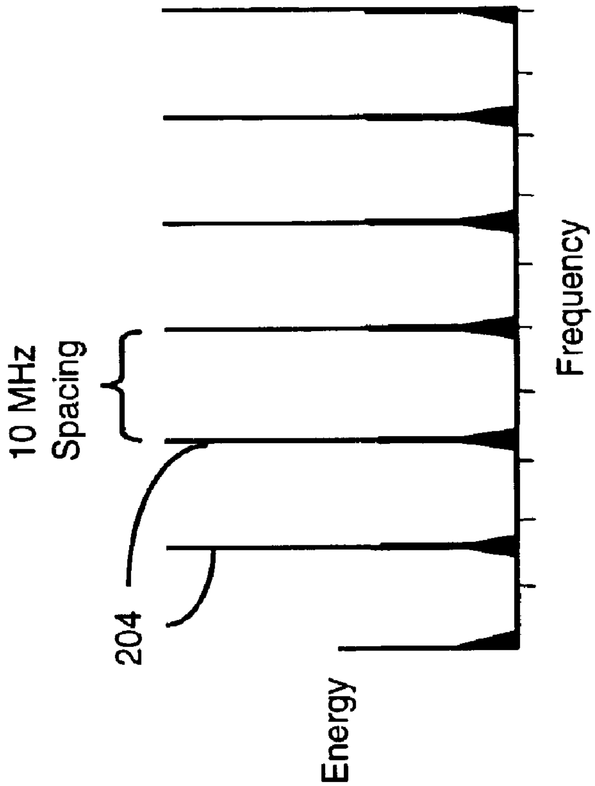
FIG. 2B illustrates the frequency domain amplitude of the waveform of FIG. 2A.
Figure 2A:
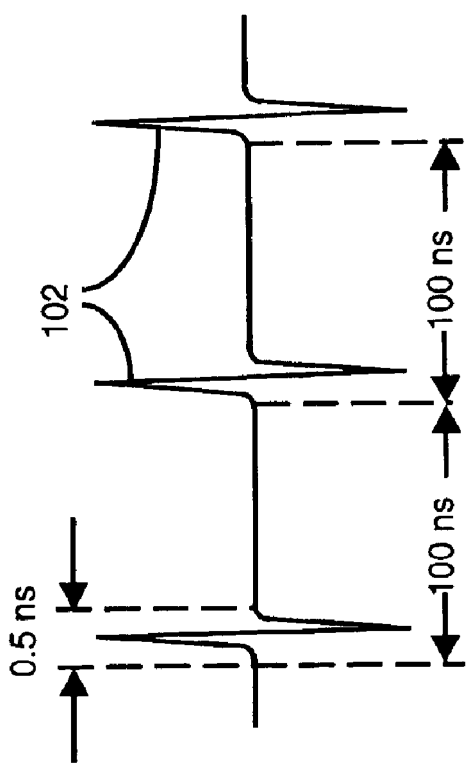
FIG. 2A illustrates a pulse train comprising pulses as in FIG. 1A.

Prototypes built by the inventors have pulse repetition frequencies including 0.7 and 10 megapulse per second (Mpps, where each megapulse is $10^6$ pulses). FIGS. 2A and 2B are illustrations of the output of a typical 10 Mpps system with uncoded, unmodulated, 0.5 nanosecond (nsec) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of comb lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5% based on a 0.5 nsec pulse in a 100 nsec interval.

II.3. Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
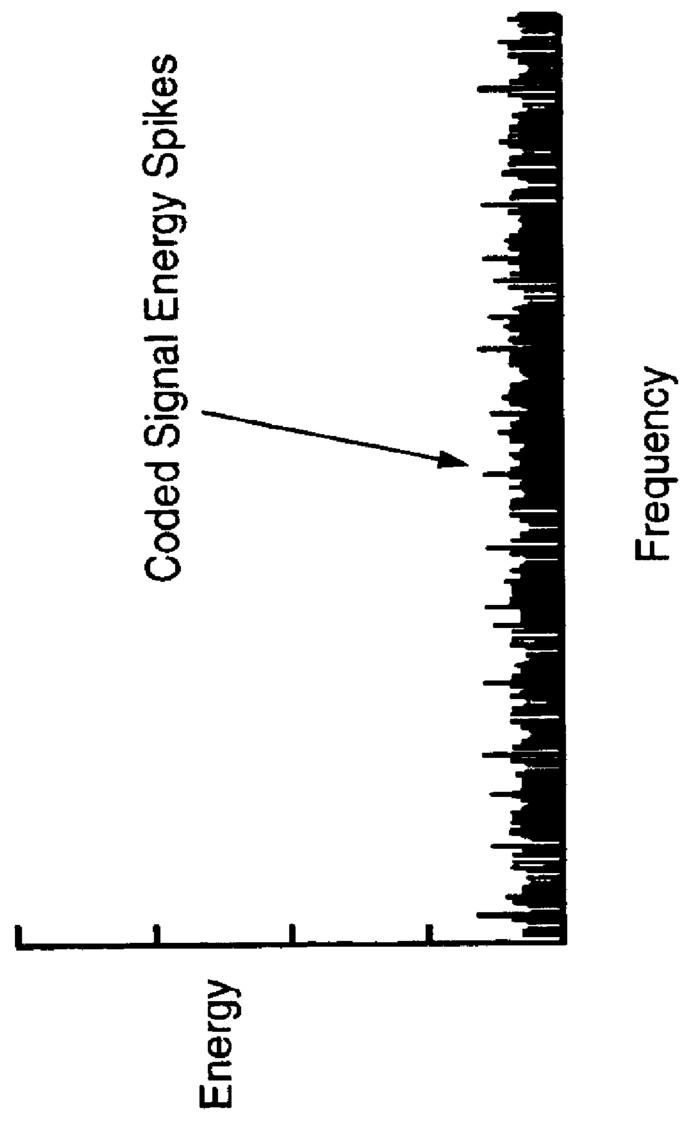
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

II.4. Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz, for example, the PN code may command pulse position variations over a range of 100 nsec; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

II.5. Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The pulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

II.6. Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
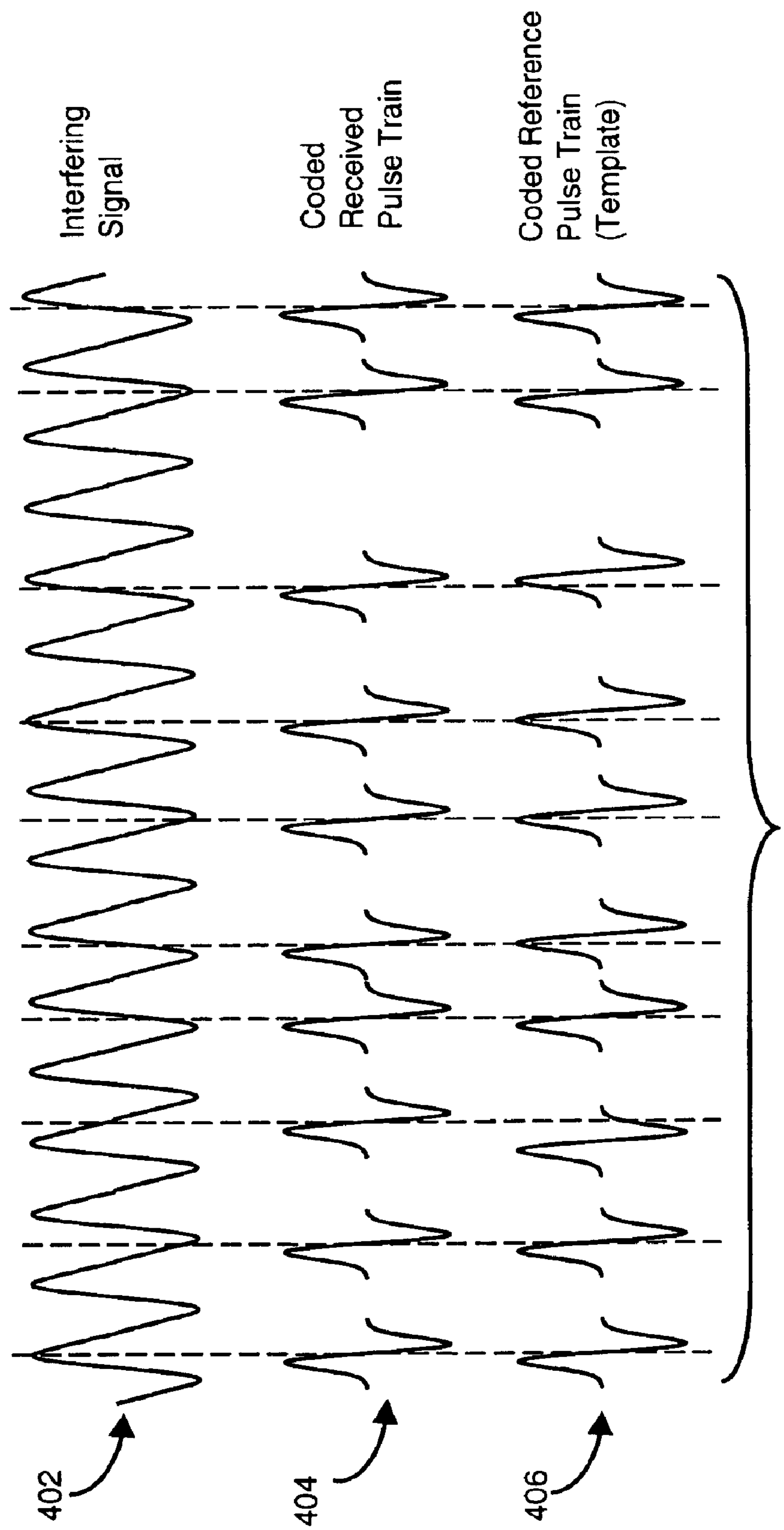
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

II.7. Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz channel bandwidth, the theoretical processing gain is 200,000 or 53 dB.

II.8. Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

where, $V^2_{tot}$ is the total interference signal to noise ratio variance, at the receiver, N is the number of interfering users, $\sigma^2$ is the signal to noise ratio variance resulting from one of the interfering signals with a single pulse cross correlation, and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

II.9. Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their relative phase. This result in possible summation or possible cancellation, depending on the specific propagation to a given location. This also results in potentially wild signal strength fluctuations in mobile applications, where the mix of multipath signals changes for every few feet of travel.

Figure 5A:
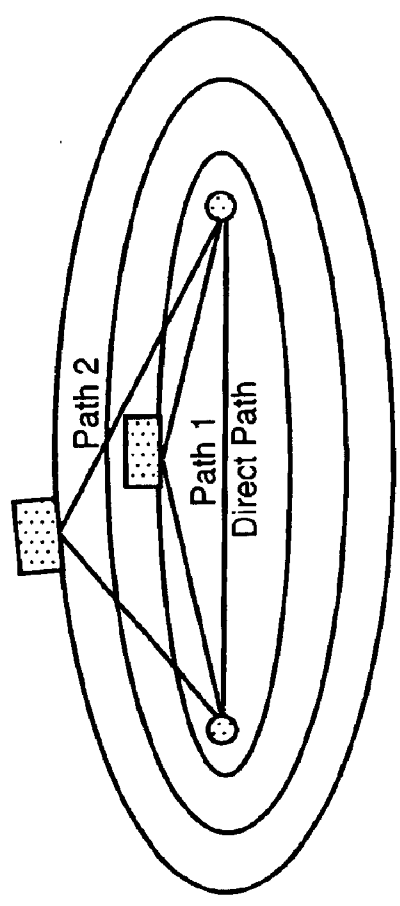
FIG. 5A illustrates a typical geometrical configuration giving rise to multipath received signals.

Impulse radios, however, are substantially resistant to these effects. Impulses arriving from delayed multipath reflections typically arrive outside of the correlation time and thus are ignored. This process is described in detail with reference to FIGS. 5A and 5B. In FIG. 5A, three propagation paths are shown. The direct path is the shortest. It represents the straight line distance between the transmitter and the receiver. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
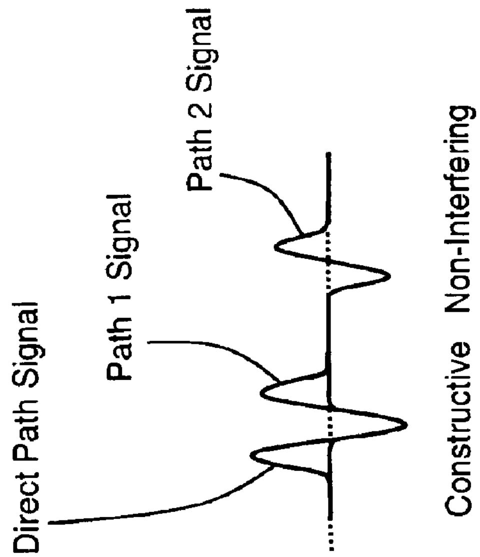
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect. The bulk of the multipath signals, which are substantially delayed, are removed from the correlation process and are ignored.

The multipath signals delayed less than one quarter wave (one quarter wave is about 1.5 inches, or 3.5 cm at 2 GHz center frequency) are the only signals that will attenuate the direct path signal. This is the reflection from the first Fresnel zone, and this property is shared with narrow band signals, however, impulse radio is highly resistant to all other Fresnel zone reflections. The ability to avoid the highly variable attenuation from multipath gives impulse radio significant performance advantages.

II.10. Distance Measurement

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by In phase and Quadrature Signals in a Radio System", both of which are incorporated herein by reference.

II.11. Exemplary Transmitter

Figures 6, 7:
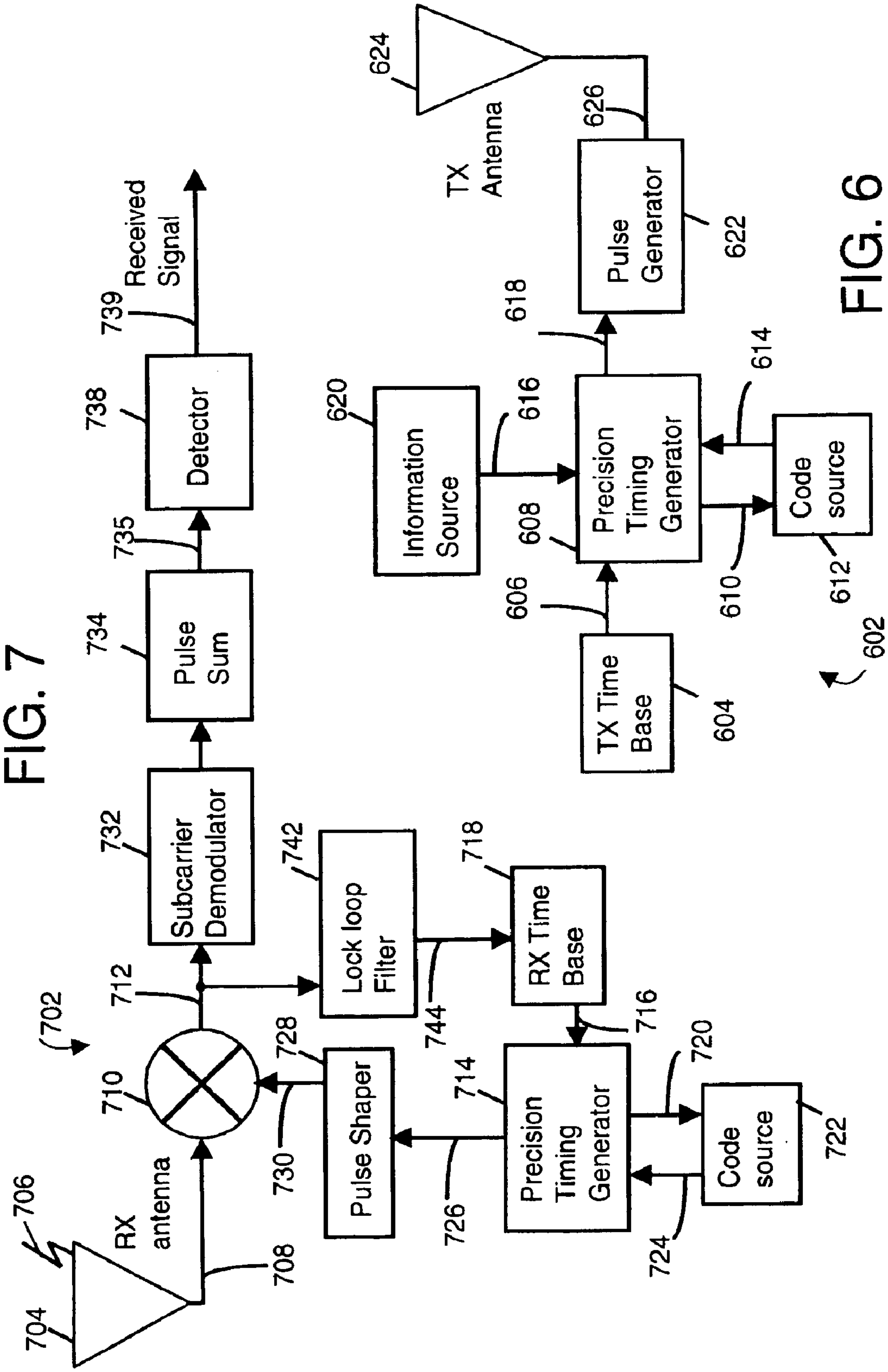
FIG. 6 is a functional diagram of an exemplary ultra wide band impulse radio transmitter.
FIG. 7 is a functional diagram of an exemplary ultra wide band impulse radio receiver.

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

II.12. Exemplary Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the receive signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier produce over the pulse interval. Further examples and details of correlation and sampling processes can be found in commonly owned U.S. Pat. Nos. 4,641,317, 4,743,906, 4,813,057, and 4,979,186, which are incorporated herein by reference, and commonly owned and copending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

III. Preferred Embodiments

III.1. Flip Modulation

As mentioned above, the present invention relates to new types of modulation schemes for use in impulse radio communications systems. In one embodiment, what shall be referred to as "flip modulation" is used. A simple example of flip modulation can be explained with reference to FIG. 8. In this example, an impulse waveform 802 is used to represent a binary "0" symbol, and an impulse waveform 804 is used to represent a binary "1 " symbol. Notice that the difference between waveform 802 and 804 is that waveform 804 is the inverse or flip of waveform 802. Throughout this specification, waveform 802 shall often be referred to as a non-inverted impulse or a negative impulse (since its waveform is negative then positive), and waveform 804 shall be referred to as an inverted impulse or a positive impulse (since is waveform is positive then negative).

In the time domain, waveform 802 is described mathematically by:

$$f_{mono}(t) = \sqrt{e}\left(\frac{t}{\sigma}\right)e^{\frac{-t^2}{2\sigma^2}};$$

and waveform 804 is described mathematically by:

$$f_{mono}(t) = -\sqrt{e}\left(\frac{t}{\sigma}\right)e^{\frac{-t^2}{2\sigma^2}}.$$

Where,

σ is a time sealing parameter, f is time, $f_{mono}(l)$ is the waveform voltage, and e is the natural logarithm base.

The frequency domain spectrum of the above waveforms is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2ps}$$

Impulses 802 and 804 are exemplary waveforms associated with transmitted signals (e.g., signals transmitted through the air from a transmitter to a receiver). Once impulses 802 and 804 are received by an antenna of a receiver, their waveforms typically resemble waveform 806 and waveform 808, respectively. More specifically, waveform 806 is approximately the first derivative of waveform 802, and waveform 808 is approximately the first derivative of waveform 804. This occurs due to the receive antenna response. Because waveform 806 resembles a "w", it shall be referred to as a "w-pulse" or a "triplet". Because waveform 808 resembles an inverted "w", it shall be referred to as an "inverted-w-pulse". In this example, the "w-pulse" (or a plurality of w-pulses) corresponds to a binary "0" and the "inverted-w-pulse" (or a plurality of inverted-w-pulses) corresponds to a binary "1". Notice that "inverted-w-pulse" 808 is the flip of "w-pulse" 806. It is noted that a receive antenna does not necessarily differentiate a received signal. Thus, if a receive antenna does not differentiate a received signal, then the pulse waveforms of a received signal should resemble the pulse waveforms of a transmitted signal.

As described above, impulse radio systems can deliver one or more data bits per pulse. However, impulse radio systems more typically use pulse trains, not single pulses, for each data bit. Thus, a train of pulses 802 (e.g., 100 pulses 802) can be used to represent a binary "0" and a train of inverted pulses 804 (e.g., 100 inverted pulses 804) can be used to represent a binary "1". Pulse trains are often used because of the additional benefits that can be obtained by using more than one pulse to represent one digital information bit. The received signal from the ensemble of pulses associated with each bit is combined in a process referred to as integration gain. The combination process is basically the summation of the received signal plus noise energy associated with each pulse over the number of pulses for each bit. The voltage signal-to-noise ratio improves roughly by the square root of the number of pulses summed. Proper summation requires that the timing be stable and accurate over the entire integration (summing) time.

III.1.A. Transmitter

Figure 9:
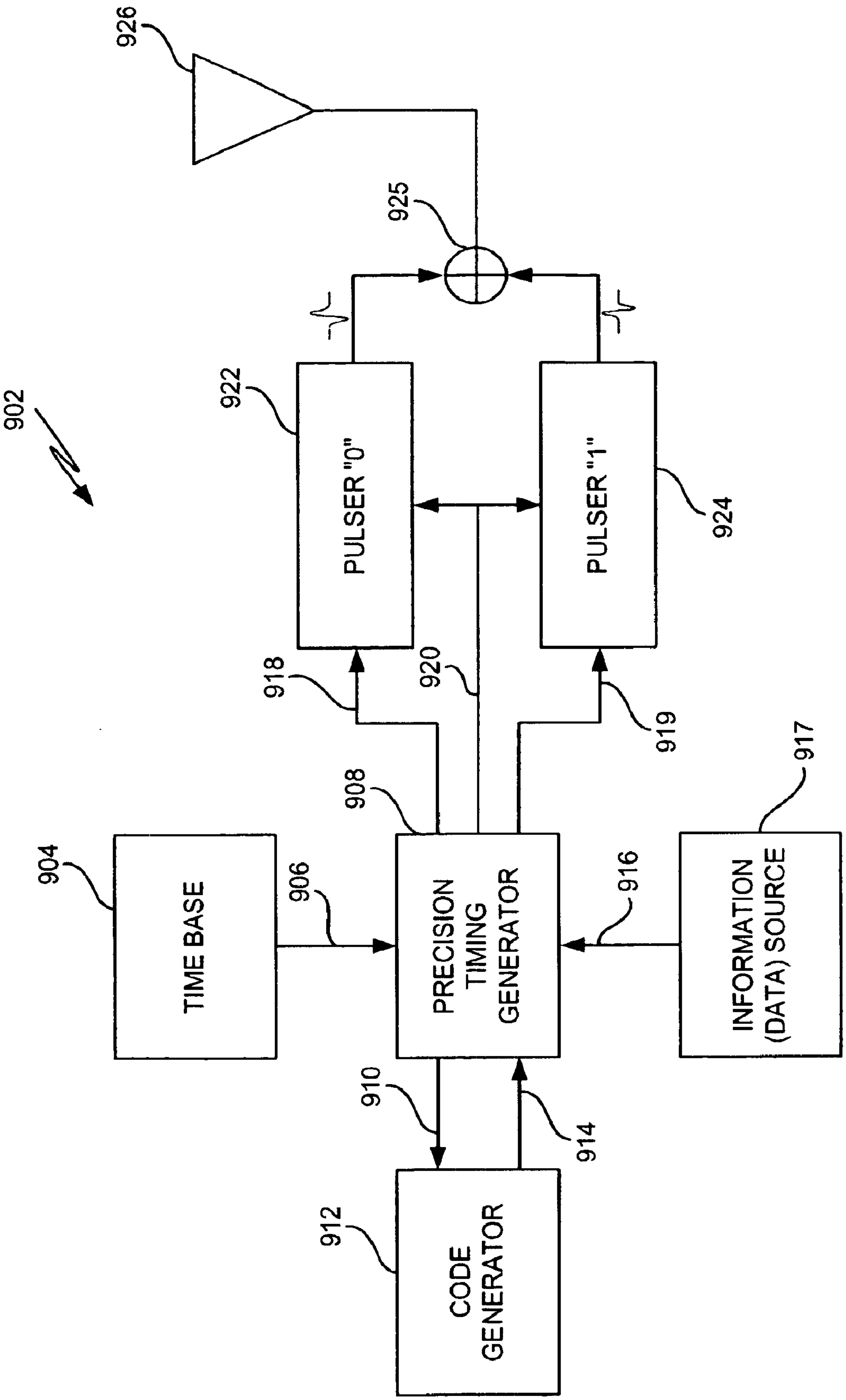
FIG. 9 is a functional diagram of an impulse radio transmitter according to an embodiment of the present invention.

FIG. 9 shows an exemplary embodiment of an impulse radio transmitter 902 used for transmitting flip modulated signals, according to present invention. Transmitter 902 comprises a time base 904 that generates a periodic timing signal 906. Time 904 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. Periodic timing signal 906 is supplied to a precision timing generator 908.

An information source 917 supplies an information signal 916 to precision timing generator 908. Information signal 916 can be any type of intelligence, including digital bits representing voice, data, imagery, or the like, analog signals, or complex signals.

Optional code generator 912 comprises a storage device such as a random access memory (RAM), read only memory (ROM), or the like, for storing suitable PN codes and for outputting the PN codes as a code signal 914. Alternatively, maximum length shift registers or other computational means can be used to generate the PN codes.

The precision timing generator 908 supplies synchronizing signal 910 to optional code generator 912 and utilizes the optional code source output 914 together with an internally generated subcarrier signal (which is also optional) and information signal 916 to generate modulated (and optionally coded) common trigger signal 920 and enable signals 918 and 919. Common trigger signal 920 is simultaneously provided to both a pulse generator 922 (also referred to as pulser 922, or first output state 922) and a pulse generator 924 (also referred to as pulser 924, or second output state 924). Enable signal 918 enables pulser 922 and enable signal 919 enables pulser 924. In one embodiment: pulse generator 922 generates an output pulse that resembles pulse 802 in response to receiving both trigger signal 920 and enable signal 918; and pulse generator 924 generates an output pulse that resembles pulse 804 (i.e., a pulse that is the inverse or flip of pulse 802) in response to receiving trigger signal 920 and enable signal 919.

Thus, to generate one type of impulse (e.g., pulse 802), precision timing generator 908 provides a common trigger signal 920 to pulsers 922 and 924 and an enable signal to pulser 922. To generate an inverted impulse (e.g., pulse 804), precision timing generator 908 provides common trigger signal 920 to pulsers 911 and 924 and an enable signal to pulser 924. In this embodiment, pulser 922 and pulser 924 should not receive an enable signal at the same time.

An advantage of using common trigger signal 920 and separate enable signals 918 and 919 is that only common trigger signal 920 needs to be critically timed. In contrast, enable signals 918 and 919 merely need to be issued (e.g., put HIGH) at some time prior to common trigger signal 920 (but, as stated above, pulser 922 should not receive enable signal 918 at the same time pulser 924 receives enable signal 919). However, it is noted that pulsers 922 and 924 can be designed such that they generate an impulse in response to only a trigger signal. That is, pulsers 922 and 924 can be designed such that enable signals are not necessary (or such that the enable inputs of pulsers 922 and 924 are always activated). In such an embodiment, enable signal 918 is replaced with a first trigger signal and enable signal 919 is replaced with a second trigger signal, and common trigger signal 920 is not needed. Pulser 922 would generate an output pulse in response to the first trigger signal and pulser 924 would generate an output pulse in response to the second trigger signal. In such an embodiment, both the first trigger signal and the second trigger signal must be critically timed.

Figure 18:
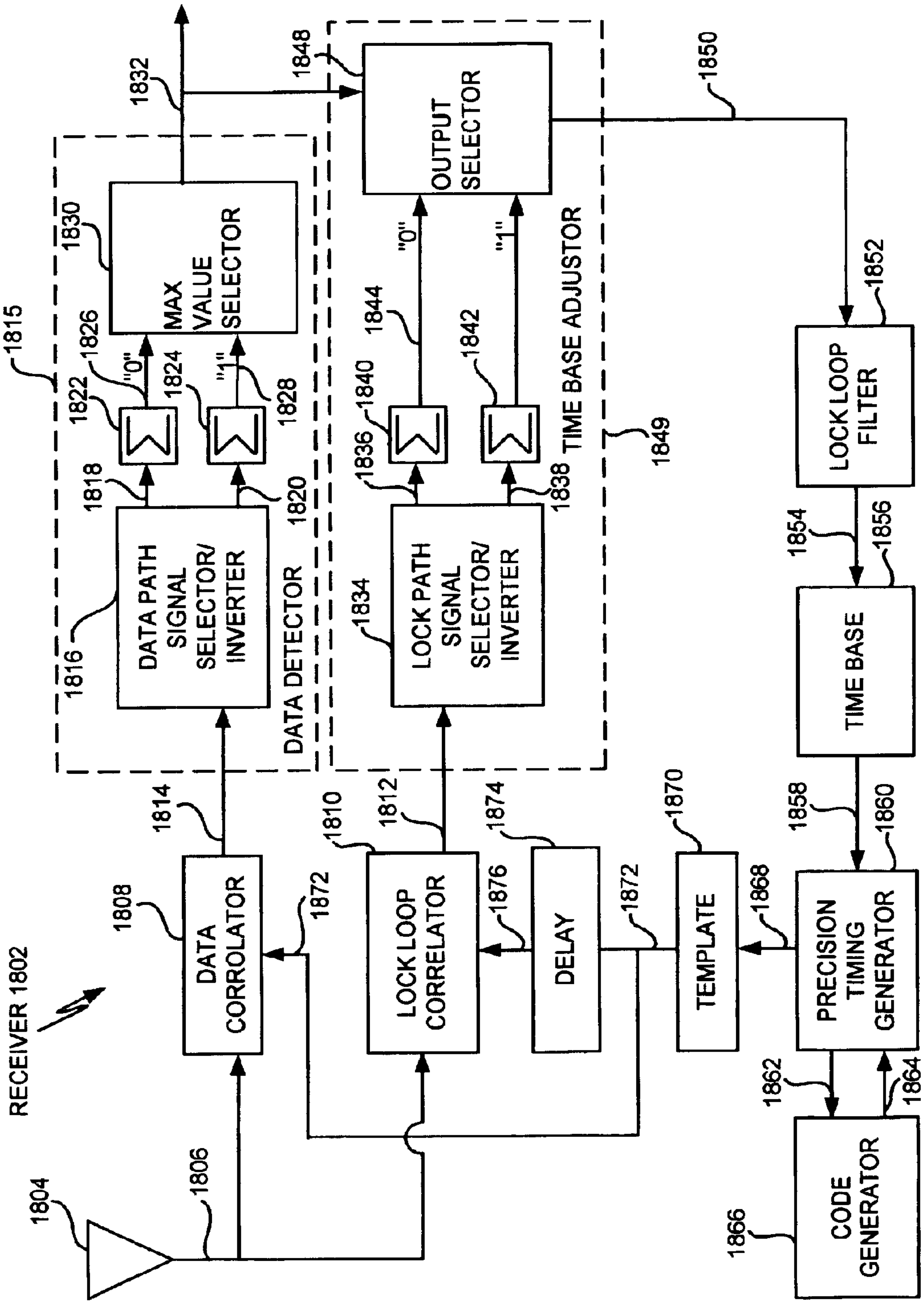
FIG. 18 is a functional diagram of an impulse radio receiver, according to an embodiment of the present invention.

In a radio frequency embodiment, the output pulses (of pulsers 922 and 924) are then combined by combiner 925 and provided to a transmit antenna 926 via a transmission line coupled thereto. Depending upon the implementation, the output pulses (of pulsers 922 and 924) driving transmit antenna 926 can be, for example, a rising or falling pulse edge, a monocycle, a doublet, or a triplet. Combiner 925 can be a simple resistor network or it can be a center tapped transformer network, each of which are described in more detail below. Combiner 925 can also be any other passive combining circuit known in the art, such as, but no limited to, a hybrid junction or a directional coupler. The output pulses are then converted into propagating electromagnetic pulses by the transmit antenna 926. The electromagnetic pulses are called the emitted signal, and propagate to an impulse radio receiver (e.g., receiver 1802, as shown in FIG. 18) through a propagation medium, such as air, in a radio frequency embodiment. In a preferred embodiment, the emitted signal is a wide-band or ultrawide-band signal consisting of pulses, each of which approaches a monocycle pulse (e.g., pulse 802 or pulse 804). As discussed above, in one example embodiment a first pulse (e.g., pulse 802) can be used for representing a binary "0", and a flipped or inverted pulse (e.g., pulse 804) can be used to represent a binary "1". Of course the impulses generated by transmitter 902 (e.g., impulses 802 and 804) can be used to represent other data states while still being within the spirit and scope of the present invention.

The teachings of the present invention can be combined with the vector modulation scheme disclosed in commonly owned and concurrently filed U.S. Patent Application Ser. No. 09/538,519, entitled "Vector Modulation System and Method for Wideband Impulse Radio Communications," and disclosed in U.S. Provisional Application No. 60/169, 765, filed Dec. 9, 1999, entitled, "System and Method for Impulse Radio Vector Modulation," each of which is incorporated herein by reference in its entirety. For example, in vector modulation, each pulse is modulated into one of a plurality of different time positions spanning a cycle of a pulse interval. Using the teachings of the present invention, each vector modulated (i.e., time positioned) pulse can be one of two types of pulses (i.e., a first type of pulse, and a second type of pulse that is substantially the inverse of the first type of pulse). In another example, each vector modulated pulse can be one of four types of pulses (i.e., a first type of pulse, a delayed first type of pulse, a second type of pulse that is substantially the inverse of the first type of pulse, and a delayed second type of pulse that is substantially the inverse of the delayed first type of pulse). The result is that additional data states, and thus faster data speeds, can be realized through such a combination of modulation schemes.

III.1A.i. Pulsers

As discussed above, pulsers 922 and 924 generate the non-inverted impulses (e.g., impulses 802) and the inverted impulses (e.g., impulses 804) used for the flip modulation scheme. Below is a discussion of additional details of various embodiments of pulsers 922 and 924. A discussion of Pulser 924 is provided first, followed by a discussion of pulser 922.

III.1A.i.a. Positive Polarity Pulser

Figure 10A:
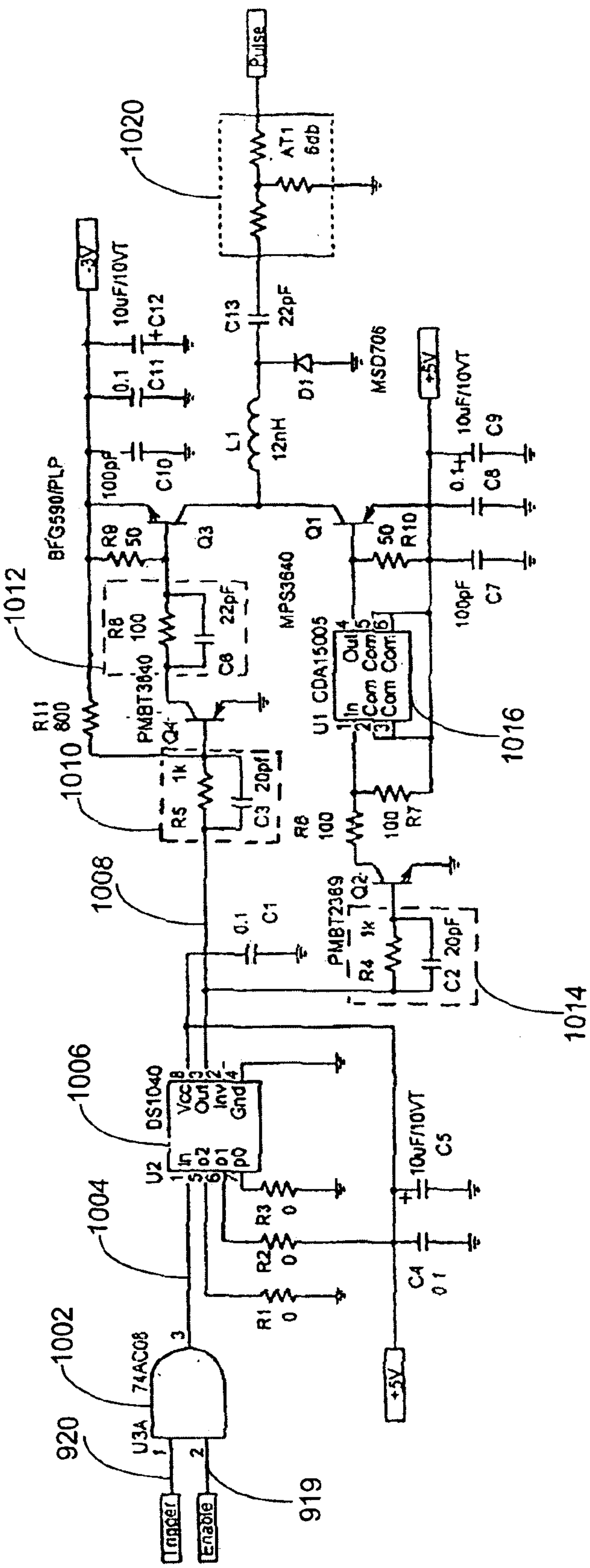
FIG. 10A is a circuit diagram of a pulser, for use in the transmitter of FIG. 9, that produces positive impulses according to an embodiment of the present invention.

FIG. 10A illustrates an exemplary embodiment of pulser 924 according to the present invention. Since pulser 924 produces an impulse with a voltage that goes positive then negative, it is also referred to as a positive polarity pulser that produces positive impulses (e.g., impulse 804).

As discussed above, pulser 924 should produce an output pulse (e.g., pulse 804) when it receives trigger signal 920 and enable signal 919. Accordingly, pulser 924 includes an AND gate 1002 that receives trigger signal 920 and enable signal 919. An output 1004 of AND gate 1002 goes HIGH when trigger 920 and enable 919 are both HIGH.

Since trigger signal 920 does not have sufficient pulse width stability or definition to drive the step recovery diode circuit used to produce the desired impulse, a one short multivibrator 1006 is used to produce a precise output pulse 1008. More specifically, in response to receiving a rising edge of signal 904, and shot multivibrator 1006 produces a pulse having the precise controlling pulse width necessary to drive the step recovery diode (discussed below) that is used to produce the desired impulse. Since one shot multivibrator 1006 is triggered by the rising edge of signal 1004, the variable width of signal 1004 does not affect its output. In a preferred embodiment, one shot multivibrator 1006 is a model DS1040-A15 integrated circuit that is manufactured by Dallas Semiconductor, Dallas, Tex., Pins p0, p1 and p2 are programming inputs that define the output pulse width. By connecting p0 and p2 to ground, and p1 to +5 Volts, when one shot multivibrator 1006 is triggered by signal 1004, it produces an output 1008 (also referred to as driving pulse 1008) that is a stable pulse having a width of 7.5 nsec.

Figure 14:
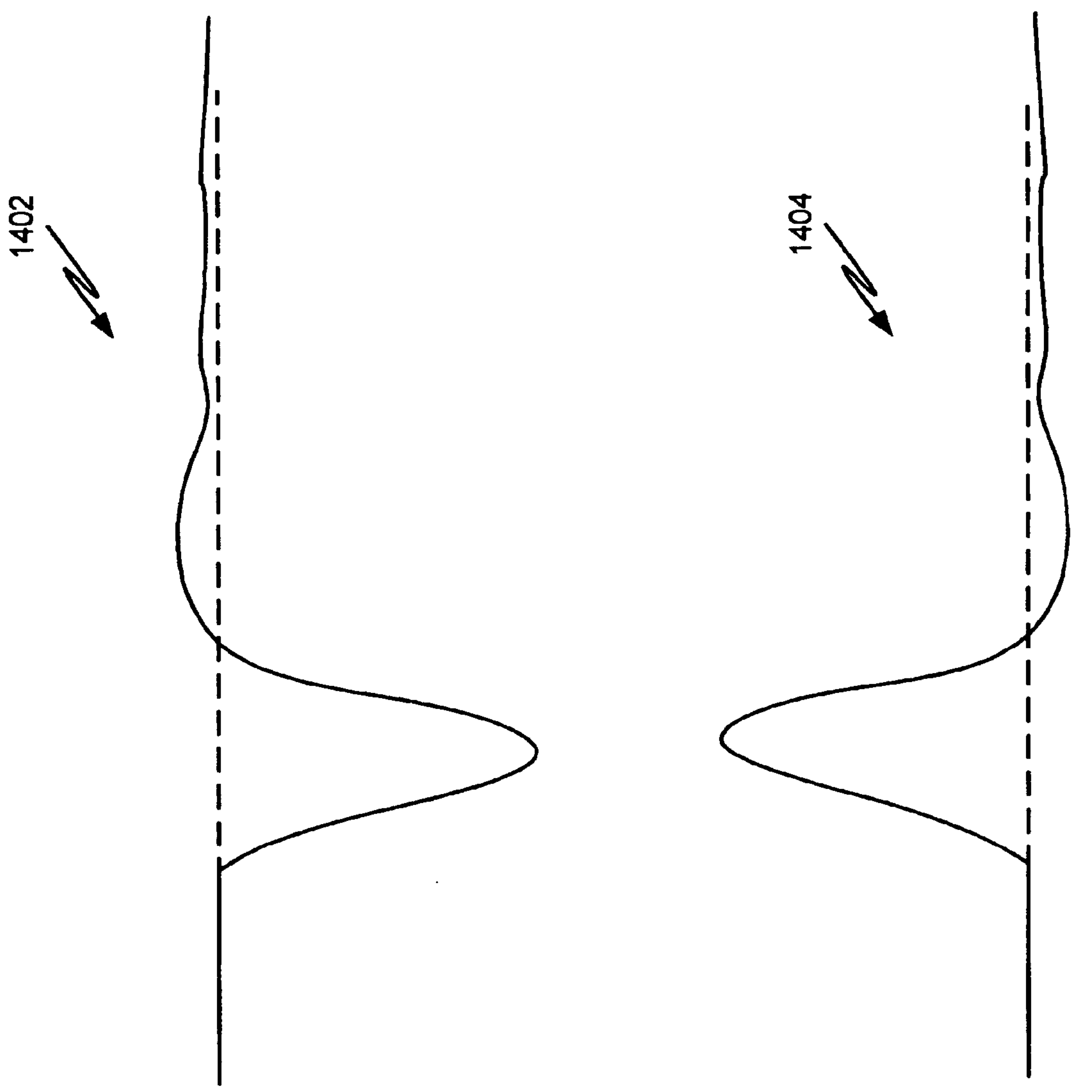
FIG. 14 illustrates the waveforms of likely impulses generated in an embodiment of the present invention.

The stable pulse 1008 drives through a resistor/capacitor (RC) speed-up network 1010 (consisting of R5 and C3) into transistor switch Q4 and through another RC speed-up network 1012 (consisting of R8 and C6) into biasing transistor switch Q3. This causes a forward bias interval for step recovery diode D1. More specifically, when one shot multivibrator 1006 is triggered (i.e., trigger signal 919 and enable signal 920 are HIGH), the stable pulse 1008 turns on transistor switch Q4, causing a base current to be provided to biasing transistor switch Q3, which pulls forward bias current through step recovery diode D1. Simultaneously, stable pulse 1008 is fed through a further RC speed up network 1014 (consisting of R4 and C2) into transistor Q2, which switches to ground, and puts a negative going input into a delay line 1016 that produces a desired delay. In a preferred embodiment, delay line 1016 is a model CDA 15005, manufactured by ELMEC Technology of American, that produces a 15 nsec delay. Thus, after a 15 nsec delay, a 7.5 nsec pulse 1018 is output from delay line 1016 causing transistor Q1 to turn on. At that point in time (i.e., after the 15 nsec delay), forward biasing transistor Q3 has already turned off. When transistor Q1 turns on it reverse biases step recovery diode D1 starting a charge extraction process which causes step recovery diode to create a positive step that is used to create the desired impulse waveform (i.e., pulse 804). Of course the impulse generated by pulser 924 can vary from the ideal pulse 804. For example, impulse 1404, shown in FIG. 14, shows a more likely impulse that may be generated using the above described circuit. Of course, the exact shape of the output pulse can vary without departing from the spirit and scope of the present invention.

In summary, forward bias switch Q3 and a reverse bias switch Q1 are properly timed such that step recovery diode D1 is first forward biased for a specific time interval, and then reversed biased, causing step recovery diode D1 to produce a positive step. Then, inductor L1, capacitor C13 and load 1020 form the desired shape of the impulse waveform. That is, it is the resonance of L1 with the diode reverse bias capacitance of D1 and the RC time constant of C13 and load 1020 that dictate the width and height of the impulse (i.e., pulse 804).

Figure 10B:
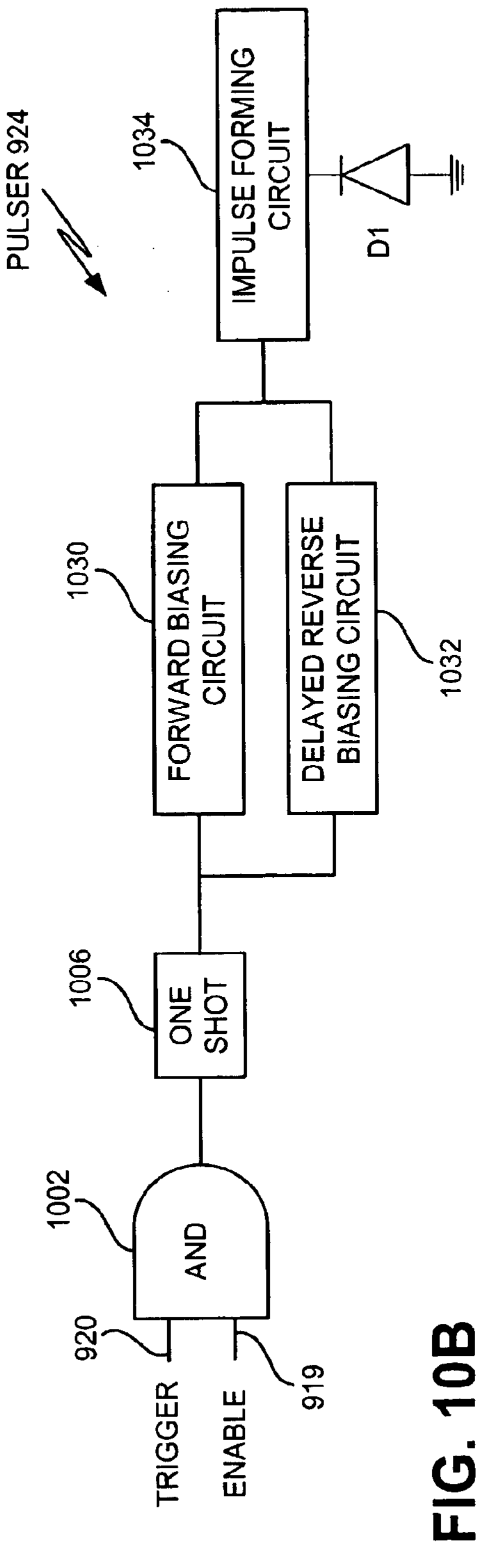
FIG. 10B is a functional diagram of a pulser, for use in the transmitter of FIG. 9, that produces positive impulses according to an embodiment of the present invention.

FIG. 10B shows a high level diagram of pulser 924. When trigger signal 920 and enable signal 919 are both HIGH, the output of AND gate 1002 is HIGH causing one shot 1006 to be triggered. When triggered, one shot 1006 outputs a stable pulse that is fed to a forward biasing circuit 1030 and a delayed reverse biasing circuit 1032. Forward biasing circuit 1030 forward biases step recovery diode D1 for a specific time interval, after which delayed reverse bias circuit 1032 reverse biases step recovery diode D1, causing step recovery diode D1 to produce a positive step in voltage. This positive step is fed to impulse forming network 1034, which controls the width and height of the generated positive impulse.

III.1A.i.b. Negative Polarity Pulser

Figure 11B:
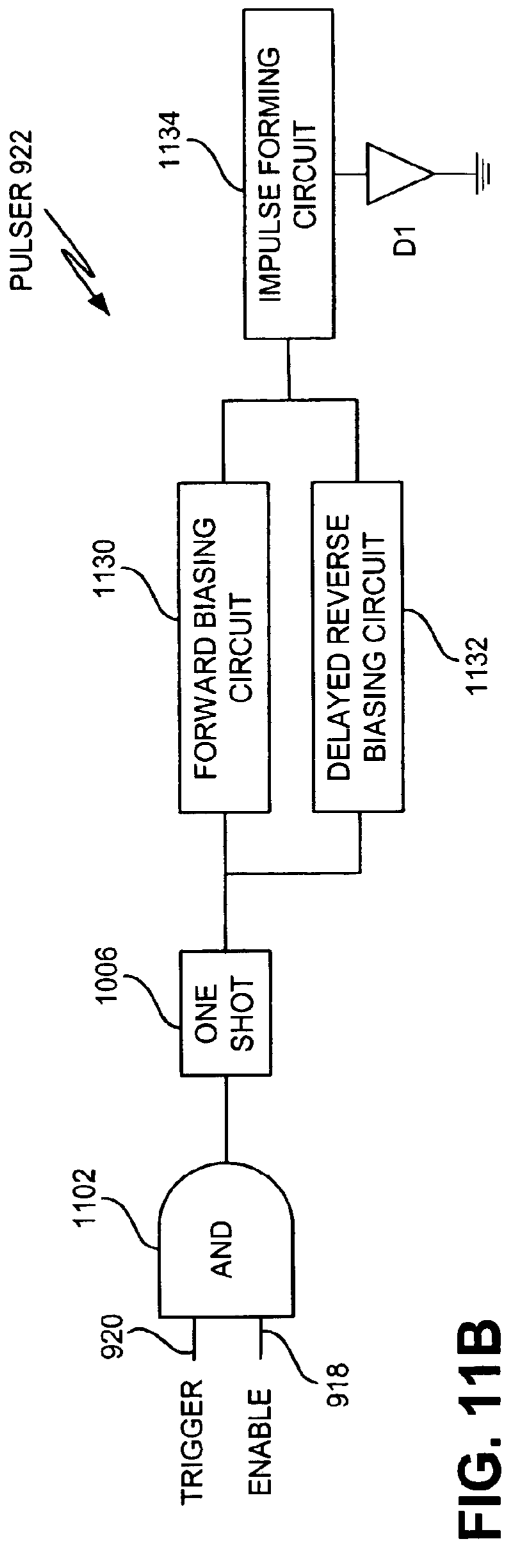
FIG. 11B is a functional diagram of a pulser, for use in the transmitter of FIG. 9, that produces negative impulses according to an embodiment of the present invention.
Figure 11A:
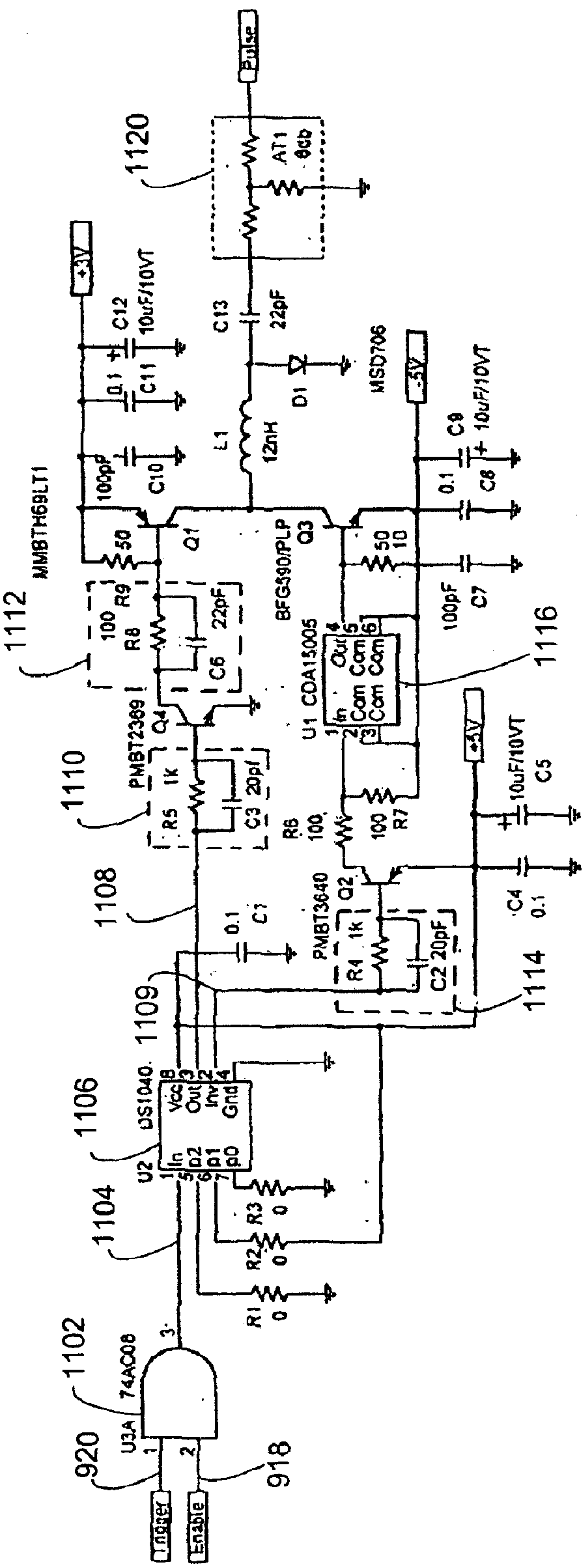
FIG. 11A is a circuit diagram of a pulser, for use in the transmitter of FIG. 9, that produces negative impulses according to an embodiment of the present invention.

FIG. 11A illustrates an exemplary embodiment of pulser 922 according to the present invention. Since pulser 922 produces an impulse with a voltage that goes negative then positive, it is also referred to as a negative polarity pulser that produces negative impulses (i.e., impulse 802).

As discussed above, pulser 922 should produce an output pulse (e.g., pulse 802) when it receives trigger signal 920 and enable signal 918. Accordingly, pulser 922 includes an AND gate 1102 that receives trigger signal 920 and enable signal 918. An output 1104 of AND gate 1102 goes HIGH when trigger 920 and enable 918 are HIGH.

Pulser 922 is similar to pulser 924 in that it uses a one shot multivibrator 1106 to produce a precise driving output pulse 1108 (e.g., that has a 7.5 nsec width). One of the differences between pulser 922 and pulser 924 is that the polarity of step recovery diode D1 is reversed, as shown in FIG. 11. Additionally, bias switching transistors Q1 and Q3 are inter-changed to reverse the direction of the forward and reverse bias currents.

The stable pulse 1108 drives through a resistor/capacitor (RC) speed-up network 1110 (consisting of R5 and C3) into transistor switch Q4 and through another RC speed-up network 1112 (consisting of R8 and C6) into biasing transistor switch Q1, which provides the forward bias interval for step recovery diode D1. When one shot multivibrator 1106 is triggered (i.e., trigger signal 918 and enable signal 920 are HIGH), stable pulse 1108 turns on transistor switch Q4, causing a base current to be provided to biasing transistor switch Q1, which pulls forward bias current through step recovery diode D1. Simultaneously, an inverted output 1109 of multivibrator 1106 is fed through a further RC speed up network 1114 ( consisting of R4 and C2) into transistor Q2, which switches to 0 volts, and puts a positive going input (e.g., from −5 Volt to 0 Volts) into delay line 1116. After the delay (e.g., 15 nsec) a stable pulse 1118 (e.g., a 7.5 nsec pulse) is output from delay line 1116 causing transistor Q3 to turn on. At this point in time, forward biasing transistor switch Q1 has already turned off. When reverse biasing transistor switch Q3 turns on it reverse biases step recovery diode D1 starting a charge extraction process, which causes step recovery diode to create a negative step that is used to create the desired impulse waveform (i.e., pulse 84).

In summary, forward bias switch Q1 and a reverse bias switch Q3 are properly timed such that step recovery diode D1 is first forward biased for a specific time interval, and then reversed biased, causing step recovery diode D1 to produce the a negative step that is used to generate the desired impulse waveform. Similar to pulser 924, inductor L1, capacitor C13, and load 1120, are used to form the desired width and amplitude of the impulse waveform. Of course the impulse generated by pulser 922 can vary from the ideal pulse 802 without departing from the spirit and scope of the invention. For example, impulse 1402, shown in FIG. 14, shows a more likely impulse that may be generated using the above described circuit.

FIG. 11B shows a high level diagram of pulser 922. When trigger signal 920 and enable signal 918 are both HIGH, the output of AND gate 1102 is HIGH causing one shot 1006 to be triggered. When triggered, one shot 1006 outputs a stable pulse that is fed to a forward biasing circuit 1130 and a delayed reverse biasing circuit 1132. Forward biasing circuit 1130 forward biases step recovery diode D1 (which is reversed as compared to D1 in FIG. 10B) for a specific time interval, after which reverse bias circuit 1132 reverse biases step recovery diode D1, causing step recovery diode D1 to produce a negative step in voltage. This negative step is fed to impulse forming network 1134, which controls the width and height of the generated impulse.

III.1.A.i.e. Bi-Polar Polarity Pulsers

Figure 12:
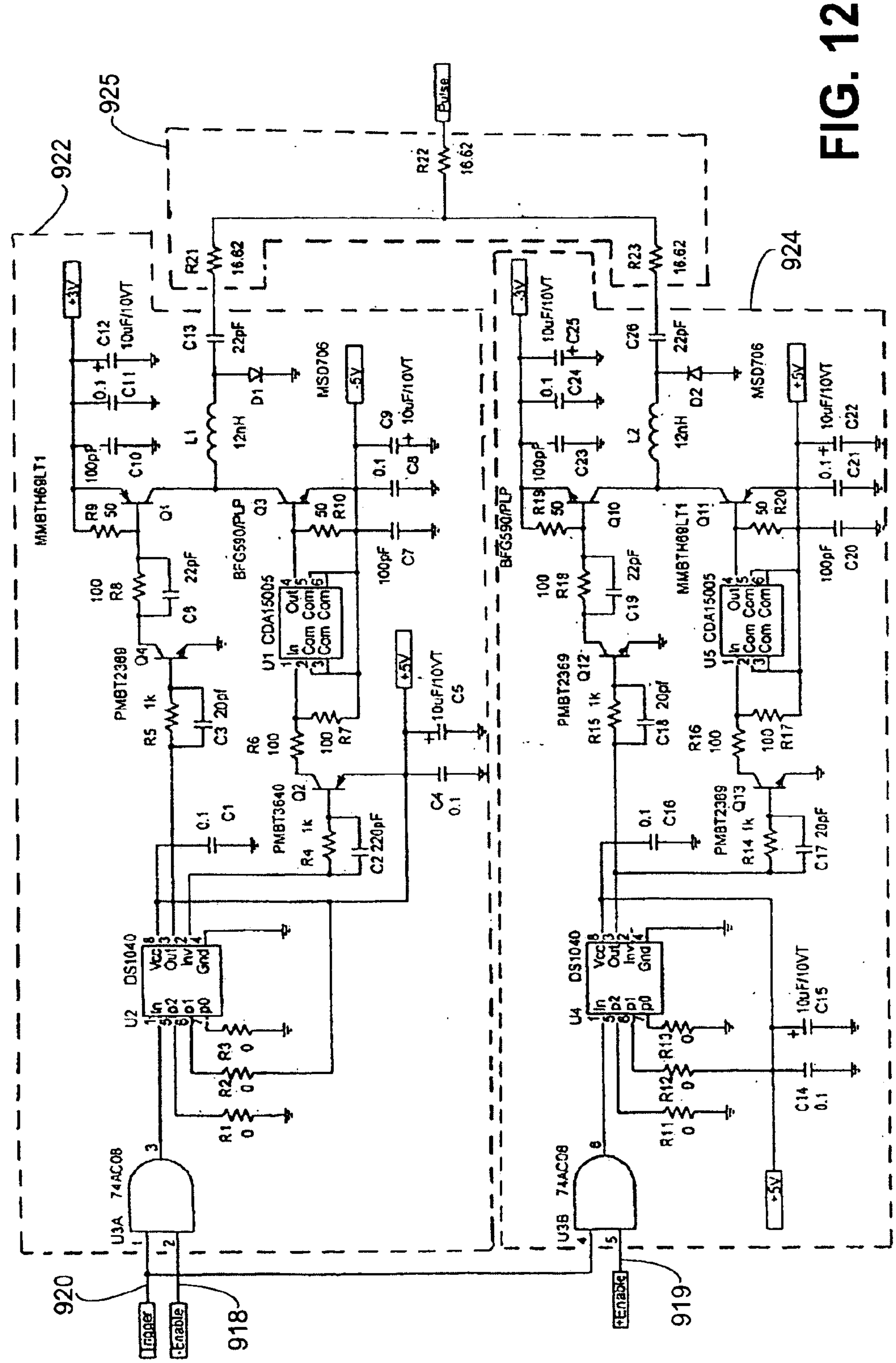
FIG. 12 is a circuit diagram of a bipolar pulser for use in the transmitter of FIG. 9, according to an embodiment of the present invention.

FIG. 12 illustrates a bi-polar impulse generator that consists of pulser 922, pulser 924 and combiner 925. As shown, in this embodiment combiner 925 consists of resistors R21, R22 and R23. Resistors R21, R22 and R23 are shown to have a 1:1:1 ratio. However, the ratio of the resistors can be adjusted (e.g., trimmed), as necessary, so that the amplitude of the impulses created by pulsers 922 and 924 are equivalent.

Figure 13:
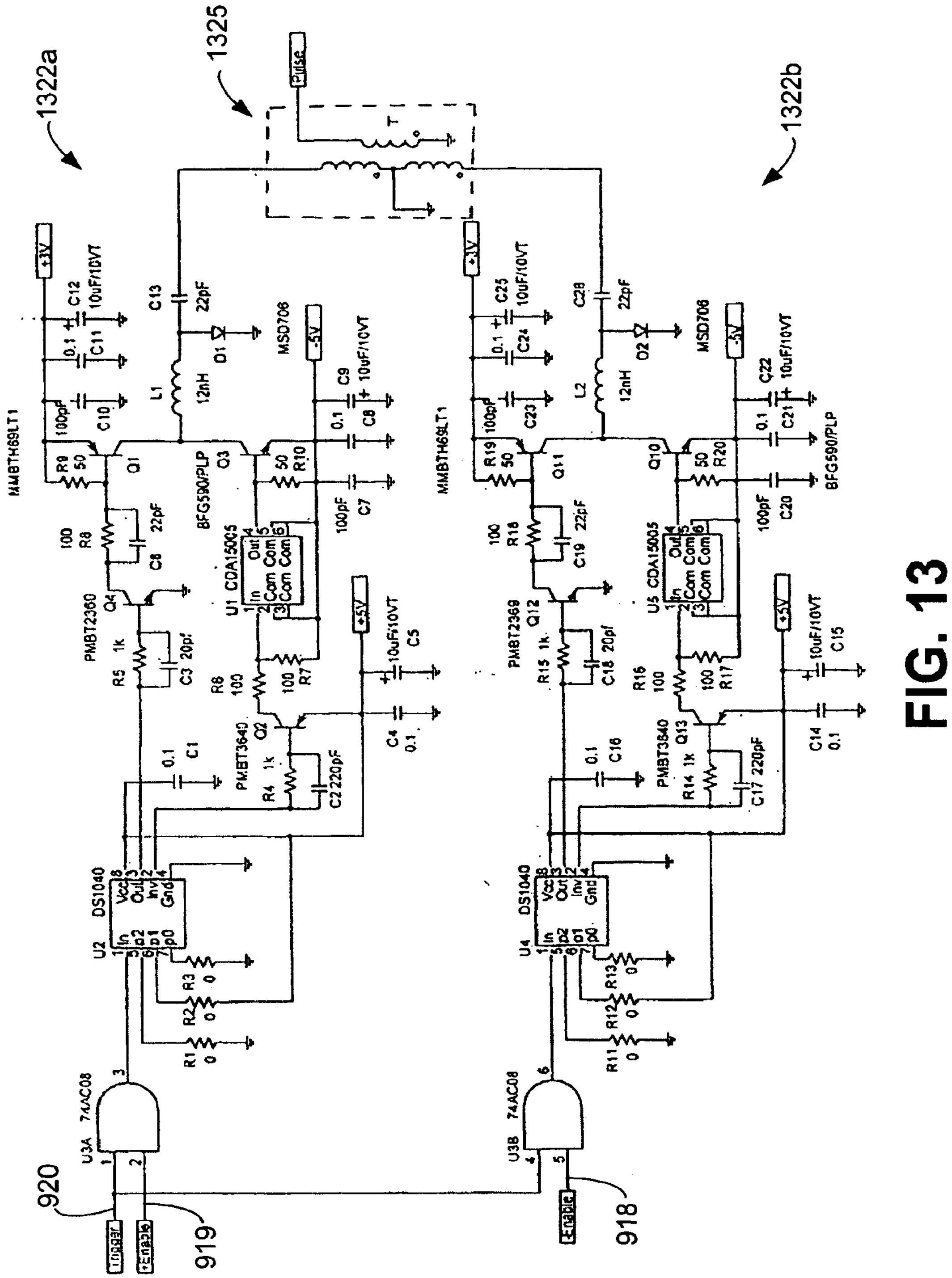
FIG. 13 is a circuit diagram of an alternative bipolar pulser for use in the transmitter of FIG. 9, according to an embodiment of the present invention.

FIG. 13 illustrates an embodiment of a bi-polar impulse generator that includes two equivalent pulsers (i.e., pulsers that create that same polarity impulses) and a center tapped transformer T1 that is used as a combiner 1325. In addition to adding the impulses generated by pulser 1322*a* and pulser 1322*b,* transformer T1 also inverts the pulses generated by pulser 1322*b,* thereby implementing flip modulation. In one example embodiment, transformer T1 is a 1:1:1 transformer. However, the ratio of transformer T1 can be adjusted as necessary so that the amplitude of the impulses created by pulsers 1322*a* and 1324*b* are equivalent.

It is important to note that the impedance change of step recovery diode D1 (of FIGS. 10A, 10B, 11A, 11B, 12 and 13) and the resultant impulse generated by step recovery diode D1 does not occur exactly at the time that the current driving diode D1 is switched. Rather, the inventors have determined that the impedance change and the resultant impulse are related to the time that it takes to extract the charge is strongly dependent on the ratio of the forward and reverse currents. Further, through extensive experimentation, the inventors discovered that an optimum current ratio should be selected so that the output delay of a pulser circuit is precisely the same regardless of the trigger rate and other conditions. Specifically, when using step recovery diodes manufactured by MicroMetrics, Inc. of Londonderry, N.H., the optimum current ratio is 1.667 (i.e. 5/3). That is, with a current ratio of 1.667 (i.e., 5/3), the trigger to output delay of pulsers (i.e., pulsers 922 and 924) is precisely the same regardless of the trigger rate and other conditions. Without this ratio, the trigger to output delay (i.e., time from when a trigger signal is applied to when an impulse is generated) is not constant.

More specifically, the inventors have recognized through experimentation that a specific current ratio of 1.667 is important for optimum stability of impulse recovery diode D1. Referring to FIG. 10, the 1.667 ratio is defined by the −3 volts associated with transistor Q3 and the +5 volts associated with transistor Q1. Referring to FIG. 11, the 1.667 ratio is defined by the +3 volts associated with transistor Q1 and the −5 volt supply associated with transistor Q3. Of course other voltages, such as +6 volts and −10 volts, can be used to create this 1.667 ratio. Without this ratio, the pulse firing of step recovery diode D1 is indeterminate, thus causing the time position of impulses generated by diode D1 to be indeterminate. This is not acceptable when using a modulation scheme where the timing of each impulse is critical to proper modulation and demodulation.

It is noted that the exact current ratio may be different when using a step recovery diode manufactured by a different company (i.e., other than MicroMetrics), because the diode may have different characteristics, such as a different doping profile.

One of the most important parameters in an impulse generator circuit of an impulse radio is the stability of the trigger to output delay (i.e., the time from generation of a trigger signal to the output of a pulse) of the impulse generator circuit. The stability of the time required to remove the charge stored by a forward charging current with variation in impulse trigger rate due to the time hopping code (i.e., the variation in time since the last pulse) is of primary importance in determining the trigger to output delay stability of an impulse generator circuit. It is known that $t_s$ (the time required to remove the charge stored by a forward charging current) is a function of the ratio of the step recovery diode forward to reverse bias currents as follows:

$$t_s = \tau \times \ln(l + I_f / I_r)$$

Where, $t_s$ is the time required to remove the charge stored by $I_f$, $\tau$ is the minority carrier lifetime (i.e., the time it takes for the step recovery diode to reach 10% of $I_r$), ln is the natural logarithm, $I_f$ is the forward current, and $I_r$ is the reverse current.

To evaluate the stability of $t_s$ with respect to impulse trigger rate and the bias current ratio $I_f/I_r$, an adaptation of the test method described in step recovery diode manufacturers' data sheets for measurement of minority carrier lifetime $\tau$ is used to acquire data on the value of $t_s$ with variation of trigger rate and bias current ratio.

The time from the trigger to the diode impedance change is observed on an oscilloscope as both the trigger rate and the bias current ratio are varied. The desired operation point for the step recovery diode is where the bias current ratio $I_f/I_r$, yields the minimum variation in time from trigger to diode impedance change over the desired range of trigger rates.

III.1.A.i.d. On-Chip Bi-Polar Polarity Pulser

Figure 15:
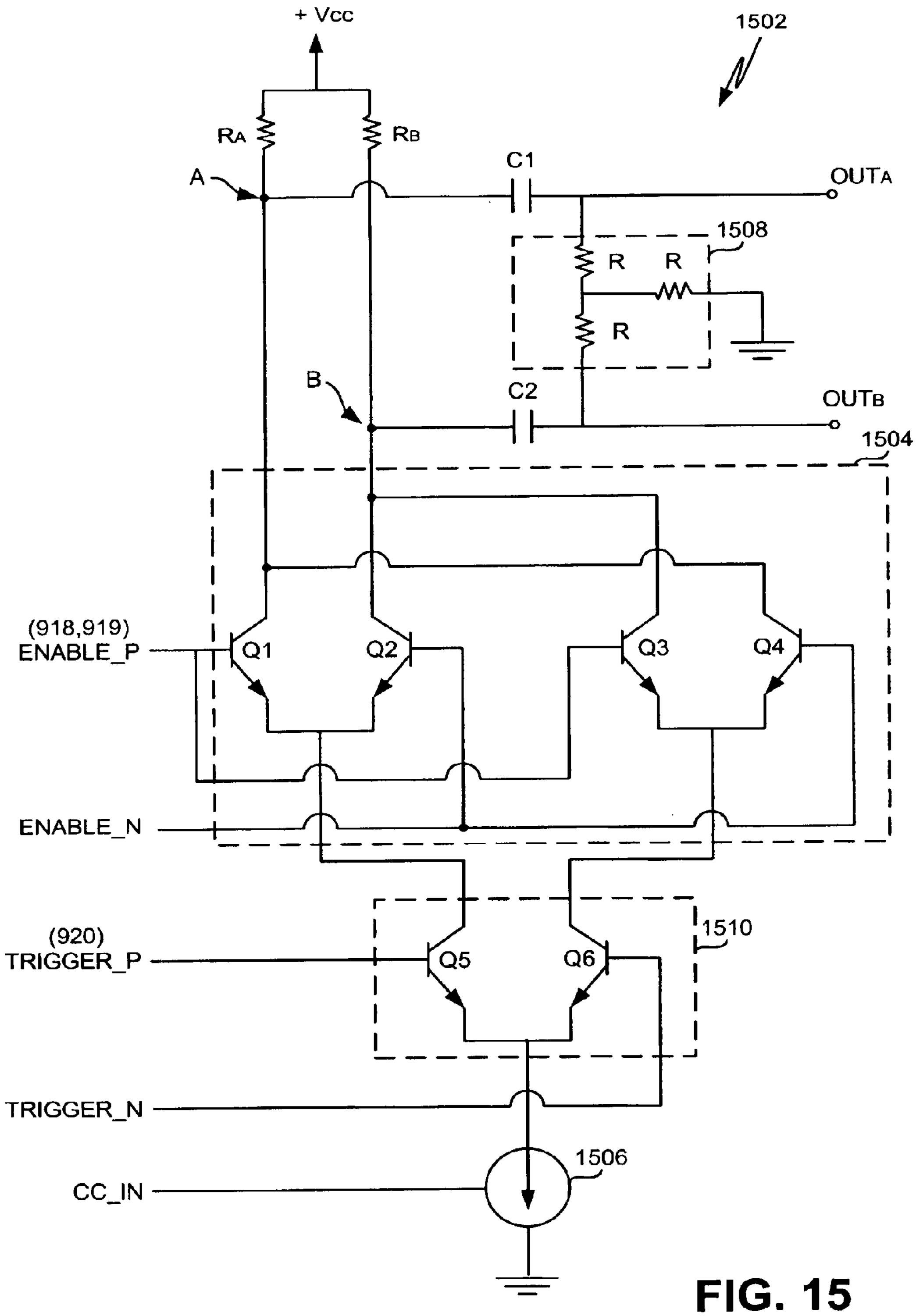
FIG. 15 is a circuit diagram of another bipolar pulser for use in the transmitter of FIG. 9, according to an embodiment of the present invention.

FIG. 15 illustrates a bi-polar impulse generator 1502 that can be manufactured on-chip. Signal ENABLE_P is analogous to both enable signals 918 and 919. Signal ENABLE_N is the compliment of ENABLE_P (i.e., when ENABLE_P is HIGH, ENABLE_N is LOW, and vice versa). Signal TRIGGER_P is analogous to trigger signal 920. Signal TRIGGER_N is the compliment of TRIGGER_P (i.e., when TRIGGER_P is HIGH, TRIGGER _N is LOW, and vice versa). Compliment signals ENABLE_N and TRIGGER_N are used to create a fully differential circuit. Because everything in the circuit is matched and differential, this circuit can generate a positive impulse or a negative impulse with exactly the same delay through the circuit. Producing this same delay is very important when using modulations schemes that depend on the precise time position of impulses.

As described in more detail below, to generate a positive impulse (e.g., pulse 804), signal ENABLE_P is set HIGH (thus turning on transistors Q1 and Q3, and turning off transistors Q2 and Q4) and switching transistor Q5 is driven by a TRIGGER_P pulse (i.e., a LOW to HIGH pulse). To generate a negative impulse (e.g., pulse 802) signal ENABLE_P is set LOW (thus turning off transistors Q1 and Q3, and turning on transistors Q2 and Q4), and switching transistor Q5 is driven by a TRIGGER_P pulse (i.e., a LOW to HIGH pulse). Thus, putting ENABLE_P to HIGH is more specifically analogous to activating enable 819, and putting ENABLE_P to LOW is more specifically analogous to activating enable 818.

Transistors Q1, Q2, Q3 and Q4 are part of a steering network 1504, wherein Q1 and Q3 makes a Cascode pair when ENABLE_P is HIGH, and Q2 and Q4 make a Cascode pair when ENABLE_N is HIGH (i.e., when ENABLE_P is LOW). Transistors Q5 and Q6, which are used for switching, are also referred to together as a switching circuit 1510. Transistor Q5 is normally off and transistor Q6 is normally on.

A current source 1506 is designed such that its rise and fall times are slow enough that the edges it produces in load resistors $R_A$ and $R_B$ do not couple significant signal through the high pass circuit consisting of C1, C2 and load 1508.

Figure 16A:
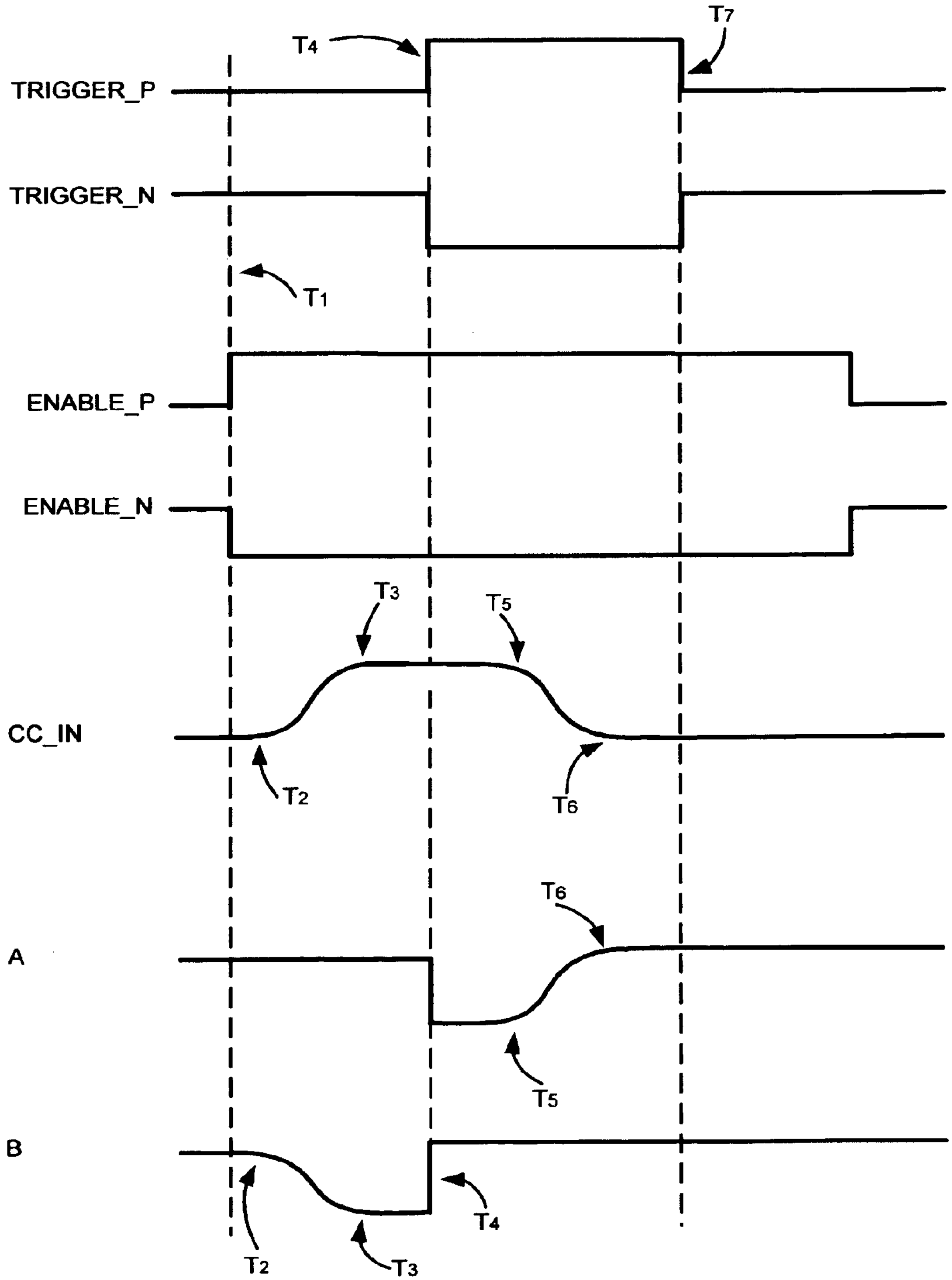
FIGS. 16A and 16B are timing diagrams that are used to explain the operation of the bipolar pulser of FIG. 15.
Figure 16B:
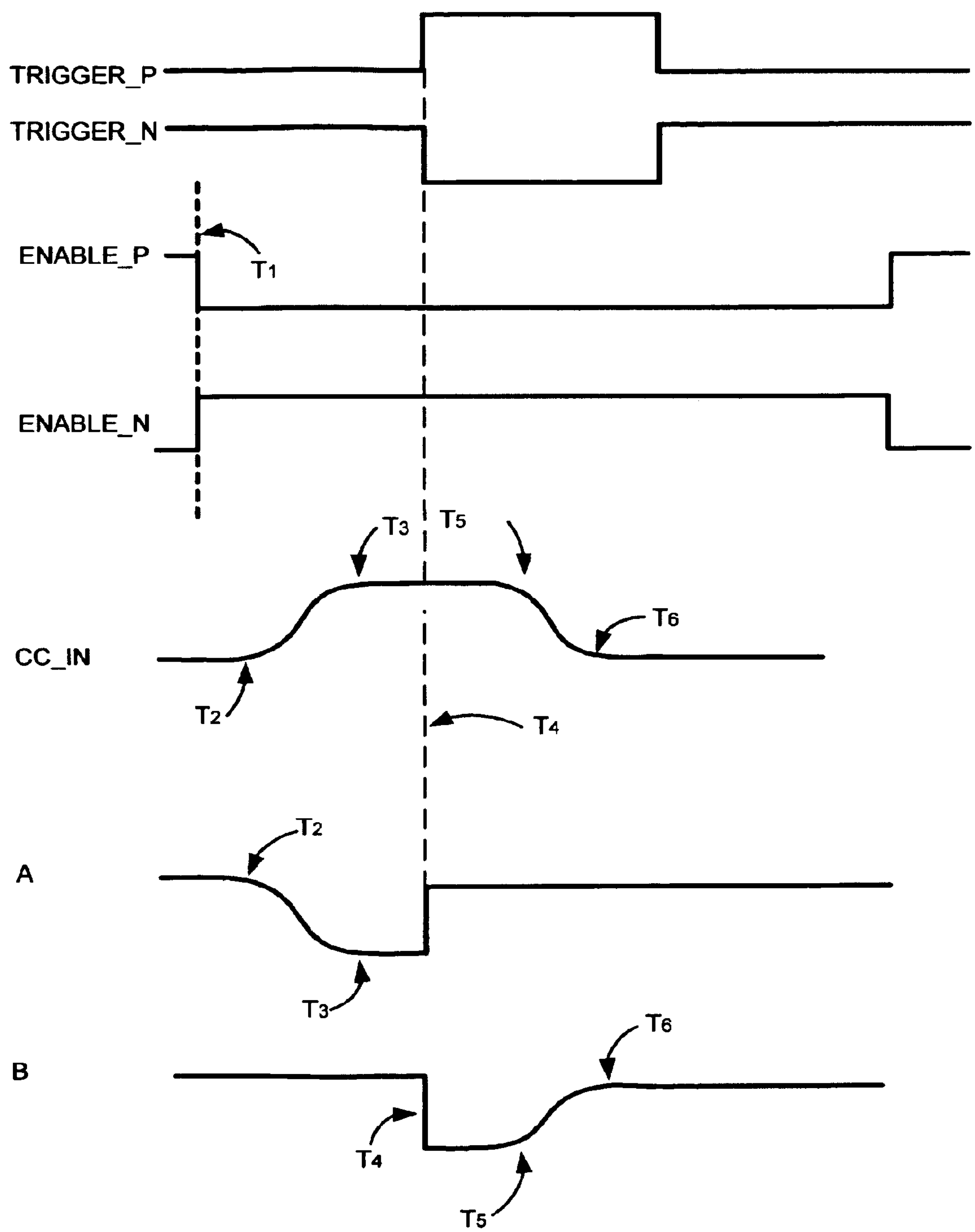

Operation of the circuit shown in FIG. 15 can be illustrated using the timing diagrams shown in FIGS. 16A and 16B. FIG. 16A is used to explain the generation of a positive impulse (e.g., pulse 804). FIG. 16B is used to explain the generation of a negative impulse (e.g., pulse 802).

Referring first to FIG. 16A, at a time $T_1$, which is a time before an impulse is to be generated, ENABLE_P is set HIGH if the desire is to generate a positive impulse (e.g., pulse 804), or ENABLE_P is set LOW if the desire is to generate a negative impulse (e.g., pulse 806). The generation of a positive impulse will be described first. Thus, as shown in FIG. 16A, at a time $T_1$ ENABLE_P goes HIGH, and ENABLE_N (which, as discussed above is the compliment of ENABLE_N, goes LOW).

Additionally, the current source is turned on at a time (e.g. at time $T_2$) before an impulse is to be generated. As soon as current source 1506 is turned on (e.g., at time $T_2$) a current (shown by CC_IN) is steered though load $R_B$ and the voltage at point B transitions to LOW (e.g., at time $T_3$). Notice that the voltage at point A is HIGH at time $T_3$ because no current is being steered through load $R_A$.

The voltage at point B stays LOW (and the voltage at point A stays HIGH) until a time $T_4$, when a pulse (i.e., TRIGGER_P) is provided to transistor Q5. At time $T_4$, transistor Q5 is turned on and transistor Q6 is turned off. This causes a current to be steered through load $R_A$ and no current to be steered through load $R_B$, which causes the voltage at point B to go to snap up to Vcc (i.e., HIGH) and the voltage at point A to snap down to LOW.

The rising edge of voltage B (i.e., at time $T_4$) is differentiated by the high pass filter RC circuit consisting of capacitor C2 and load 1508, causing the desired positive impulse (e.g., pulse 804) to be produced at $OUT_B$ (and a negative impulse to be produced at $OUT_A$). In one embodiment $OUT_B$ is provided to a one single ended antenna. In an alternative embodiment $OUT_B$ and $OUT_A$ are provided to a differential antenna.

Shortly after time $T_4$ (e.g., at time $T_5$) the current source is turned off to prevent additional undesired impulses from being generated (e.g., at time $T_7$). Additionally, the turning off of the current source causes both voltage A (e.g., at time $T_6$) and voltage B to transition to Vcc.

The generation of a negative impulse (e.g., pulse 802) shall now be explained with reference to FIG. 16B. At a time $T_1$, which is a time before an impulse is to be generated, ENABLE_P is set LOW because the desire is to generate a negative impulse (e.g., pulse 802). This causes ENABLE_N to go HIGH because it is the complement of ENABLE_P, as discussed above.

At a time (e.g. at time $T_2$) before the impulse is to be generated, the current source 1506 is turned on. As soon as current source 1502 is turned on (e.g., at time $T_2$) a current (shown by CC_IN) is steered though load $R_A$ and the voltage at point A transitions to LOW (e.g., at time $T_3$). Notice that the voltage at point B is HIGH at time $T_3$ because no current is being steered through load $R_B$.

The voltage at point A stays LOW (and the voltage at point B stays HIGH) until a time $T_4$, when a pulse (i.e., TRIGGER_P) is provided to transistor Q5. At time $T_4$, transistor Q5 is turned on and transitor Q6 is turned off. This causes a current to be steered through load $R_B$ and no current to be steered through load $R_A$, which causes the voltage at point A to go to snap up to Vcc (i.e., HIGH) and the voltage at point B to snap down to LOW.

The falling edge of voltage B (i.e., at time $T_4$) is differentiated by the high pass filter RC circuit consisting of capacitor C2 and load 1508, causing the desired negative impulse (e.g., pulse 802) to be produced at $OUT_B$ (and a positive impulse to be produced at $OUT_A$). In one embodiment $OUT_B$ is provided to a one single ended antenna. In an alternative embodiment $OUT_B$ and $OUT_A$ are provided to a differential antenna.

Shortly after time $T_4$ (e.g., at time $T_5$) the current source is turned off to prevent additional undesired impulses from being generated (e.g., at time $T_7$). Additionally, the turning off of the current source causes both voltage A (e.g., at time $T_6$) and voltage B to transition to Vcc.

III.1.A.ii. Alternative Transmitter

Figure 17:
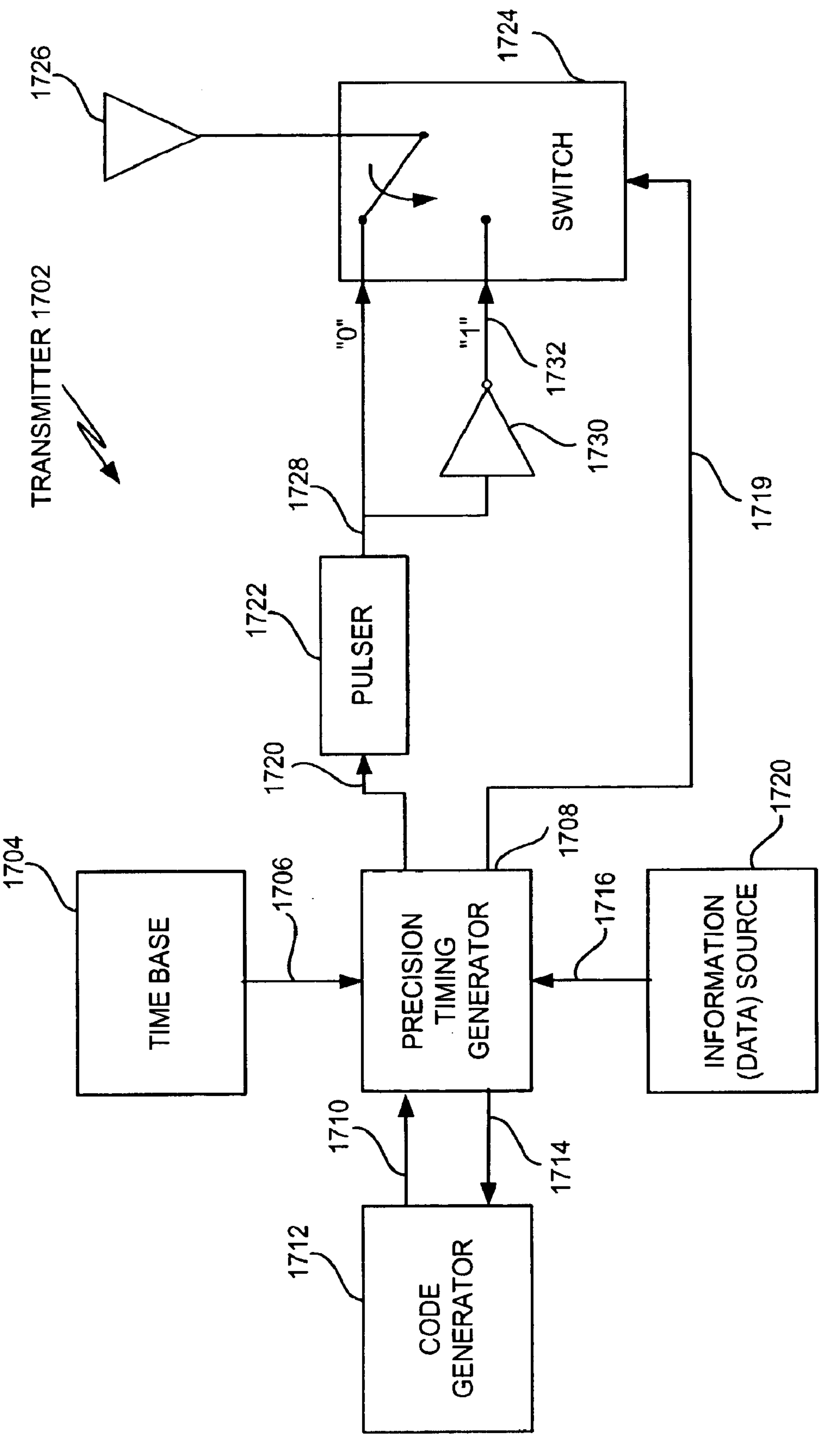
FIG. 17 is a functional diagram of an impulse radio transmitter according to an embodiment of the present invention.

FIG. 17 shows an alternative transmitter 1702 according to another embodiment of the present invention. Transmitter 1702 is similar to transmitter 902, except that it uses a single pulse generator 1722 (also referred to as pulser 1722), rather than two pulse generators. Additionally, precision timing generator 1708 functions slightly different than precision timing generator 908.

In this embodiment, precision timing generator triggers the same pulser (i.e., pulser 1722) to generate output pulses that resemble pulse 802 and pulses that resemble pulse 804 (i.e., a pulse that is the inverse or flip of pulse 802). An output 1728 of pulser 1722 is provided to a switch 1724 and to an inverter 1730. An output 1732 of inverter 1730 is provided to switch 1724. Precision timing generator generates a toggle signal 1719 which is provided to switch 1724. Toggle signal 1719 instructs switch 1724 to either connect output 1728 of pulser 1722 to antenna 1726, or to connect output 1732 of inverter 1730 to antenna 1726. When output 1728 is connected to antenna 1726, output pulses that resemble pulse 802 can be transmitted by antenna 1726. When output 1732 is connected to antenna 1726 and pulser 1722 is triggered by trigger signal 1720, output pulses that resemble pulse 804 are transmitted by antenna 26.

Thus, in this embodiment, to generate a pulse 802, precision timing generator sends timing trigger signal 1720 to pulser 1722 and instructs switch 1724 (via toggle signal 1719) to connect output 1728 to antenna 1726. To generate a pulse 804 (the inverse of pulse 802), precision timing generator sends a trigger signal to pulser 1722 and instructs switch 1724 (via toggle signal 1719) to connect output 1732 of inverter 1730 to antenna 1726. The inverter can comprise either an active network, such as a buffer amplifier or differential amplifier, or a passive network, such as a transformer or balun.

It is noted that inverter 1730 will cause a determinable delay. Thus, to maintain the timing between a non-inverted pulse 802 and an inverted pulse 804, a delay circuit (not shown) that causes a delay equal to the delay of inverter 1730 can be placed in the non-inverted pulse path (i.e., between pulser 1722 and switch 1724). Alternatively, this delay can be inserted by the precision timing generator 1708 in accordance with switch 1722 instructions via toggle signal 1719.

III.1.B. Receiver

FIG. 18 shows an exemplary impulse radio receiver 1802 for receiving flip modulated signals, according to an embodiment of the present invention. Receiver 1802 includes an antenna 1804 for receiving a propagated impulse radio signal. In one embodiment, antenna 1804 is designed such that it differentiates the received propagated impulse radio signal. In such an embodiment, received signal 1806 is the first derivative of the propagated impulse radio signal. For example, as discussed above, waveform 806 is the first derivative of pulse 802, and waveform 808 is the first derivative of pulse 804. In another embodiment, antenna 1804 does not differentiate the received propagated impulse radio signal.

Figure 19A:
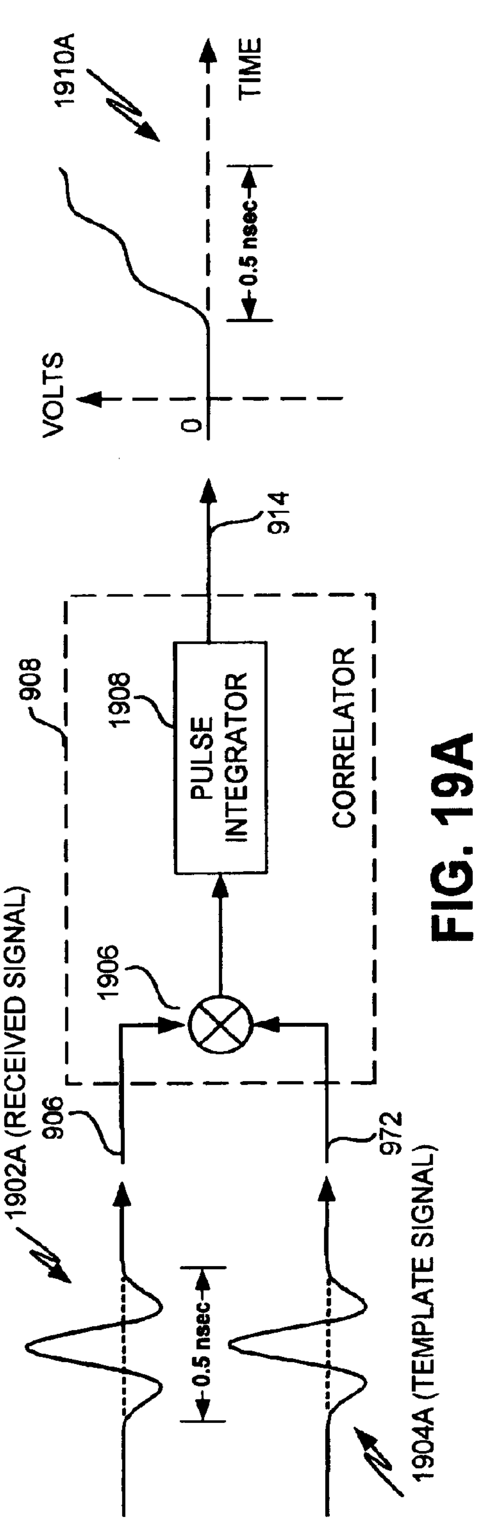
FIGS. 19A and 19B illustrate the correlation functions associated with the receiver of FIG. 18.
Figure 19B:
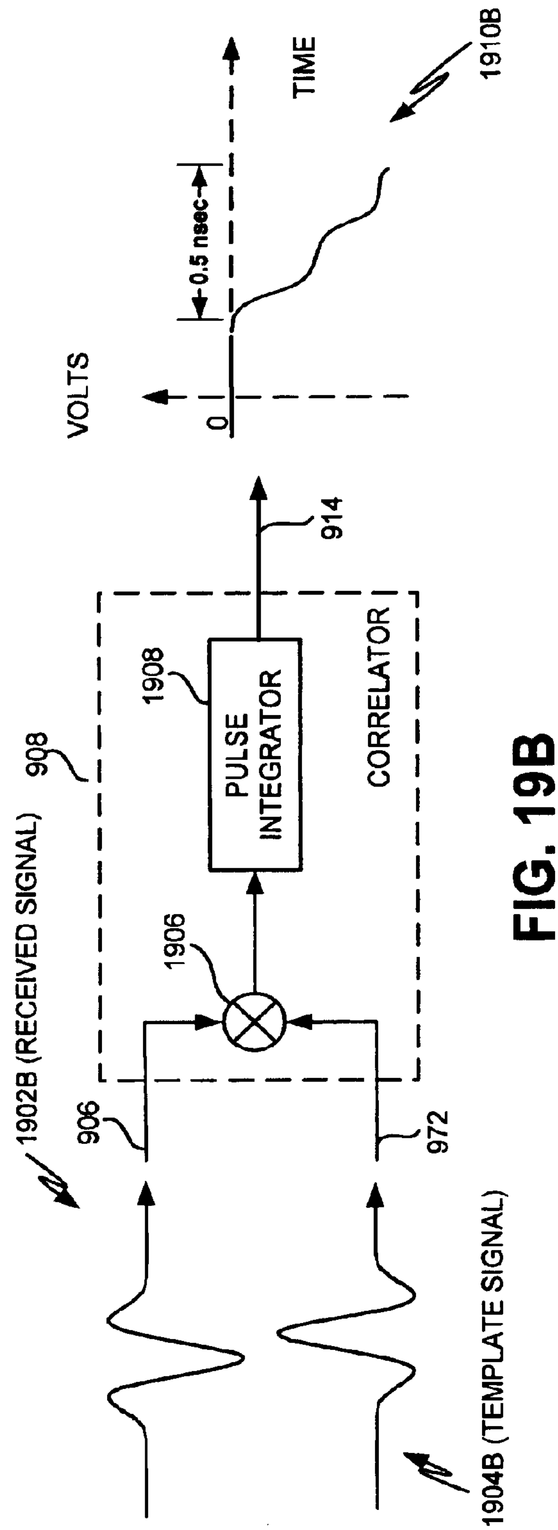

Received signal 1806 is input to a data correlator 1808 (also called sampler 1808 or first correlator 1808). By correlating received signal 1806 with a template signal 1872, discussed in more detail below, correlator 1808 produces a baseband output signal 1814 (also referred to as first correlator output signal 1814). Correlator 1808 ideally comprises a multiplier followed by a short term integrator to sum the multiplied product over the pulse interval (as shown in FIGS. 19A and 19B).

Receiver 1802 also includes a precision timing generator 1860, which receives a periodic timing signal 1858 from a receiver time base 1856. Time base 1856 is adjustable and controllable in time, frequency, and/or phase, as required by the lock loop (described below) in order to lock on the received signal 1806. Precision timing generator 1860 provides synchronization signal 1862 to an optional code generator 1866 and receives a code control signal 1864 (also referred to as coding signal 1864) from optional code generator 1866. Precision timing generator 1860 utilizes periodic timing signal 1858 and optional code control signal 1864 to produce a (coded) timing signal 1868. Template generator 1870 (also referred to as a pulse generator 1870) is triggered by (coded) timing signal 1868 and produces a train of template signal pulses 1872 ideally having waveforms substantially equivalent to each pulse of received signal 1806. For example, if antenna 1804 differentiates a received propagated signal, then for optimum performance, the template signal 1872 should consist of pulses that are substantially equivalent to the first derivative of the propagated pulses. Further details of impulse radio receiver and converter circuits can be found in U.S. patent application Ser. No. 09/356,384, filed Jul. 16, 1999, entitled "Baseband Signal Converter Device for a Wideband Impulse Radio Receiver," which has been incorporated by reference above.

If code generator 1866 is used, then the code for receiving a given signal is the same code utilized by the originating transmitter (e.g., used by code generator 912 of transmitter 902) to generate the propagated signal. Thus, the timing of template pulse train 1872 (also referred to as template signal 1872) matches the timing of received signal pulse train 1806, allowing received signal 1806 to be synchronously sampled by correlator 1808. Baseband output 1814 of correlator 1808 is coupled to a data path signal selector/inverter 1816 and a lock path signal selector/inverter 1834, each of which is explained in more detail below. However, before the data path signal selector/inverter 1816 and a lock path signal selector/inverter 1834 are explained, additional details of the correlation process are provided.

III.1.B.i. Correlation Process

FIGS. 19A and 19B show example results of the correlation process performed by correlator 1808, where each pulse of template signal 1872 have waveforms substantially equal to each pulse of received signal 1806. In this embodiment, correlator 1808 is shown as consisting of a multiplier 1906 followed by a pulse integrator 1908 that sums the multiplied product over the pulse interval. Referring first to FIG. 19A, a received pulse 1902A (e.g., of received signal 1806) and a template pulse 1904A (e.g., of template signal 1872) are provided to correlator 1808. Notice that when the received pulse 1902A and the template pulse 1904A are substantially the same, output 1814 of correlator 1808 is a positive voltage (as shown by signal 1910A).

Turning to FIG. 19B, a received pulse 1902B (e.g., of receive signal 1806) and a template pulse 1904B (e.g., of template signal 1872) are provided to correlator 1808. Notice in this example that received pulse 1902B (an inverted-w-pulse) is the inverse or flip of template pulse 1904B (a w-pulse). This causes output 1814 of correlator 1808 to be a negative voltage (as shown by signal 1910B).

Note that in this exemplary embodiment the template pulses (i.e., 1904A and 1904B) are both "w-pulses" (as opposed to "inverted-w-pulses"). This enables correlator 1808 to distinguish between a pulse that represents a binary "0" (e.g., pulse 806) and inverted pulse that represents a binary "1" (e.g., pulse 808). Of course, this can be modified, for example, such that w-pulses 806 represent a "1" bit and inverted w-pulses 808 represent a "0" bit.

Figure 20A:
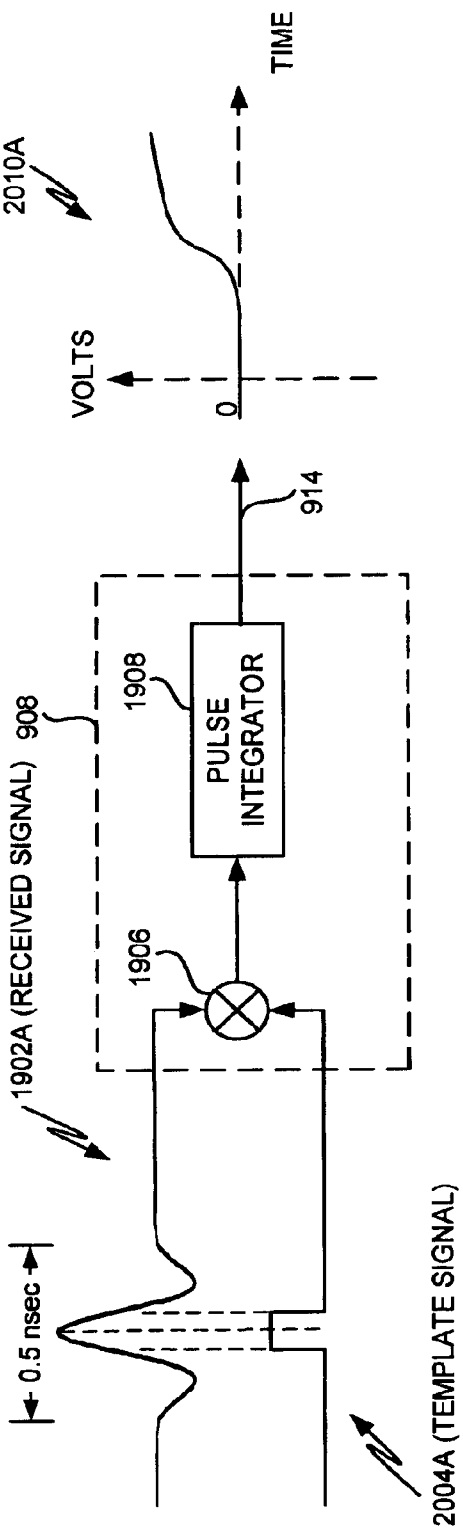
FIGS. 20A and 20B illustrate the correlation functions associated with the receiver of FIG. 18, wherein a simplified template signal is used.
Figure 20B:
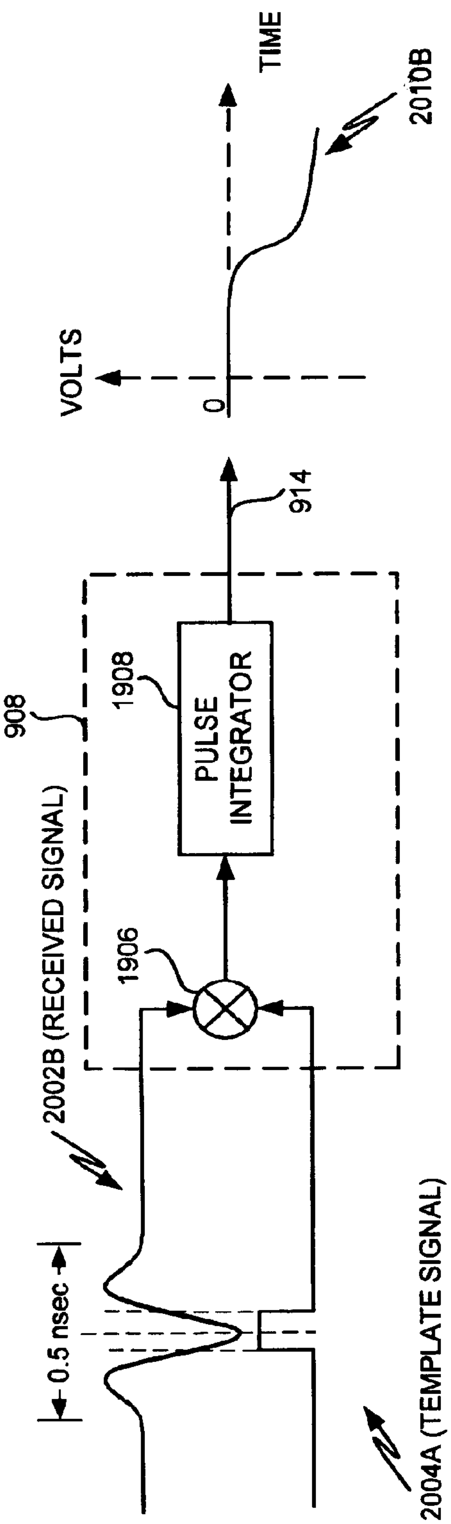

In FIGS. 19A and 19B, discussed above, each pulse of template signal 1872 has a waveform substantially similar to each pulse of received signal 1806. This may produce an optimal correlation function, however this may be difficult and non-efficient to implement. Thus, the inventors have developed alternative ways to correlate the received signal. More specifically, as shown in FIGS. 20A and 20B, square waves 2004A and 2004B are uses as template signals. Preferably, the center of square wave is aligned with the maximum amplitude point of the received signal waveform when the received signal consists of a non-inverted pulse (as shown in FIG. 20A) or the minimum amplitude point of the received signal waveform when the received signal consists of an inverted pulse (as shown in FIG. 20B).

Notice that when the received pulse 1902A is a non-inverted pulse, output 1814 of correlator 1808 is a positive voltage (as shown by signal 2010A). Also notice when the received pulse 1902B is an inverted pulse that the output 1814 of correlator 1808 is a negative voltage (as shown by signal 2010B). Thus, data detection can be performed even though the template signal is a simple square pulse.

The impulse radio receivers of the present invention use multiple correlators, wherein one or more correlators are used to detect data and one or more correlators are used to synchronize the receiver with a received impulse radio signal. Additional details and uses of multiple correlators are disclosed in commonly owned and concurrently filed U.S. patent application Ser. No. 09/537,264, entitled "System and Method Utilizing Multiple Correlator Receivers in an Impulse Radio System," which is incorporated herein by reference in its entirety.

The impulse radio receivers of the present invention lock onto and acquire impulse radio signals. In one embodiment, this can be accomplished by comparing a template pulse train with a received impulse radio signal to obtain a comparison result, performing a threshold check of the comparison result, and locking on the received impulse radio signal if the comparison result passes the threshold check. Additionally, a quick check using the template pulse train and an additional received impulse radio signal can be performed. Further, a synchronization check of a further received impulse radio signal can be performed. Moreover, a command check of command data of the impulse radio signal can be performed. Additional details of systems and methods for fast locking and acquiring impulse radio signals are disclosed in commonly owned and concurrently filed U.S. patent application Ser. No. 09/538,292, entitled "System for Fast Lock and Acquisition of Ultra-Wideband Signals," which is incorporated herein by reference in its entirety.

III.1.B.ii. Data Path Signal Selector/Inverter

In general, data path signal selector/inverter 1816 separates baseband signal 1814 into multiple signal paths and reverses the polarity of specific signal paths so that data detection can be accomplished. This is illustrated in more detail below. Additionally, if subcarrier modulation was used by the transmitter (e.g., by transmitter 902) that transmitted received signal 1806, then data path signal selector/inverter 1816 can also perform any necessary subcarrier demodulation.

Figure 21:
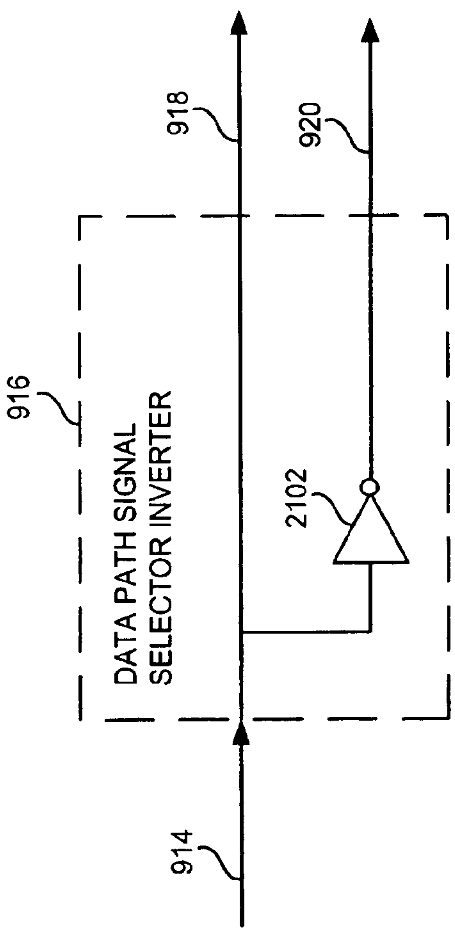
FIG. 21 is a functional diagram of the Data Path Signal Selector/Inverter of the receiver of FIG. 18, according to an embodiment of the present invention.

FIG. 21 shows an example embodiment of data path signal selector/inverter 1816. In this embodiment, the input (i.e., signal 1814, which is the baseband output of correlator 1808) is hard wired to output 1818 (e.g., which may correspond to a "0" bit). Input 1814 is also provided to an inverter 2102. The output of inverter 2102 is output 1820 (e.g., which may correspond to a "1" bit). Outputs 1818 and 1820 are also referred to as a first data state signal and a second data state signal, respectively. In this example embodiment, there is no subcarrier demodulation performed by data path signal selector/inverter 1816.

If subcarrier modulation is used (i.e., by the transmitter of the received propagated signal) then data path signal selector/inverter 1816 can be used to perform subcarrier demodulation. The purpose of the optional subcarrier process, when used, it to move the information signal away from DC (zero frequency) to improve immunity to low frequency noise and offsets. An example of subcarrier modulation and demodulation is discussed in the description of FIGS. 27A and 27B below.

In this embodiment, data path signal selector/inverter 1816 outputs signals 1818 and 1820, which represent voltages that correspond to possible data states. For example, in one embodiment signal 1818 corresponds to a binary "0" and signal 1820 corresponds to a binary "1". Signal 1818 is provided to a summing accumulator 1822, and signal 1820 is provided to a summing accumulator 1824. At the end of an integration cycle, max value selector 1830 compares an output 1826 of accumulator 1822 to an output 1828 of accumulator 1824 to determine, for example, if the data bit (associated with the received pulses) is a "0" or a "1". Of course, accumulators 1822 and 1826 are only necessary if more than one pulse (e.g., 4, 8 or 100 pulses) are used to represent each data state (e.g., bit or bits). For example, if 100 pulses are used to represent each bit, then accumulators 1822 and 1826 will each add 100 values (i.e., accumulator 1822 will sum signals 1818 and accumulator 1824 will sum signals 1820) and provide the summation values (signals 1826 and 1828, respectively) to max value selector 1830, and then add the next 100 values and provide the summation values to max value selector 1830, and so on. If each data state (e.g., bit or bits) is represented by only one pulse, then output signals 1818 and 1820 are provided directly (i.e., without the need for accumulators 1822 and 1824) to max value selector 1830.

III.1.B.iii. Max Value Selector

Max value selector 1830 determines the data states (e.g., bit or bits) that a pulse, or a plurality of pulses (e.g., 100 pulses), represent. For example, assuming that 100 pulses of received signal 1806 are used to represent each data bit, max value selector 1830 makes a decision whether each 100 pulses represent a "0" bit or "1" bit.

Figure 22:
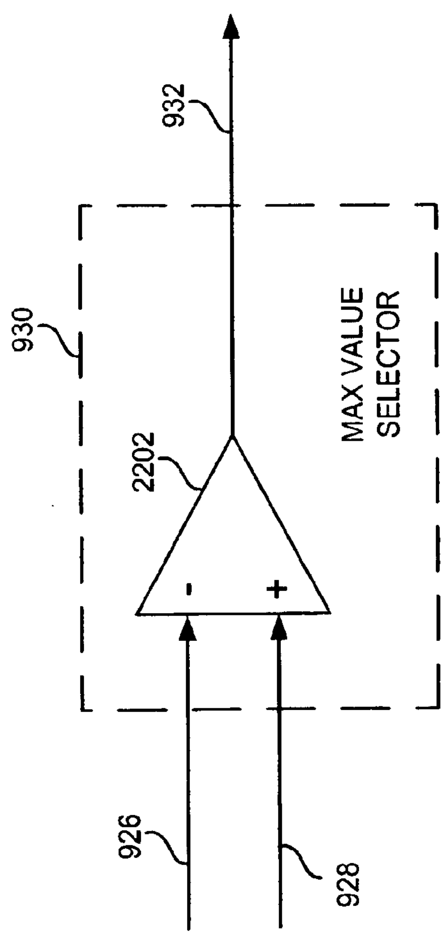
FIG. 22 is a functional diagram of the Max Value Selector of the receiver of FIG. 18, according to an embodiment of the present invention.

In one digital implementation embodiment, show in FIG. 22, max value selector 1830 comprises a comparator 2202. In this example embodiment, when the signal applied to the (+) input terminal (i.e., signal 1828) is greater than the signal applied to the (−) input terminal (i.e., signal 1826), output signal 1832 assumes a HIGH output state, which for example corresponds to a "1" bit. When the signal applied to the (+) input terminal (i.e., signal 1828) is less than the signal applied to the (−) input terminal (i.e., signal 1826), output signal 1832 assumes a LOW output state, which for example corresponds to a "0" bit. Thus, in this example embodiment max value selector 1830 receives a voltage associated with a "0" bit (e.g., signal 1826) and a voltage associated with a "1" bit (e.g., signal 1828) and, depending on which voltage is greater, makes a decision as to whether a pulse or plurality of pulses represent a "0" bit or "1" bit.

III.1.B.iv. Illustrative Examples

The above discussed features of receiver 1802 and its components (such as data path signal selector/inverter 1816 and max value selector 1839) can be illustrated using the following example.

Referring back to FIGS. 18 and 19A, assume that signal 1814 consists of 100 pulses 1902A. This causes signal 1814 (output from correlator 1808, and input to digital data signal selector/inverter 1816) to consists of 100 positive voltage values (i.e., signal 1910A). This in turn causes signal 1818 to consist of 100 positive voltage values and signal 1820 to consist of 100 negative voltage values (e.g., because of inverter 2102, shown in FIG. 21). Accumulator 1822 adds the 100 positive voltage values (signal 1818) and provides the sum (1826) to max value selector 1830. Accumulator 1824 adds the 100 negative voltage values (signal 1820) and provides the sum (signal 1828) to max value selector 1830. In this example, max value selector 1830 will determine that sum 1826 is greater than sum 1828, and thus that the 100 pulses 1902A represent a "0" bit. As a result, max value selector 1830 outputs a data signal 1832 that signifies a "0" bit (e.g., 0 volts, −1 volts, or −5 volts).

Now, referring back to FIGS. 18 and 19B, assume that signal 1814 consists of 100 pulses 1902B (i.e., inverted w-pulses). This causes signal 1814 (output from correlator 1808, and input to digital data signal selector/inverter 1816) to consists of 100 negative voltage values (i.e., signal 1910B). This in turn causes signal 1818 to consist of 100 negative voltage values and signal 1820 to consist of 100 positive voltage values (e.g., because of inverter 2102). Accumulator 1822 adds the 100 negative voltage values (signal 1818) and provides the sum (1826) to max value selector 1830. Accumulator 1824 adds the 100 positive voltage values (signal 1820) and provides the sum (1828) to max value selector 1830. In this example, max value selector 1830 will determine that sum 1828 is greater than sum 1826, and thus that the 100 pulses 1902B represent a "1" bit. As a result, max value selector 1830 outputs a data signal 1832 that signifies a "1" bit (e.g., 1 volt, or 5 volts).

It is noted that depending on the design of the transmitter and receiver, and on the modulation scheme, a max value selector can be designed to distinguish between states other than a "0" bit and a "1" bit. For example, a max value selector 2930 of a receiver 2902 (shown in FIG. 29, and discussed below) that receives quadrature modulated signals can distinguish between four data states (i.e., bits "00", "01", "10" and "11").

Methods of implementing multiple data states can also be found in commonly owned U.S. patent application Ser. No. 09/538,519, entitled "Vector Modulation System and Method for Wideband Impulse Radio Communications," which has been incorporated by reference above.

Figure 23:
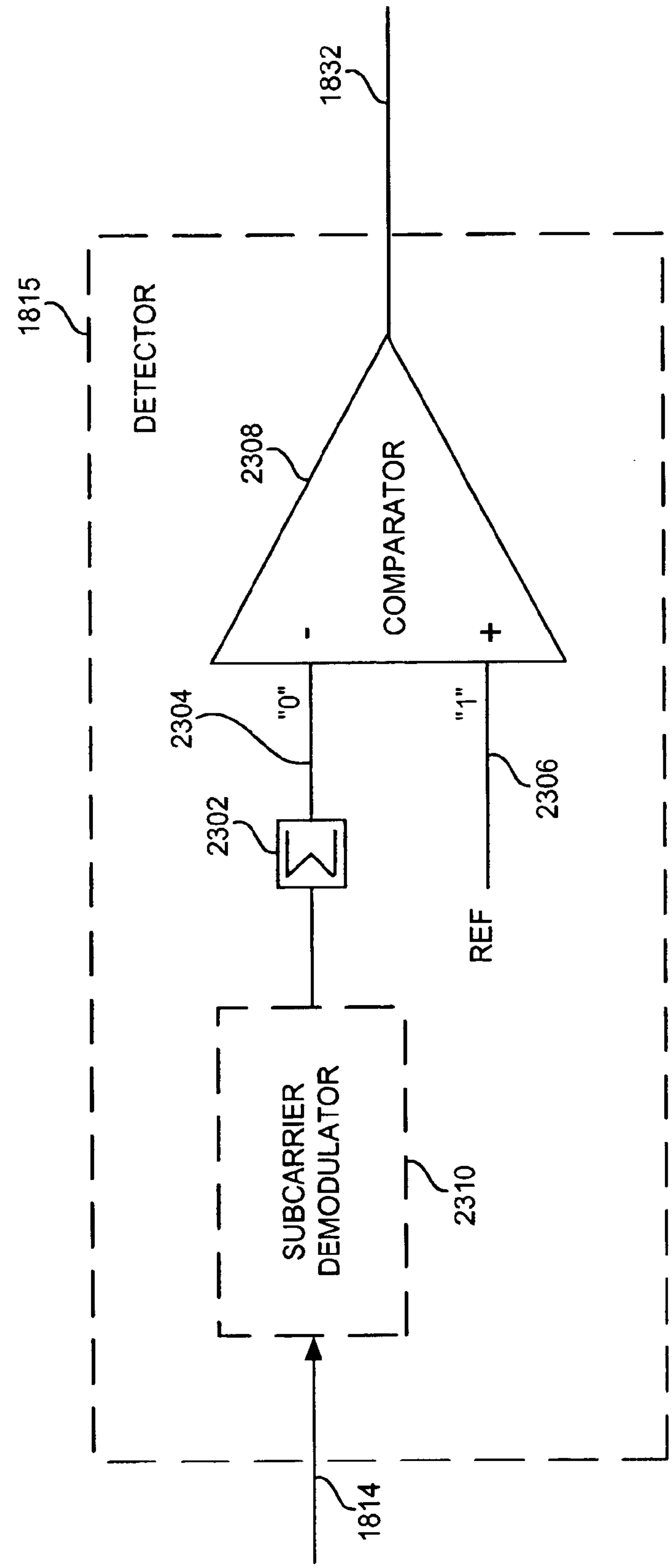
FIG. 23 is a functional diagram of a Detector that can be used in the receiver of FIG. 18, according to an embodiment of the present invention.

In the above discussed embodiment of receiver 1802, data path signal selector/inverter 1816, accumulators 1822 and 1824, and max value selector 1830 can be thought of as being components of a data detector 1815 (shown by dotted lines). FIG. 23 shows an alternative embodiment of data detector 1815. In this embodiment, detector 1815 consists of a summing accumulator 2302 and a comparator 2308. Assuming 100 pulses are used to represent each bit, accumulator 2302 adds the voltage outputs (i.e., signal 1814) of correlator 1808, and provides a sum value 2304 to comparator 2308. A reference value signal 2306 is also provided to comparator 2308. In one example, if sum value 2304 (which is applied to the (−) input terminal) is greater than reference value 2306 (which is applied to the (+) input terminal), then the output (1832) of comparator 2308 assumes a LOW output, which represents a "0" bit. If sum value 2304 (which is applied to the (−) input terminal) is less than reference value 2306 (which is applied to the (+) input terminal), then the output (1832) of comparator 2308 assumes a HIGH output, which represents a "1" bit.

If subcarrier modulation was used by the transmitter (e.g., transmitter 902) that transmitted received signal 1806, then the alternative data detector 1815 of FIG. 23 also includes a subcarrier demodulator 2310 that performs any necessary subcarrier demodulation prior to accumulator 2302.

Reference value signal 2306, discussed above, can be a fixed value. Alternatively, reference value signal 2306 can be a filtered weighted average of sum value 2304. This compares the sum value 2304 with the DC average of the sum value 2304, thus eliminating DC bias in this signal 2304.

III.1.B.v. Lock Loop Function

Referring again to FIG. 18, it is important that the timing of template pulse train 1872 matches the timing of received signal pulse train 1806 so that received signal 1806 can be synchronously sampled by correlator 1808. Accordingly, a lock loop (also referred to as a control loop) is used to generate an error signal 1854 that corrects any drifts in time base 1856. More specifically, a control loop including lock loop filter 1852, time base 1856, precision timing generator 1860, template generator 1870, delay 1874, lock loop correlator 1810 (also referred to a second correlator 1810), lock path signal selector/inverter 1834 and output selector 1848, is used to generate error signal 1854. Error signal 1854 provides adjustments to the adjustable time base 1856 to time position periodic timing signal 1858 in relation to the position of received signal 1806. The function of the lock loop is described in more detail, below.

III.1.B.v.a. Lock Loop Correlation

Figure 8:
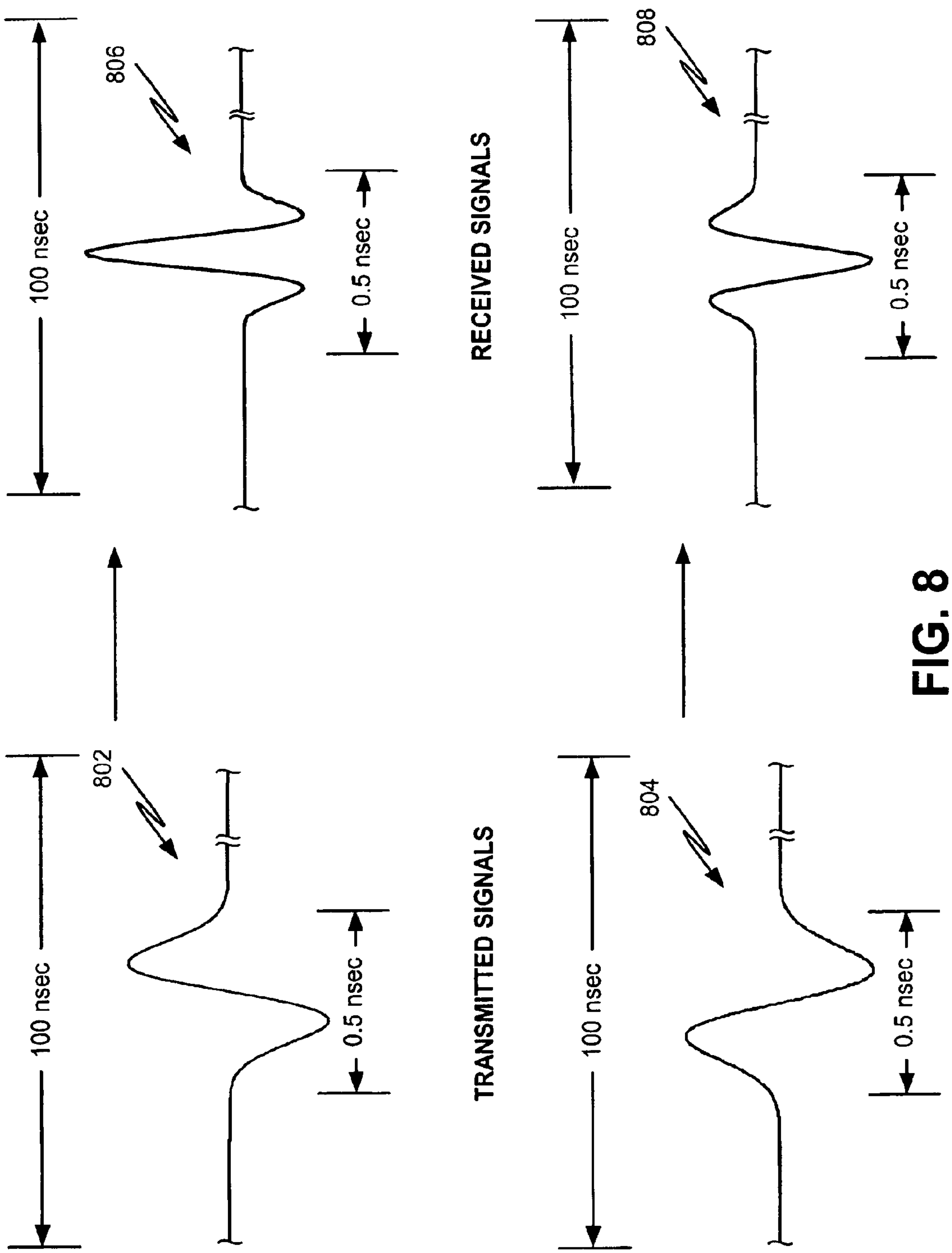
FIG. 8 illustrates signal waveforms that are useful in explaining a modulation scheme according to an embodiment of the present invention.

Received signal 1806 is input to a lock loop correlator 1810 (also referred to as second correlator 1810). Rather than correlating received signal 1806 with template signal 1872, lock loop correlator 1808 correlates received signal 1806 with a delayed template signal 1876 (generated by delay 1874) and outputs a lock loop correlator output 1812 (also referred to as a second correlator output 1812). The delay caused by delay 1874 is precisely selected such that the output of lock loop correlator 1808 is zero when received signal 1806 and non-delayed template signal 1872 are synchronized. Put in other words, delay 1874 is precisely selected such that lock loop correlator 1910 samples received signal 1806 at a zero crossing when received signal 1806 and non-delayed template signal 1872 are synchronized. For example, in one embodiment, delay 1874 delays template signal 1872 by a quarter of a pulse width. Thus, if the pulse width of each pulse is 0.5 nsec (as shown in FIG. 8), then delay 1874 delays template signal 1872 by 0.125 nsec (i.e., 0.5/4=0.125). As discussed above, this will cause the output of lock loop correlator 1810 to be zero when template signal 1872 is synchronous with received signal 1806. However, when template signal 1872 begins to lag or lead received signal 1806, output 1812 of lock loop correlator 1810 will be a voltage that is fed to lock path signal selector/inverter 1834 and used to correct time base 1856.

More specifically, in this embodiment: when template signal 1872 lags a received signal 1806 that consists of a non-inverted pulse (e.g., w-pulse 806), then output 1812 of lock loop correlator 1810 will be a negative voltage; when template signal 1872 lags a received signal 1806 that consists of a inverted pulse (e.g., inverted w-pulse 808), then output 1812 of lock loop correlator 1810 will be a positive voltage; when template signal 1872 leads a received signal 1806 that consists of a non-inverted pulses (e.g., w-pulse 806), then output 1812 of lock loop correlator 1810 will be a positive voltage; and when template signal 1872 leads a received signal 1806 that consists of an inverted pulse (e.g., inverted w-pulse 808), then output 1812 of lock loop correlator 1810 will be a negative voltage.

Assuming time base 1856 has a positive voltage to frequency transfer function (i.e., a positive voltage causes an increase in frequency, and a negative voltage causes a decrease in frequency), to correct time base 1856 error signal 1854 should be a positive (+) voltage when template signal 1872 lags received signal 1806, and error signal 1854 should be a negative (–) voltage when template signal 1872 leads received signal 1806. If time base 1856 has an inverse (or negative) voltage to frequency transfer function, to correct time base 1856 error signal 1854 should be a negative (–) voltage when template signal 1872 lags received signal 1806, and error signal should be a positive (+) voltage when template signal 1872 leads received signal 1806.

In FIG. 18, error signal 1854 is shown as being provided to time base 1856. However, it should be noted that time base 1856 can be implemented as part of precision timing generator 1860. In such a case, error signal 1854 can be provided directly to precision timing generator 1860. Alternatively, even if a time base 1856 is independent of precision timing generator 1860, error signal 1854 can be provided directly to precision timing generator 1860. What is important is that error signal 1854 is used to synchronize receiver 1802 with received impulse radio signal 1806 such that data correlator 1808 samples received impulse radio signal 1806 at a substantially optimal time for data detection, and lock loop correlator 1810 samples received impulse radio signal 1806 at a substantially optimal time for error correction (i.e., at a zero crossing of received impulse radio signal 1806).

III.1.B.v.b. Lock Path Signal Selector/Inverter and Output Selector

In general, lock path signal selector/inverter 1834 separates output 1812 of lock loop correlator 1810 into multiple signal paths and reverses the polarity of specific signal paths so that drifts in time base 1856 can be correctly adjusted. This is illustrated in more detail below. Additionally, if subcarrier modulation was used by the transmitter (e.g., by transmitter 902) that transmitted received signal 1806, then lock path signal selector/inverter 1834 also performs any adjustments necessary due to the subcarrier modulation.

Figure 24:
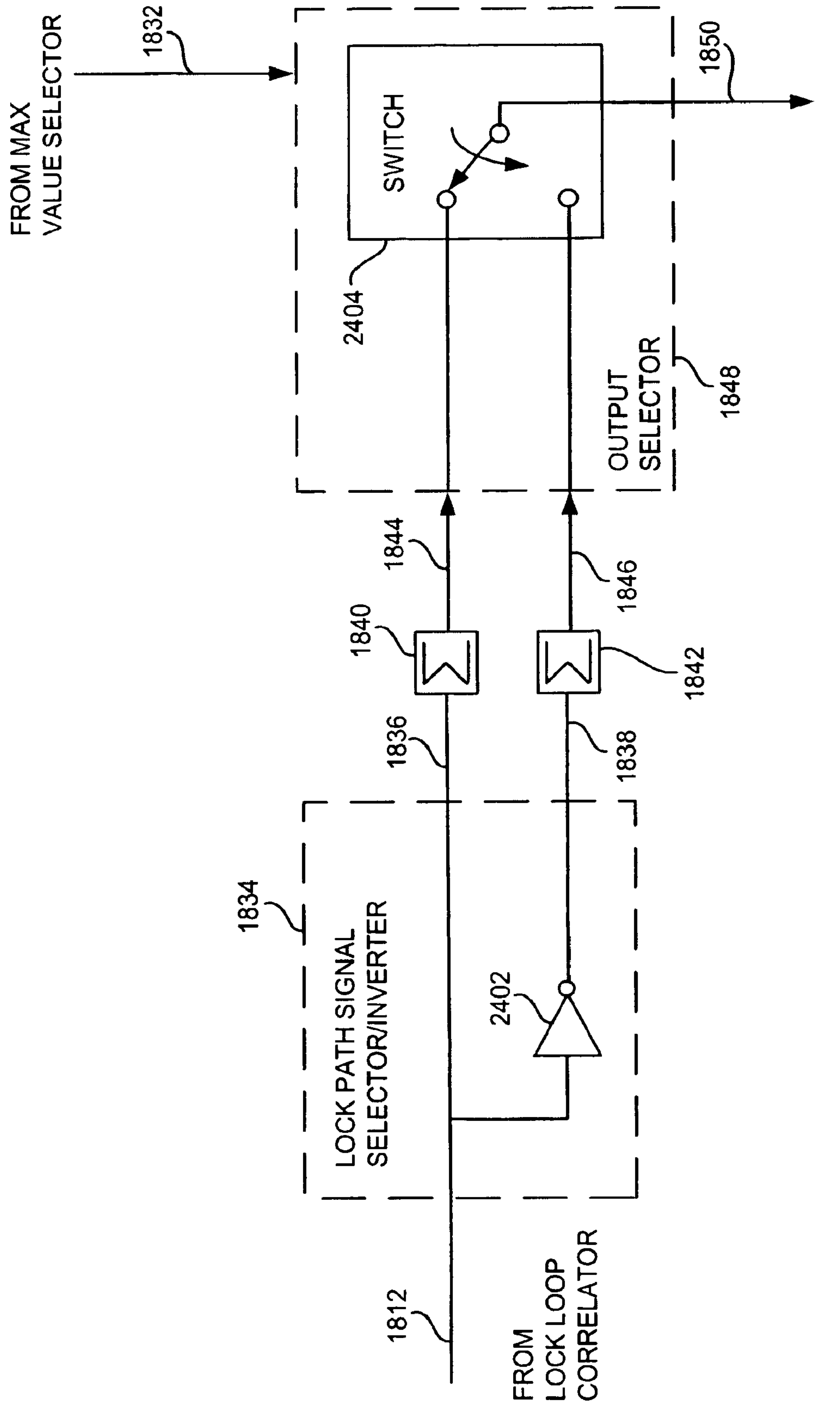
FIG. 24 is a functional diagram of the Lock Path Signal Selector/Inverter and Output Selector of the receiver of FIG. 18, according to an embodiment of the present invention.

FIG. 24 shows an example embodiment of lock path signal selector/inverter 1834 and output selector 1848. In this embodiment, the input (i.e., signal 1812, which is the output of lock loop correlator 1810) is provided directly to output 1836. Input 1812 is also provided to an inverter 2402. The output of inverter 2402 is output 1838 (e.g., which may correspond to a "1" bit). In this example embodiment, assume that the signal has not been modulated by a subcarrier.

In this embodiment, output selector 1848 operates as a switch 2404 that selects, based on signal 1832 (the output of max value selector 1830), whether signal 1850 (also referred to as time base adjustment signal) should be equal to signal 1844 or signal 1846. That is, output selector 1848 dynamically determines which signal 1844 or 1846 to use in the lock loop, as described below. Referring back to FIG. 18, accumulator 1840 adds voltage values (i.e., signal 1836) and provides the sum (i.e., signal 1844) to output selector 1848. Signals 1836 and 1844 are also referred to as a first timing adjustment increment and a second time adjustment increment, respectively. Accumulator 1842 adds voltage values (i.e., signal 1836) and provides the sum (i.e., signal 1846) to output selector 1848. Output selector 1848 receives output 1844 of accumulator 1840, output 1846 of accumulator 1842 and data signal 1832. Based on data signal 1832 (i.e., the output of max value selector 1832), output selector 1848 determines whether signal 1844 or signal 1846 should be used in the feedback loop. For example, if data signal 1832 represents a "0" bit (i.e., received signal 1806 is a non-inverted w-pulse) and output voltage 1844 is positive and output voltage 1846 is negative (meaning delayed template signal 1876 leads where it should be, typically ¼ of a pulse wavelength delayed from received signal 1806), then output 1846 should be fed (via 1850) to lock loop filter 1852. If data signal 1832 represents a "0" bit (e.g., received signal 1806 is a non-inverted w-pulse) and output voltage 1844 is negative and output voltage 1846 is positive (meaning delayed template signal 1876 lags where it should be), then output 1846 should be fed (via 1850) to lock loop filter 1852. If data signal 1832 represents a "1" bit (e.g., received signal 1806 is an inverted w-pulse) and output voltage 1844 is positive and output voltage 1846 is negative (meaning delayed template signal 1876 lags where to should be, precisely ¼ of a pulse wavelength delayed from received signal 1806), then output 1844 should be fed (via 1850) to lock loop filter 1852. If data signal 1832 represents a "1" bit (e.g., received signal 1806 is an inverted w-pulse) and output voltage 1844 is negative and output voltage 1846 is positive (meaning delayed template signal 1876 leads where it should be), then output signal 1844 should be fed (via 1850) to lock loop filter 1852. In the manner discussed above, time base 1856 is adjusted as necessary.

Of course, accumulators 1840 and 1842 are only necessary if more than one pulse (e.g., 100 pulses) is used to represent each data state (e.g., bit or bits). For example, in one embodiment, if 100 pulses are used to represent each bit, then accumulators 1840 and 1842 will each add 100 values (i.e., accumulator 1840 will sum signals 1836 and accumulator 1838 will sum signals 1838) and provide the summation values (signals 1844 and 1846, respectively) to output selector 1848, and then add the next 100 values and provide the summation values to output selector 1848, and so on. If each data state (e.g., bit or bits) is represented by only one pulse, then output signal 1836 and 1838 are provided directly (i.e., without the need for accumulators 1840 and 1842) to output selector 1848.

III.1.B.v.c. Alternative Embodiments

Figure 25:
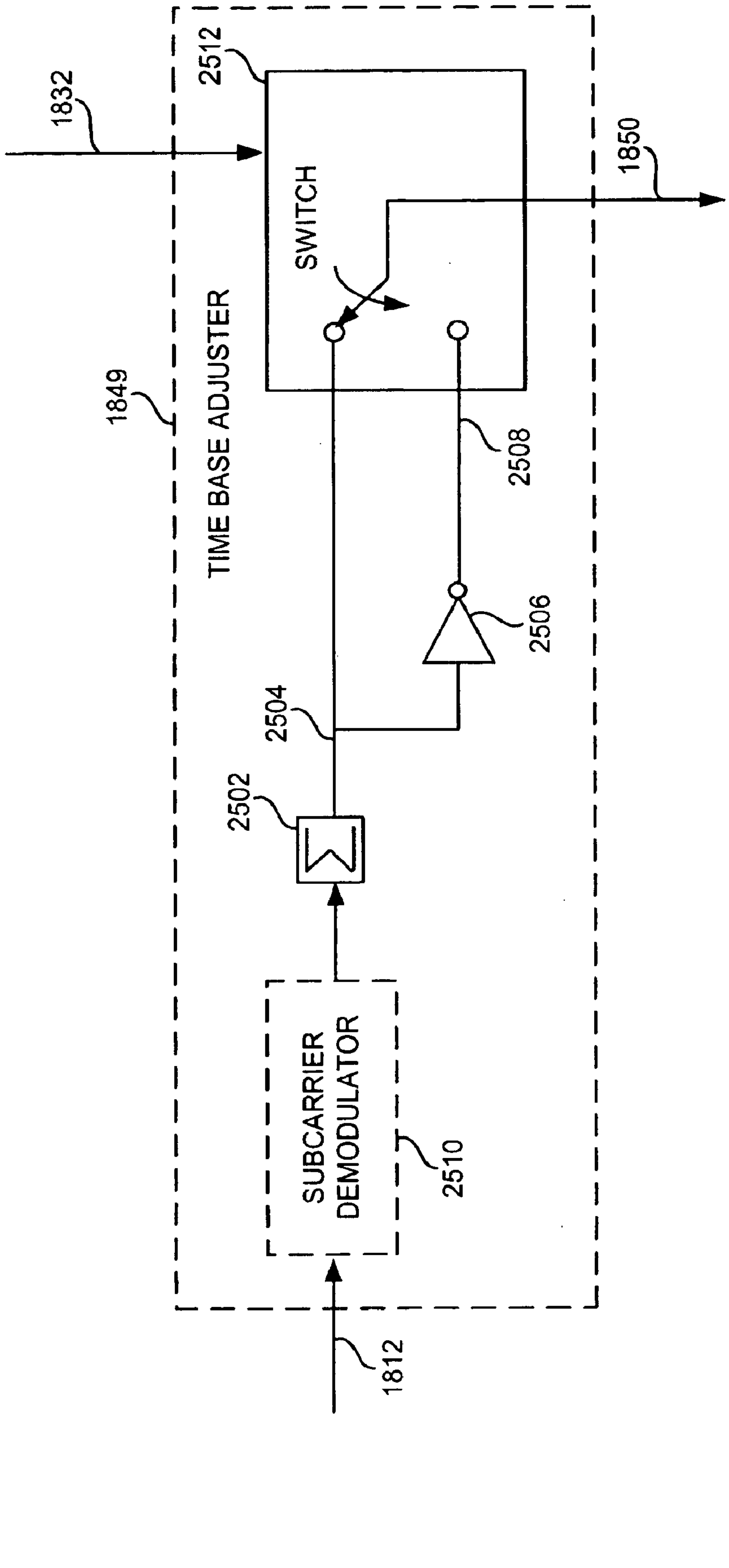
FIG. 25 is a function diagram of a Time Base Adjustor that can be used in an embodiment of the present invention.

In the above discussed embodiment of receiver 1802, lock path signal selector/inverter 1834, accumulators 1840 and 1842, and output selector 1848 can be thought of as being components of time base adjustor 1849 (shown by dotted lines). FIG. 25 shows an alternative embodiment of time base adjustor 1849. In this embodiment, time base adjustor 1849 consists of a summing accumulator 2502, an inverter 2506 and a switch 2512. Assuming 100 pules are used to represent each bit, accumulator 2502 adds the voltage outputs (i.e., signal 1812) of lock loop correlator 1810, and provides a sum value 2504 directly to switch 2512 and to inverter 2506, whose output 2508 is provided to switch 2512. Switch 2512, which also receives output 1832 of data detector 1815, operates substantially the same as switch 2404 (discussed above in the description of FIG. 24), wherein signal 2504 is substantially the equivalent of signal 1844, and wherein signal 2508 is substantially the equivalent of signal 1846.

If subcarrier modulation was used by the transmitter (e.g., transmitter 902) that transmitted received signal 1806, then the alternative time base adjustor 1849 of FIG. 25 also includes a subcarrier demodulator 2510 that performs any necessary subcarrier demodulation prior to accumulator 2502.

Figure 26:
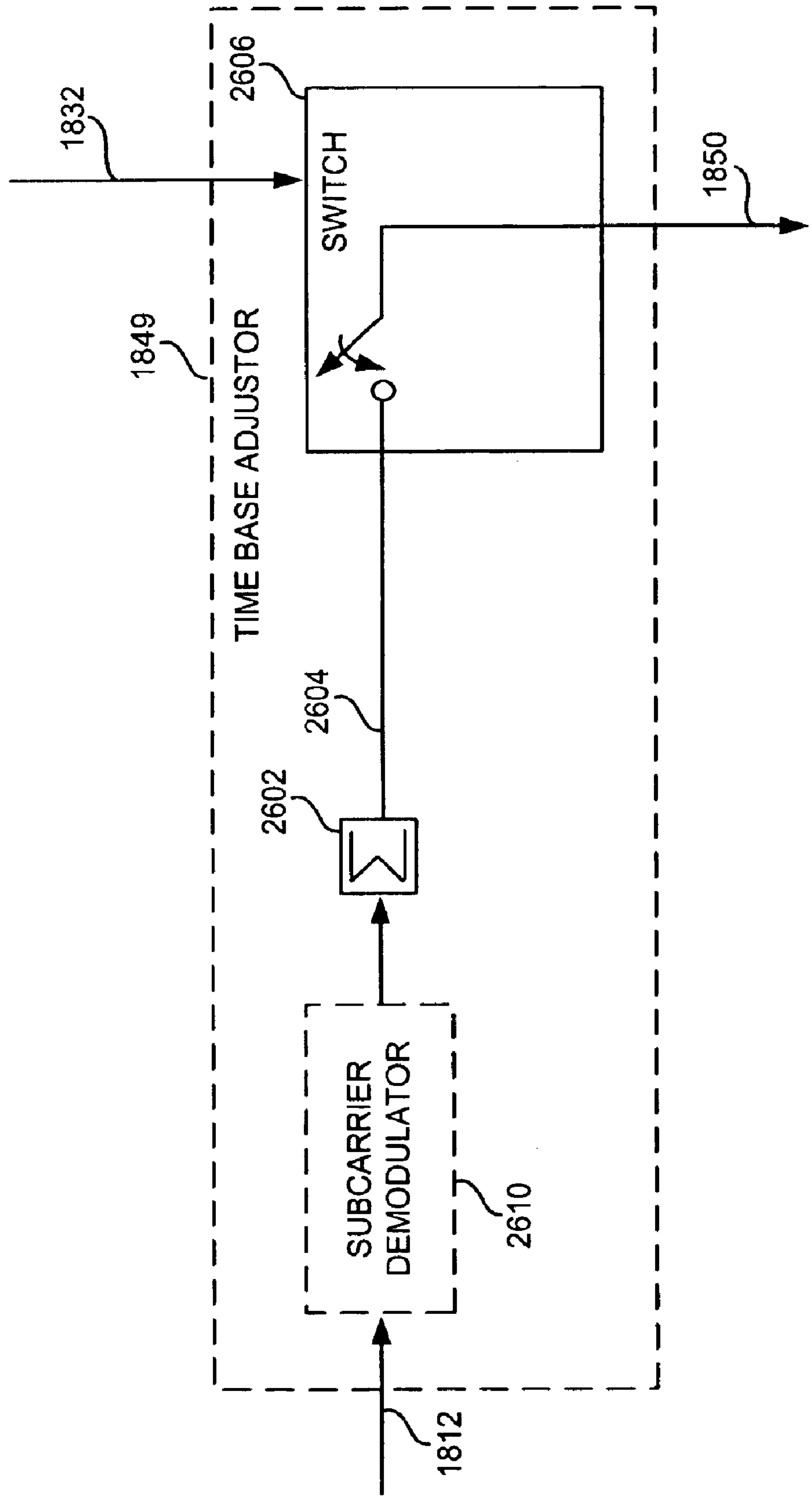
FIG. 26 is a function diagram of another Time Base Adjustor that can be used in an embodiment of the present invention.

FIG. 26 shows an another alternative embodiment of time base adjustor 1849. This embodiment requires the least amount of components, but may not be as time responsive as the previously discussed embodiments. In this embodiment switch 2606 that selects, based on signal 1832 (the output of max value selector 1830), whether signal 1850 should be equal to signal 2604 (which is substantially the equivalent of signal 1844) or whether signal 1850 should be zero (when switch 2604 is open). Referring to FIGS. 18 and 26, accumulator 2602 adds voltage values (i.e., signal 1812) and provides the sum (i.e., signal 2404) to switch 2606. Switch 2606 receives output 2604 of accumulator 2603 and data signal 1832. In an example embodiment, switch 2606 closes when data signal 1832 represents a "0" bit (which corresponds to non-inverted w-pulse(s)), and switch 2606 opens when data signal 1832 represents a "1" bit (i.e., which corresponds to inverted w-pulse(s)). Thus, in this embodiment, the lock loop is only active when one of the two data states is decoded. However, if the probability of receiving the each of the two data states are similar, then this simplified embodiment should provide sufficient adjustments to time base 1856.

More specifically, in this embodiment, when data signal 1832 (i.e., the output of max value selector 1832) represents a "0" bit (i.e., received signal 1806 is a non-inverted w-pulse) and output voltage 2604 is positive (meaning delayed template signal 1876 leads where it should be, precisely ¼ of a pulse wavelength delayed from received signal 1806), then switch 2606 is open and nothing is fed (via 1850) to lock loop filter 1852. If data signal 1832 represents a "0" bit (e.g., received signal 1806 is a non-inverted w-pulse) and output voltage 2604 is negative (meaning delayed template signal 1876 lags where it should be), then switch 2606 is open and nothing fed (via 1850) to lock loop filter 1852. If data signal 2606 is open and nothing is fed (via 1850) to lock loop filter 1852. If data signal 1832 represents a "1" bit (e.g., received signal 1806 is an inverted w-pulse) and output voltage 2604 is positive (meaning delayed template signal 1876 lags where to should be, precisely ¼ of a pulse wavelength delayed from received signal 1806), then switch 2606 is closed and output 2604 is fed (via 1850) to lock loop filter 1852. If data signal 1832 represents "1" bit (e.g., received signal 1806 is an inverted w-pulse) and output voltage 2606 is negative (meaning delayed template signal 1876 leads where it should be), then switch 2606 is closed and output voltage 2604 is fed (via 1850) to lock loop filter 1852. In the manner discussed above, time base 1856 is adjusted.

If subcarrier modulation was used by the transmitter (e.g., transmitter 902) that transmitted received signal 1806, then the alternative time base adjustor 1849 of FIG. 26 also includes a subcarrier demodulator 2610 that performs any necessary subcarrier demodulation prior to accumulator 2602.

III.1.C. Use of a Subcarrier

In the above discussed flip modulation scheme, a first impulse waveform (e.g., pulse 802) can be used to represent a first data state (e.g., a binary "0"), and a second impulse waveform (e.g., inverted pulse 804) can be used to represent a second data state (e.g., a binary "1"). As discussed above, it is often preferable to transmit multiple (e.g., 4, 8 or 100) impulses for each data state. For example, 100 impulses 802 (i.e., a pulse train) may be transmitted to represent a binary "0", and 100 inverted impulses 804 may be transmitted to represent a binary "1".

It is often found desirable to include a subcarrier with the baseband signal to help reduce the effects of amplifier drift and low frequency noise. A subcarrier that can be implemented adjusts modulation according to a predetermined pattern at a rate faster than the data rate. This same pattern is then used by a receiver to reverse the process and restore the original data pattern just before detection. This method permits alternating current (AC) coupling of stages, or equivalent signal processing to eliminate direct current (DC) drift and errors from the detection process. This method, and additional details of the use of a subcarrier, is described in detail in U.S. Pat. No. 5,677,927 to Fullerton et al., which is incorporated herein by reference in its entirely. Preferably, in the present invention, the subcarrier signal used for subcarrier modulation is internally generated by precision timing generator 908 (of transmitter 902) and added to baseband signals (e.g., information signals which may or may not also be coded).

Figures 27A, 27B:
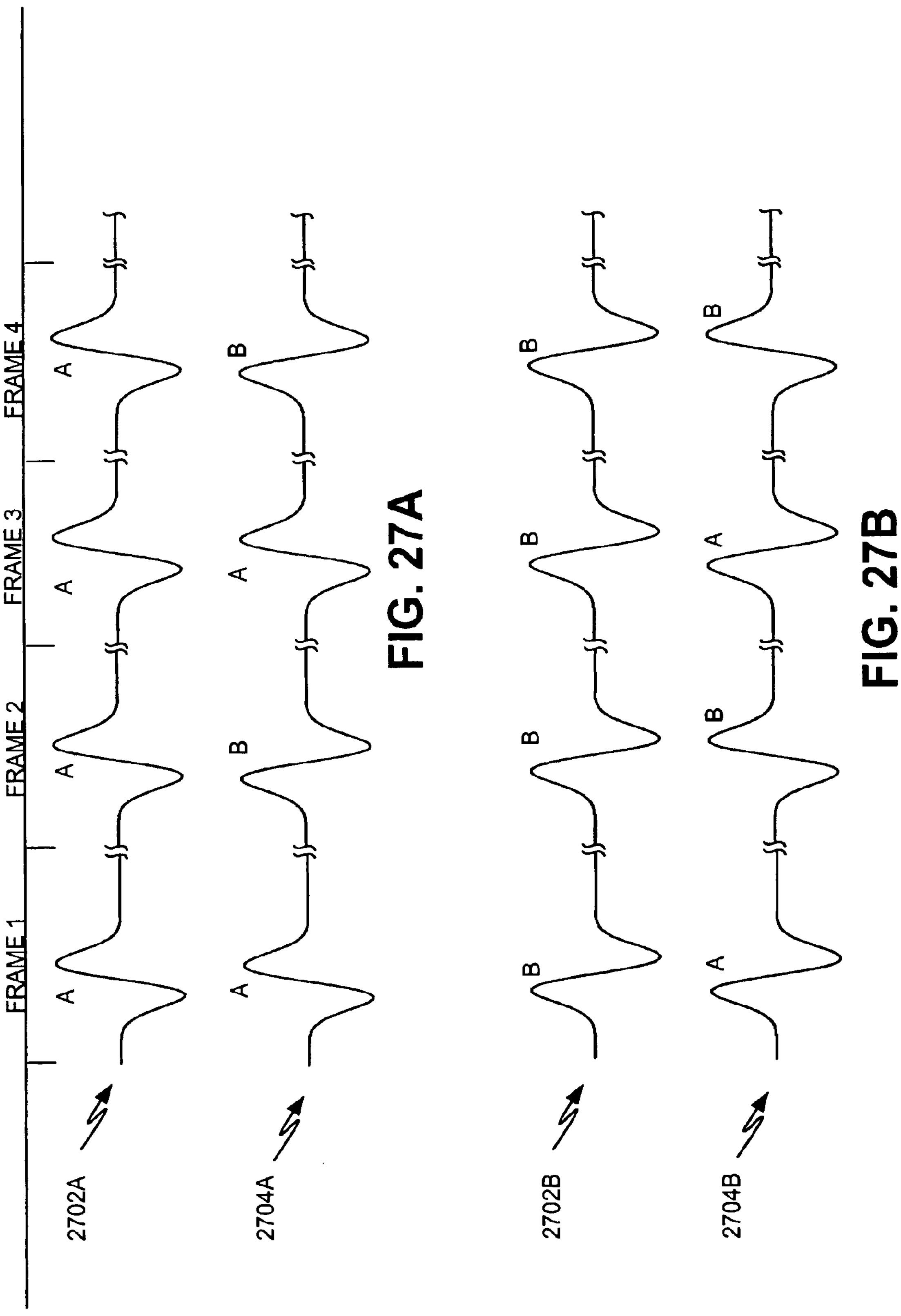
FIG. 27 illustrates signal waveforms that are useful in explaining subcarrier modulation.

An example of subcarrier modulation can be illustrated with reference to FIGS. 27A and 27B. Assume only two transmit states: state A (i.e., impulse 802) associated with data "0"; and state B (i.e., inverted impulse 804) associated with data "1". Also assume that four impulses are to be transmitted for each data state. As shown in FIG. 27A, without subcarrier modulation (and assuming no coding), a signal 2702A consisting of AAAA (i.e., four impulses 802) is transmitted to represent 2702A consisting of AAAA (i.e., four impulses 802) is transmitted to represent a data "0". As shown in FIG. 27B, without subcarrier modulation (or coding), a signal 2702B consisting of BBBB (i.e., four inverse impulses 804) is transmitted to represent a data "1". An example of a subcarrier modulation scheme is to transmit a signal 2704A consisting of ABAB to represent a data "0" (as shown in FIG. 27A) and a signal 2704B consisting of BABA to represent a data "1" (as shown in FIG. 27B). Other possibilities include, but are not limited to, transmitting a signal consisting of AABB (not shown) to represent a data "0" and a signal consisting of BBAA (not shown) to represent a data "1". Of course, if a different number of impulses (e.g., 100 impulses) are used to represent each data state, the patterns discussed above (e.g., ABAB) can be repeated as many times as necessary (e.g., 25 times).

When subcarrier modulation is used, an impulse radio receiver must demodulate (i.e., remove) the subcarrier signal to yield an information signal. An impulse radio receiver is typically a direct conversion receiver with a cross correlator front end in which the front end coherently converts an electromagnetic pulse train of monocycle pulses to a baseband signal in a single stage. The receiver uses the same pattern, that was used to produce the subcarrier modulation, to reverse the process and restore the original data pattern just before data detection. In one embodiment of the present invention, it is the data path signal selector/inverter 1816 of impulse radio receiver 1802 that performs any necessary subcarrier demodulation. More specifically, data path signal selector/inverter 1816 provides its outputs 1818 and 1820 to the correct accumulators 1822 and 1825 so that max value selector 1830 can correctly determine which data state was represented by a train of pulses. Accordingly, the exact structure and function of data path signal selector/inverter 1816 is dependent on the subcarrier modulation pattern that is used by an impulse radio transmitter (e.g., by transmitter 902).

III.2. Flip with Shift Modulation

In another embodiment, what shall be referred to as "flip with shift modulation", or "quadrature flip time modulation"

(QFTM), is used. A simple example of flip with shift modulation can be explained with reference to FIG. 28. In this example, an impulse waveform 2802 is used to represent bits "00", an impulse waveform 2804 is used to represent bits "01", an impulse waveform 2806 is used to represent bits "10" and an impulse waveform 2808 is used to represent bits "11". Notice that waveform 2804 is the inverse or flip of waveform 2802, and that waveform 2808 is the inverse or flip of waveform 2806. Also notice that the only difference between 2802 and 2806, and between 2804 and 2808, is that 2806 and 2808 are shifted, in this example, by a quarter wavelength. By adding this shift, in addition to the flip, the modulation states double as compared to the flip modulation scheme discussed above during the description of FIG. 8.

Waveforms 2802, 2804, 2806 and 2808 (also referred to as impulses) are exemplary waveforms associated with transmitted signals (e.g., signals transmitted through the air from a transmitter to a receiver). Typically, when waveforms 2802, 2804, 2806 and 2808 are received by an antenna of a receiver, the waveforms are modified and resemble waveforms 2812, 2814, 2816 and 2818, respectively. More specifically, for illustration purposes, waveforms 2812, 2814, 2816 and 2818, are substantially the first derivatives of waveform 2802, 2804, 2806 and 2808, respectively.

As described above, impulse radio systems can deliver one or more data bits per pulse. However, impulse radio systems more typically use pulse trains, not single pulses, for each data bit. Thus, a train of pulses 2802 (e.g., 100 pulses 2802) can be used to represent a bits "00", a train of inverted pulses 2804 (e.g., 100 inverted pulses 2804) can be used to represent a bits "01", a train of finely shifted (e.g., shifted by ¼ a wavelength) pulses 2806 (e.g., 100 pulses 2806) can be used to represent a bits "10", and a train of pulse 2808 (e.g., 100 pulses 2808 can be used to represent a bits "11". Pulse trains are often used because of the additional benefits that can be obtained by using more than one pulse to represent one digital information bit, as discussed in more detail above.

III.2.A. Transmitter

A transmitter that is substantially similar to transmitter 902 or transmitter 1702, described above in the discussion of FIGS. 9 and 17, can be used to transmits impulses that are modulated using the above described flip with shift modulation scheme (e.g., to transmit impulses 2802, 2804, 2806 and 2808). For example, referring to FIG. 9, the only significant difference between transmitter 902 and a transmitter capable of transmitting flip and shift modulated impulses (e.g., impulses 2802, 2804, 2806 and 2808) is that precision timing generator 908 will output common trigger signal 920 and enable signals 918 and 919 based on a quadrature modulation scheme rather than a two-state modulation scheme. For example, still referring to FIG. 9, precision timing generator 908 can be modified to additionally produce delayed trigger signals (e.g., by ¼ a wavelength) and/or delayed enable signals 918 and 919 so that the additional impulses (i.e., 2806 and 2808) can be generated (notice that impulses 2802 and 2804 are the same as impulses 802 and 804, respectively). Accordingly, in one embodiment the impulses can be generated as follows: pulse generator 922 generates an output pulse that resembles pulse 2802 in response to receiving both a non-delayed trigger signal 920 and enable signal 918; pulse generator 922 generates an output pulse that resembles 2806 in response to receiving both a delayed (e.g., by a ¼ wavelength) trigger signal 920 and enable signal 918; pulse generator 924 generates an output pulse that resembles pulse 2804 (i.e., a pulse that is the inverse or flip of pulse 2802) in response to receiving a non-delayed trigger signal 920 and enable signal 919; and pulse generator 924 generates an output pulse that resembles pulse 2808 (i.e., a pulse that is the inverse or flip of pulse 2806( in response to receiving a delayed trigger signal 920 and enable signal 919. Alternatively, enable signals 918 and 919 can be delayed instead of, or in addition to, trigger signal 920.

III.2.B. Receiver

Figure 29:
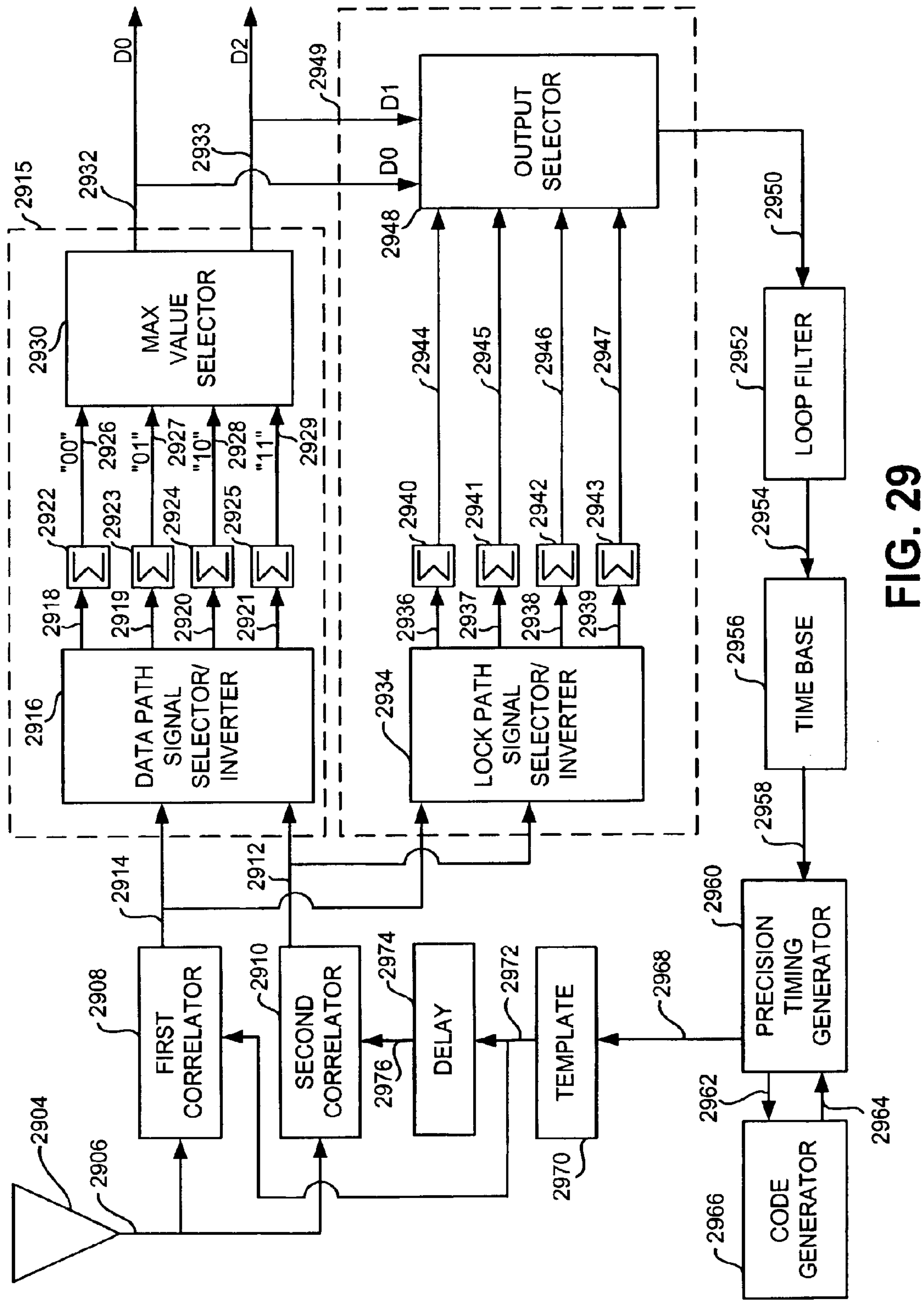
FIG. 29 is a functional diagram of an impulse radio receiver, according to an embodiment of the present invention.

FIG. 29 shows an impulse radio receiver 2902, according to an embodiment of the present invention, that can be used to receive QFTM modulated signals. Receiver 2902 includes an antenna 2904 for receiving a propagated impulse radio signal.

Received signal 2906 is input to a first cross correlator 2908 (also called first sampler 2908) and a second correlator 2910. By correlating received signal 2906 with a template signal 2972, discussed in more detail below, first correlator 2908 produces a first baseband output signal 2914 (also referred to as first correlator output 2914). By correlating received signal 2906 with a delayed template signal 2976, discussed in more detail below, second correlator 2910 produces a second baseband output signal 2912 (also referred to as second correlator output 2912). Each correlator 2908 and 2910 ideally comprises a multiplier followed by a short term integrator to sum the multiplied product over the pulse interval.

Receiver 2902 also includes a precision timing generator 2960, which receives a periodic timing signal 2958 from a receiver time base 2956. Time base 2956 is adjustable and controllable in time, frequency, and/or phase, as required by the lock loop (described below) in order to lock on the received signal 2906. Precision timing generator 2960 provides synchronization signal 2962 to an optional code generator 2966 and receives a code control signal 2964 (also referred to as coding signal 2964) from optional code generator 2966. Precision timing generator 2960 utilizes periodic timing signal 2958 and optional code control signal 2964 to produce a (coded) timing trigger signal 2968. Template generator 2970 (also referred to as a pulse generator 2970) is triggered by (coded) timing trigger signal 2968 and produces a train of template signal pulses 2972 ideally having waveforms substantially equivalent to each pulse of received signal 2906.

If code generator 2966 is used, then the code for receiving a given signal is the same code utilized by the originating transmitter to generate the propagated signal. Thus, the timing of template pulse train 2972 (also referred to as template signal 2972) essentially matches the timing of those pulses (of received signal pulse train 2906) that were not delayed during modulation, allowing received signal 2906 to be synchronously sampled by first correlator 2908. First baseband output 2914 of first correlator 2908 is provided to a data path signal selector/inverter 2916 and a lock path signal selector/inverter 2934, each of which is explained in more detail below.

Template pulse train 2972 is also provided to a delay 2974 which outputs a delayed template signal 2976. The delay caused by delay 2974 is precisely the delay that is used in the modulation scheme (e.g., a quarter wavelength) to create the additional data states. Thus, the timing of delayed template pulse train 2976 (also referred to as delayed template signal 2972) essentially matches the timing of those pulses (of received signal pulse train 2906) that were deliberately offset (i.e., delayed) during modulation. Second baseband output 2912 of second correlator 2910 is also coupled to data path signal selector/inverter 2916 and lock path signal selector/inverter 2934.

Before the data path signal selector/inverter 2916 and a lock path signal selector/inverter 2934 are explained, additional details of the correlation process are provided.

III.2.B.i. Correlation Process

Figure 30A:
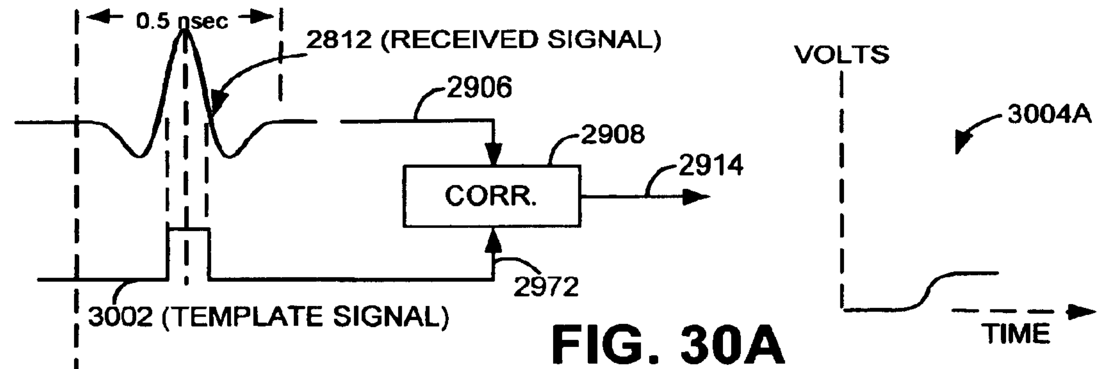
FIGS. 30A–30H illustrate the correlation functions associated with the receiver of FIG. 29, wherein a simplified template signal is used.
Figure 30B:
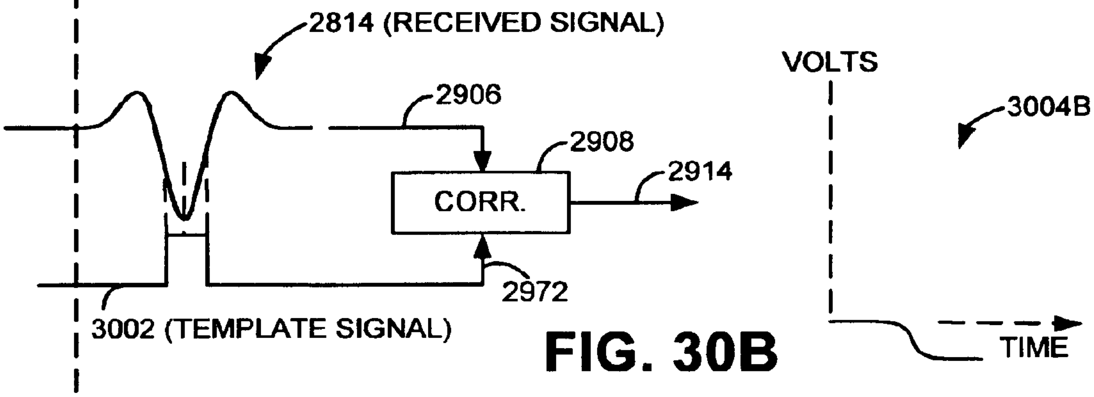
Figure 30C:
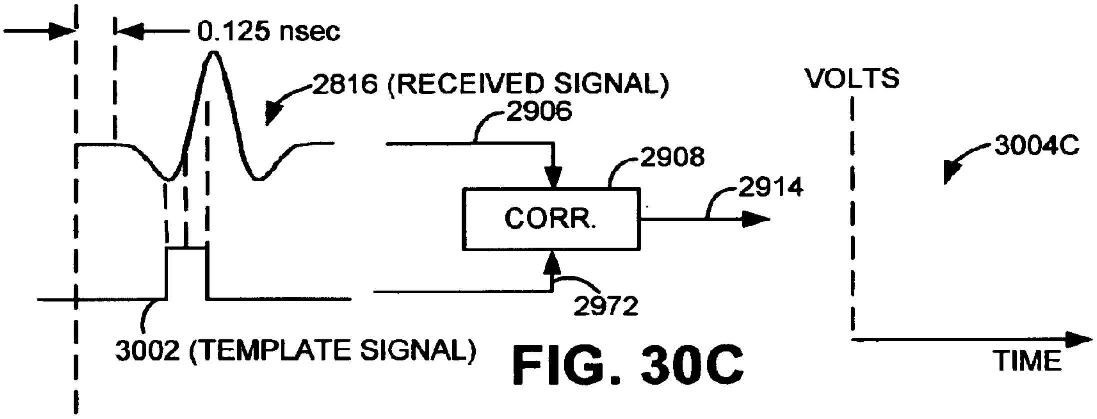
Figure 30D:
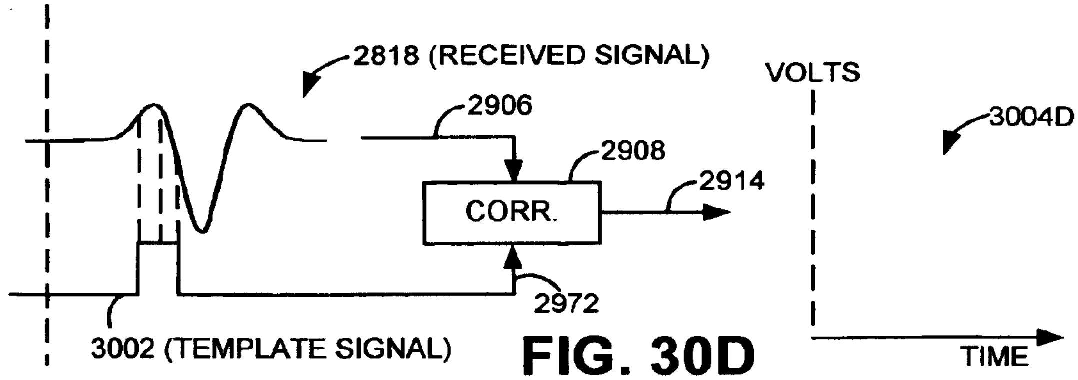

FIGS. 30A, 30B, 30C and 30D, show example results of the correlation process performed by first correlator 2908, where simple square wave pulses 3002 are used as template signal 2971. As shown, the center of square wave pulse 3002 is aligned with the maximum amplitude point of the received signal waveform when received signal 2906 consists of a non-delayed and non-inverted w-pulse 2812 (as shown in FIG. 30A) or the minimum amplitude point of the received signal waveform when received signal 2906 consists of an non-delayed and inverted w-pulse 2814 (as shown in FIG. 30B). However, notice that when received signal 2906 consists of a delayed and non-inverted w-pulse 2816 (as shown in FIG. 30C) or a delayed and inverted w-pulse 2818 (as shown in FIG. 30D), the center of square wave 3002 is aligned with a zero crossing of the received waveform.

Referring first to FIG. 30A, a received pulse 2812 (i.e., of received signal 2906) and a template pulse 3002 (i.e., of template signal 2972) are provided to first correlator 2908. Notice that when the template pulse 3002 is aligned with the center of received pulse 2812, output 2914 of first correlator 2908 is a positive voltage (as shown by signal 3004A).

Turning to FIG. 30B, a received pulse 2814 (i.e., of received signal 2906) and a template pulse 3002 (i.e., of template signal 2972) are provided to first correlator 2908. Notice that when the template pulse 3002 is aligned with the center of received inverted pulse 2814, output 2914 of first correlator 2908 is a negative voltage (as shown by signal 3004B).

Turning to FIG. 30C, a received pulse 2816 (i.e., of received signal 2906) and a template pulse 3002 (i.e., of template signal 2972) are provided to first correlator 2908. Notice that when the template pulse 3002 is aligned with a zero crossing of received pulse 2816, output 2914 of first correlator 2908 is theoretically zero (as shown by signal 3004C).

Next, turning to FIG. 30D, a received inverted pulse 2828 (i.e., of received signal 2906) and a template pulse 3002 (i.e., of template signal 2972) are provided to first correlator 2908. Notice that when the template pulse 3002 is aligned with a zero crossing of received inverted pulse 2818, output 2914 of first correlator 2908 is theoretically zero (as shown by signal 3004D).

Figures 30E, 30F, 30G, 30H:
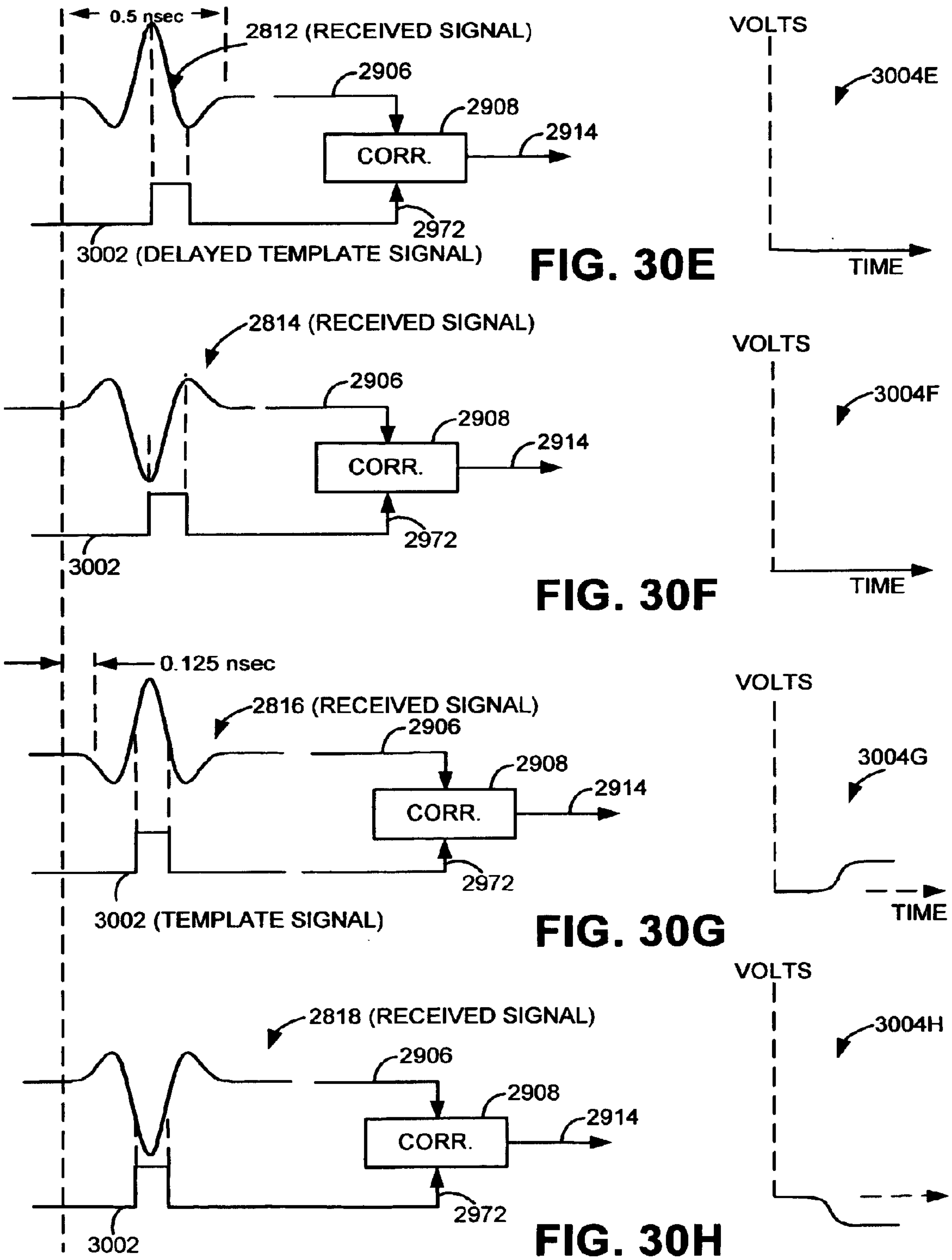

FIGS. 30E, 30F, 30G and 30H, show example results of the correlation process performed by second correlator 2910, where simple square wave pulses 3006 are used as delayed template signal 2976. As shown, the center of square wave pulse 3006 is aligned with the maximum amplitude point of the received signal waveform when received signal 2906 consists of a delayed and non-inverted w-pulse 2816 (as shown in FIG. 30G) or the minimum amplitude point of the received signal waveform when received signal 2906 consists of a delayed and non-inverted and inverted w-pulse 2818 (as shown in FIG. 30H). However, notice that when received signal 2906 consists of a non-delayed and non-inverted w-pulse 2812 (as shown in FIG. 30E) or a non-delayed and inverted w-pulse 2814 (as shown in FIG. 30F), the center of square wave 3006 is aligned with a zero crossing of the received waveform.

Specifically referring to FIG. 30E, a received pulse 2812 (i.e., of received signal 2906) and a template pulse 3006 (i.e., of delayed template signal 2976) are provided to second correlator 2910. Notice that when the template pulse 3006 is aligned with a zero crossing of received pulse 2812, output 2912 of second correlator 2910 is theoretically zero (ash shown by signal 3004E).

Turning to FIG. 30F, a received inverted pulse 2814 (i.e., of received signal 2906) and a template pulse 3006 (i.e., of delayed template signal 2976) are provided to second correlator 2910. Notice that when the template pulse 3006 is aligned with a zero crossing of received inverted pulse 2814, output 2912 of second correlator 2910 is theoretically zero (as shown by signal 3004F).

Turning to FIG. 30G, a received pulse 2816 (i.e., of received signal 2906) and a template pulse 3006 (i.e., of delayed template signal 2976) are provided to second correlator 2910. Notice that when the template pulse 3006 is aligned with the center of received pulse 2816, output 2912 of second correlator 2910 is a positive voltage (as shown by signal 3004G).

Next, turning to FIG. 30H, a received pulse 2818 (i.e., of received signal 2906) and a template pulse 3006 (i.e., of delayed template signal 2976) are provided to second correlator 2910. Notice that when the template pulse 3006 is aligned with the center of received pulse 2818, output 2912 of second correlator 2910 is a negative voltage (as shown by signal 3004H).

In summary, the output 2914 of first correlator 2908: is a positive voltage (as shown by signal 3004A) when the received pulse is a non-delayed and non-inverted pulse 2812; is a negative voltage (as shown by signal 3004B) when the received pulse is a non-delayed and inverted pulse 2814; is substantially zero (as shown by signal 3004C) when the received pulse is a delayed and non-inverted pulsed 2816; and is also substantially zero (as shown by signal 3004D) when the received pulse is a delayed and inverted pulse 2818. The output 2912 of second correlator 2910: is substantially zero (as shown by signal 3004E) when the received pulse is a non-delayed and non-inverted pulsed 2812; is also substantially zero (as shown by signal 3004F) when the received pulse is a non-delayed and inverted pulse 2814; is a positive voltage (as shown by signal 3004G) when the received pulse is a delayed and non-inverted pulse 2816; is a negative voltage (as shown by signal 3004H) when the received pulse is a delayed and inverted pulse 2818.

Note that delay 2974 could alternatively be placed in the template path of first correlator 2908 such that the second correlator 2910 could operate on the leading zero crossing of receive pulse 2812. When this operation is desired, an inversion is required in the control loop signal path to maintain lock.

III.2.B.ii. Data Path Signal Selector/Inverter

In general, data path signal selector/inverter 2916 separates first baseband signal 2914 and second baseband signal 2910 into multiple signal paths and reverses the polarity of specific signal paths so that data detection can be accomplished. This is illustrated in more detail below. Additionally, if subcarrier modulation was used by the transmitter (e.g., by transmitter 902) that transmitted received signal 2906, then data path signal selector/inverter 2916 can also perform any necessary subcarrier demodulation.

FIG. 3 shows an example embodiment of data path signal selector/inverter 2916. In this embodiment, inputs 2914 and 2912 (i.e., the base band outputs 2914 and 2912 of first correlator 2908 and second correlator 2910, respectively) are hard wired to outputs 2918 and 2920, respectively (e.g., which may correspond to bits "00" and bits "10", respectively). Inputs 2914 and 2912 are also provided to inverters 3102 and 3104, respectively. The output of inverter 3102 is output 2919 (e.g., which may correspond to bits "01"). The output of inverter 3104 is output 2921 (e.g., which may correspond to bits "11"). Outputs 2918, 2919, 2920 and 2921 are also referred to as a first data state signal, a second data state signal, a third data state signal, and a forth data state signal, respectively. In this example embodiment, there is no subcarrier demodulation performed by data path signal selector/inverter 2916. However, if subcarrier modulation is used (i.e., by the transmitter of the received propagated signal) then data path signal selector/inverter 2916 can be used to perform subcarrier demodulation. Another example of subcarrier modulation and demodulation is discussed in the description of FIGS. 33A and 33B below.

In this embodiment, data path signal selector/inverter 2916 outputs signals 2918, 2919, 2920 and 2921 which represent voltages that correspond to possible data states. For example, in one embodiment signal 2918 corresponds to bits "00", signal 2919 corresponds to bits "01", signal 2920 corresponds to bits "10", and signal 2921 corresponds to a bits "11". Signals 2918, 2919, 2920 and 2921 are provided to a summing accumulators 2922, 2923, 2924 and 2925, respectively (as shown in FIG. 29). At the end of an integration cycle, max value selector 2930 compares summation outputs 2926, 2927, 2928 and 2929 of accumulators 2922, 2923, 2924 and 2925, to determine, for example, if the data bits (associated with the received pulses) are "00","01", "10" or "11". Of course, accumulators 2922, 2923, 2924 and 2925 are only necessary if more than one pulse (e.g., 4, 8 or 100 pulses) are used to represent each data state (e.g., bits). For example, if 100 pulses are used to represent each bit pair, then accumulators 2922, 2923, 2924 and 2925 will each add 100 values (i.e., accumulator 2922 will sum signals 2918, accumulator 2923 will sum signals 2919, and so on) and provide the summation values (signals 2926, 2927, 2928 and 2929, respectively) to max value selector 2930, and then add the next 100 values and provide the summation values to max value selector 2930, and so on. If each data state (e.g., bit pair) is represented by only one pulse, then output signals 2918, 2919, 2920 and 2921 are provided directly (i.e., without the need for accumulators 2922, 2923, 2924 and 2925) to max value selector 2930.

In the above discussed embodiment of receiver 2902, data path signal selector/inverter 2916, accumulators 2922, 2923, 2924 and 2925, and max value selector 2930 can be thought of as being components of a data detector 2915 (shown by dotted lines). One embodiment of data detector 2915 has been explained in detail above. The exact structure of data detector 2915 can be modified and simplified while still being within the spirit and scope of the present invention.

III.2.Biii. Max Value Selector

Max value selector 2930 determines the data states (e.g., bits) that a pulse, or a plurality of pulses (e.g., 100 pulses), represent. For example, assuming that 100 pulses of received signal 2906 are used to represent each data bit, max value selector 2930 makes a decision whether each 100 pulses represent bits "00", "01", "10" or "11". Max value selector 2930 will most likely make this decision by determining which summation output 2926, 2927, 2928 or 2929 (also referred to as data state sums) is greatest.

III.1.B.iv. Lock Loop Function

Referring to FIG. 29, it is important that the timing of template pulse trains 2972 and 2976 match the timing of received signal pulse train 2906 so that received signal 2906 can be synchronously sampled by first correlator 2908 and second correlator 2910. Accordingly, a lock loop (also referred to as a control loop) is used to generate a time adjustment signal 2950 and an error signal 2954 that corrects any drifts in time base 2956. More specifically, a control loop including lock loop filter 2952, time base 2956, precision timing generator 2960, template generator 2970, delay 2974 (sometimes), first correlator 2908 or second correlator 2910, lock path signal selector/inverter 2934 and output selector 2948, is used to generate error signal 2954. Error signal 2954, which is produced by filtering time adjustment signals 2950, provides adjustments to the adjustable time base 2956 to time position periodic timing signal 2958 in relation to the position of received signal 2906. The function of the lock loop is described in more detail, below.

III.2.B.iv.a. Lock Loop Correlation

Received signal 2906 is input to first correlator 2908 and second correlator 2910. As described above, first correlator 2908 correlates received signal 2906 with template signal 2972, and second correlator 2910 correlates received signal 2906 with delayed template signal 2976. The delay caused by delay 2974 is the same as the delay used in the QFTM modulation scheme (e.g., a quarter wavelength). The delay is precisely selected such that the output of second correlator 2910 is zero when received signal 2906 consists of non-delayed pulses (e.g., w-pules 2912 is inverted w-pules 2914) and received signal 2906 is synchronized with non-delayed template 2972. Put in other words, the modulation delay (and the delay of delay 2974) is precisely selected such that second correlator 2910 samples received signal 2906 at a zero crossing when a received signal 2906 consisting of non-delayed pulses is synchronized with non-delayed template signal 2972. This will cause the output of first correlator 2908 to be zero when received signal 2906 consists of delayed pulses (e.g., delayed w-pulse 2816 or delayed inverted w-pulse 2818) and received signal 2906 is synchronized with delayed template signal 2976.

Figure 28:
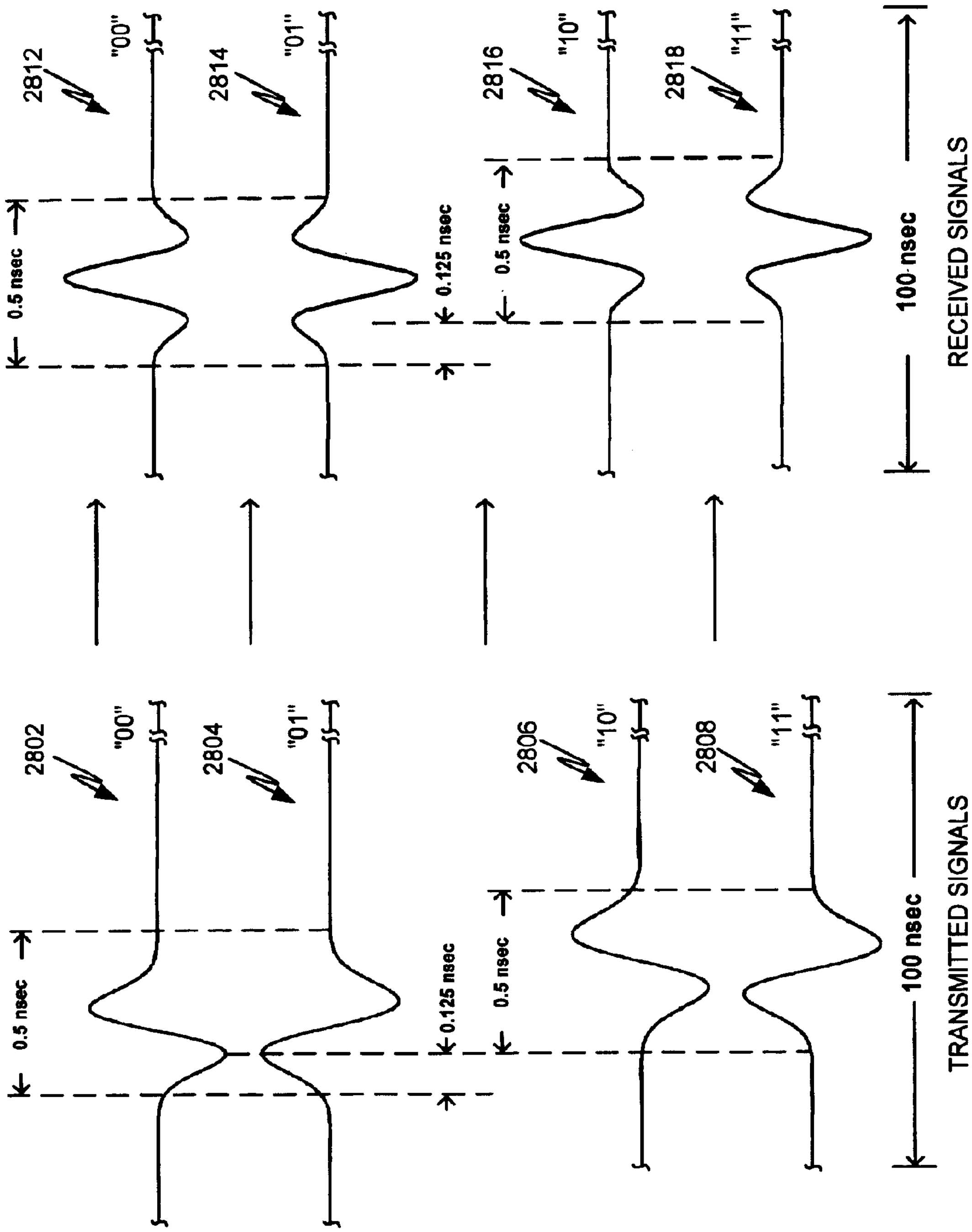
FIG. 28 illustrates signal waveforms that are useful in explaining a modulation scheme according to an embodiment of the present invention.

For example, in one embodiment, delay 2974 delays template signal 2972 by a quarter of a pulse width. Thus, if the pulse width of each pulse is 0.5 nsec (as shown in FIG. 28), then delay 2874 delays template signal 2872 by 0.125 nsec (i.e., 0.5/4=0.125). As discussed above, this will cause output 2912 of second correlator 2910 to be zero when template signal 1872 is synchronous with a received signal 2906 consisting of non-delayed pulses. However, when template signal 2972 begins to lag or lead a received signal 2906 consisting of non-delayed pulses, output 2912 of second correlator 2910 will be a voltage that is fed to lock path signal selector/invertor 2934 and used to correct time base 2956. Similarly, this will cause output 2914 of first correlator 2908 to be zero when delayed template signal 2976 is synchronous with a received signal 2906 consisting of delayed pulses. However, when delayed template signal 2976 begins to lag or lead a received signal 2906 consisting of delayed pulses, output 2914 of first correlator 2908 will be a voltage that is fed to lock path signal selector/inverter 2934 and used to correct time base 2956.

More specifically, in this embodiment: when template signal 2972 lags a received signal 2906 that consists of a non-delayed non-inverted pulse (e.g. w-pusle 2812), then output 2912 of second correlator 2912 will be a negative voltage; when template signal 2972 lags a received signal 2906 that consists of a non-delayed inverted pusle (e.g., inverted w-pulse 2814), then output 2912 of second correlator 2910 will be a positive voltage; when template signal 2972 leads a received signal 2906 that consists of a non-delayed non-inverted pulses (e.g., w-pulse 2812), then output 2912 of second correlator 2910 will be a positive voltage; and when template signal 2972 leads a received signal 2906 that consists of a non-delayed inverted pulse (e.g., inverted w-pulse 2814), then output 2912 of second correlator 2910 will be a negative voltage.

Additionally, in this embodiment: when template signal 2972 lags a received signal 2906 that consists of a delayed non-inverted pulse (e.g., delayed w-pulse 2816), then output 2914 of first correlator 2908 will be a positive voltage; when template signal 2972 lags a received signal 2906 that consists of a delayed inverted pusle (e.g., delayed inverted w-pulse 2818), then output 2914 of first correlator 2908 will be a negative voltage; when template signal 2972 leads a received signal 2906 that consists of a delayed non-inverted pulses (e.g., delayed w-pulse 2816), then output 2914 of first correlator 2908 will be a negative voltage; and when template signal 2972 leads a received signal 2906 that consists of a delayed inverted pulse (e.g., delayed inverted w-pulse 2818), then output 2914 of first correlator 2908 will be a positive voltage.

Assuming time base 2956 has a positive voltage to frequency transfers function (i.e., a positive voltage causes an increase in frequency, and a negative voltage causes a decrease in frequency), to correct time base 2956 error signal 2954 (and thus time adjustment signal 2950) should be a positive (+) voltage when template signal 2972 lags received signal 2906, and error signal 2954 should be a negative (–) voltage when template signal 2972 leads received signal 2906. If time base 2956 has an inverse (or negative) voltage to frequency transfer function, to correct time base 2956 error signal 2954 (and thus time adjustment signal 2950) should be a negative (–) voltage when template signal 2972 lags received signal 2906, and error signal 2954 should be a positive (+) voltage when template signal 2972 leads received signal 2906.

In FIG. 29, error signal 2954 is shown as being provided to time base 2956. However, it should be noted that time base 2956 can be implemented as part of precision timing generator 2960. In such a case, error signal 2954 can be provided directly to precision timing generator 2960. Alternatively, even if a time base 2956 is independent of precision timing generator 2960, error signal 2954 can be provided directly to precision timing generator 2960. When is important is that error signal 2954 is used to synchronize receiver 2902 with received impulse radio signal 2906 such that first correlator 2908 and second correlator 2910 sample received impulse radio signal 2906 at substantially optimal times for data detection and error correction.

III.2.B.iv.b. Lock Path Signal Selector/Inverter and Output Selector

In general, lock path signal selector/inverter 2934 separates outputs 2914 and 2912 of first correlator 2908 and second correlator 2910 into multiple signal paths and reverses the polarity of specific signal paths, one of which is used to correct drifts in time base 2956. This is illustrated in more detail below. Additionally, if subcarrier modulation was used by the transmitter (e.g., by transmitter 902) that transmitted received signal 2906, then lock path signal selector/inverter 2934 also performs any adjustment necessary due to the subcarrier modulation.

Figure 31:
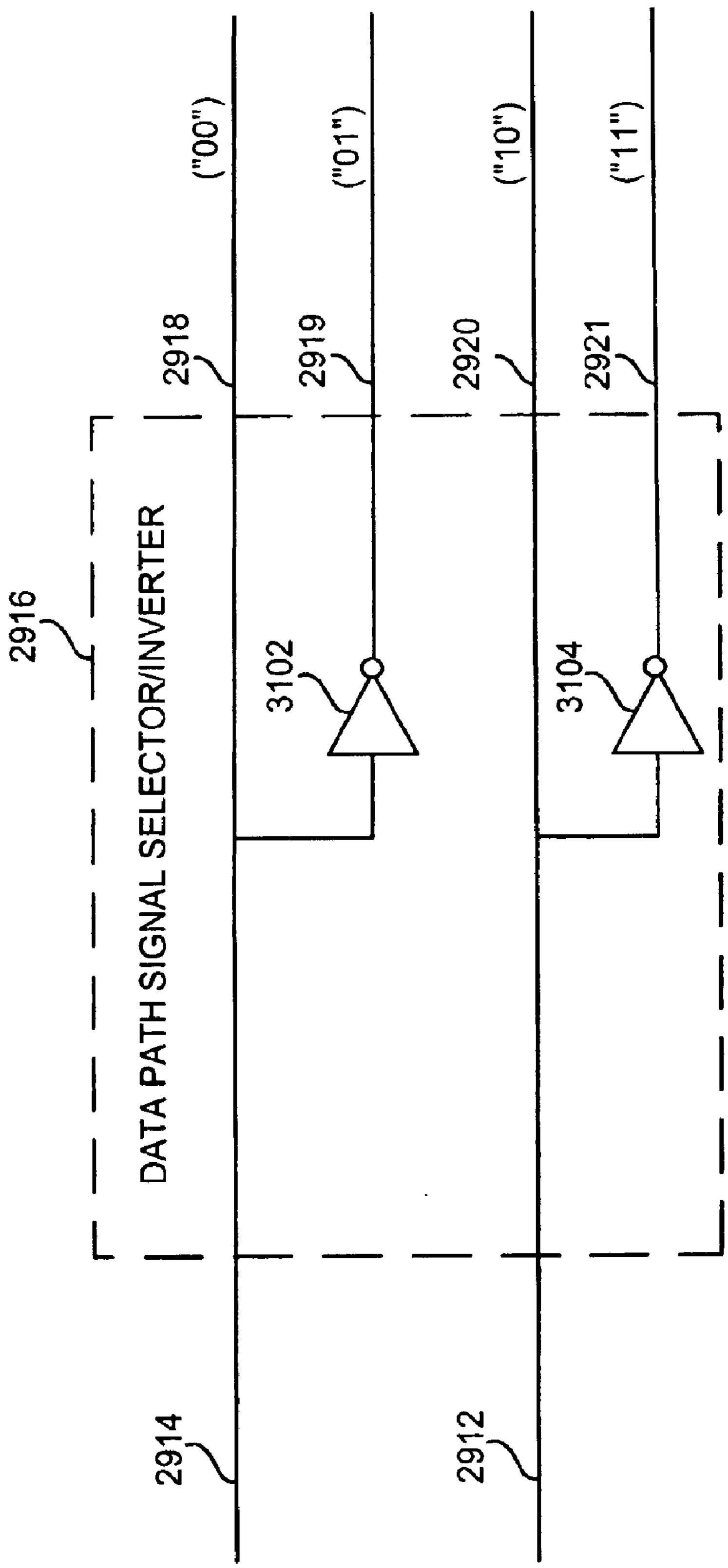
FIG. 31 is a functional diagram of the Data Path Signal Selector/Inverter of the receiver of FIG. 29, according to an embodiment of the present invention.
Figure 32:
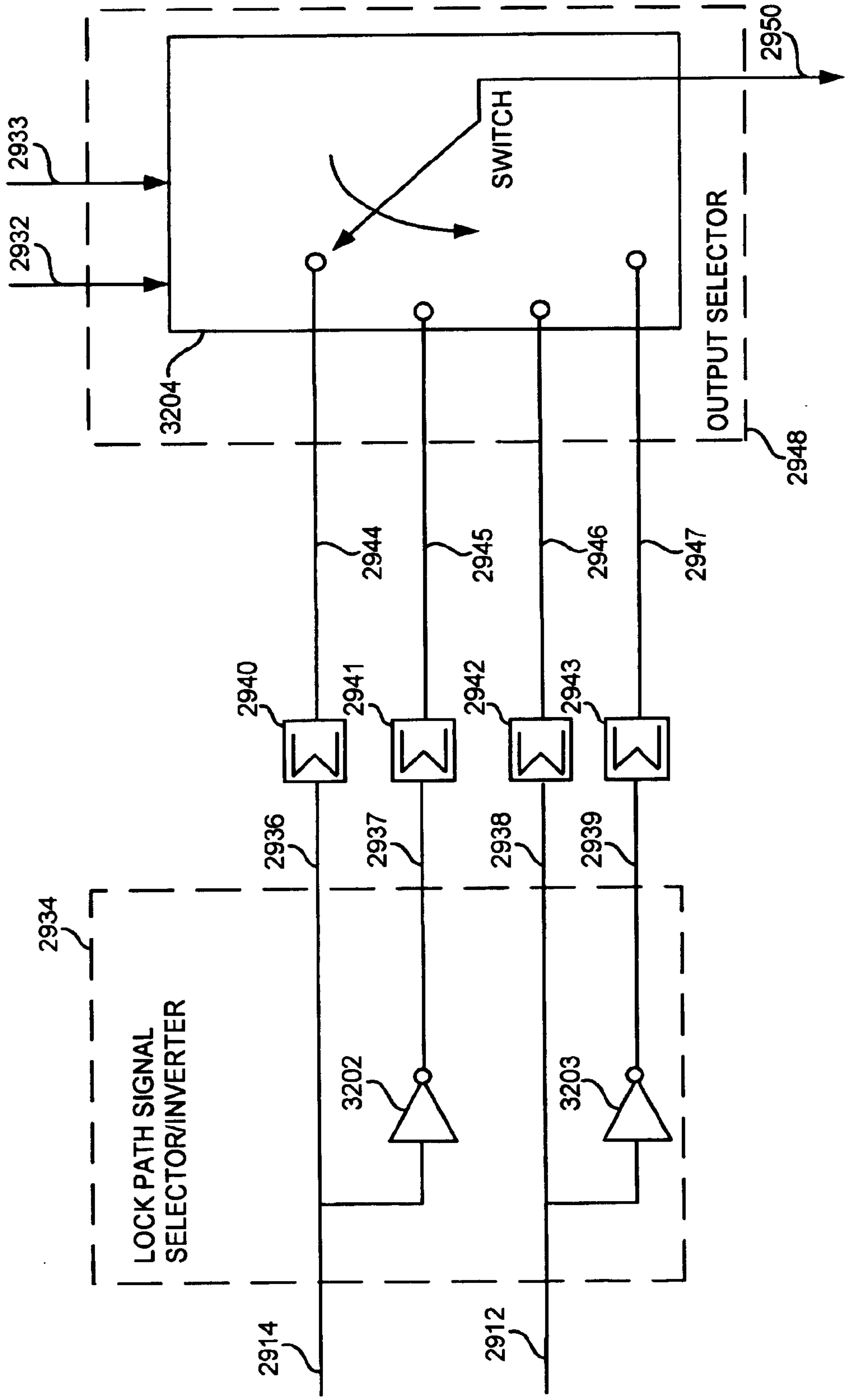
FIG. 32 is a functional diagram of the Lock Path Signal Selector/Inverter and the Output Selector of the receiver of FIG. 29, according to an embodiment of the present invention.

FIG. 31 shows an example embodiment of lock path signal selector/inverter 2934 and output selector 2948. In this embodiment, inputs 2914 and 2912 (i.e., the base band outputs of first correlator 2908 and second correlator 2910, respectively) are hard wired to outputs 2936 and 2938, respectively. Inputs 2914 and 2912 are also provided to inverters 3302 and 3303, respectively. The output of inverter 3302 is output 2937. The output of inverter 3203 is output 2939. In this example embodiment, assume that the signal has not been modulated by a subcarrier.

In this embodiment, output selector 2948 operates as a switch 3204 that selects, based on signals 2932 and 2933 (the outputs of max value selector 2930), whether signal 2950 (also referred to as time base adjustment signal) should be equal to signal 2944, 2945, 2946 or 2947. That is, output selector 2948 dynamically determines which signal 2944, 2945, 2946 or 2947 to use in the lock loop, as described below. Signals 2936, 2937, 2938 and 2939 are also referred to as a first timing adjustment increment, a second time adjustment increment, a third timing adjustment increment, and a forth timing adjustment increment, respectively. Accumulators 2940, 2941, 2942 and 2943 add voltage values (i.e., signals 2936, 2937, 2938 and 2939, respectively) and provide the sums (i.e., signals 2944, 2945, 2946 and 2947, respectively) to output selector 2948. Output selector 2948 receives outputs 2944, 2945, 2946 and 2947, and data signals 2932 and 2933 (also referred to collectively as a data signal). Based on data signals 2932 and 2933 (e.g., the outputs of max value selector 2932), output selector 2948 determines whether signal 2944, 2945, 2946 or 2947 should be used in the feedback loop. For example, if data signal 2932 represents bits "00" (i.e., received signal 2906 is a non-delayed non-inverted w-pulse) and output voltage 2946 is positive and output voltage 2947 is negative (meaning template signals 2972 and 2976 lead where they should be), then output 2947 should be fed (via 2950) to lock loop filter 2952. If data signal 2932 represents bits "00" (i.e., received signal 2906 is a non-delayed non-inverted w-pulse) and output voltage 2946 is negative and output voltage 2947 is positive (meaning template signals 2972 and 2976 lag where they should be), then output 2947 should be fed (via 2950) to lock loop filter 2952. If data signal 2932 represents bits "01" (i.e., received signal 2906 is a non-delayed inverted w-pulse) and output voltage 2946 is positive and output voltage 2947 is negative (meaning template signals 2972 and 2976 lag where they should be), then output 2946 should be fed (via 2950) to lock loop filter 2952. If data signal 2932 represents bits "01" (i.e., received signal 2906 is a non-delayed inverted w-pulse) and output voltage 2946 is negative and output voltage 2947 is positive (meaning template signals 2972 and 2976 lead where they should be), then output signal 2946 should be fed (via 2950) to lock loop filter 2952. In the manner discussed above, output selector 2948 operates to adjust time base 2956 when non-delayed pulses are received.

If data signal 2932 represents bits "10" (i.e., received signal 2906 is a delayed non-inverted w-pulse) and output voltage 2944 is positive and output voltage 2945 is negative (meaning template signals 2972 and 2976 lag where they should be), then output 2944 should be fed (via 2950) to lock loop filter 2952. If data signal 2932 represents bits "10" (i.e., received signal 2906 is a delayed non-inverted w-pulse) and output voltage 2944 is negative and output voltage 2945 is positive (meaning template signals 2972 and 2976 lead where they should be), then output 2944 should be fed (via 2950) to lock loop filter 2952. If data signal 2932 represents bits "11" (i.e., received signal 2906 is a delayed inverted w-pulse) and output voltage 2944 is positive and output voltage 2945 is negative (meaning template signals 2972 and 2976 lead where they should be), then output 2945 should be fed (via 2950) to lock loop filter 2952. If data signal 2932 represents bits "11" (i.e., received signal 2906 is a delayed inverted w-pulse) and output voltage 2944 is negative and output voltage 2945 is positive (meaning template signals 2972 and 2976 lag where they should be), then output signals 2945 should be fed (via 2950) to lock loop filter 2952. In the manner discussed above, output selector 2948 operates to adjust time base 2956 when delayed pulses are received.

In summary, signals 2946 or 2947 (which are related to second correlator 2910) should be used in the lock loop when received signal 2906 consists of non-delayed pulses, because the second correlator 2912 is sampling zero crossings. Similarly, signals 2944 or 2945 (which are related to first correlator 2908) should be used in the lock loop when received signal 2906 consists of delayed pulses, because the first correlator 2910 is sampling zero crossings. Output selector 2948 determines whether template signals 2972 and 2976 are lagging or leading the received signal, based on data signals 2932 and 2933 and signals 2944, 2945, 2946 and 2947, and then uses the appropriate signal 2944, 2945, 2946 or 2947 in the lock loop to correct time base 2956.

Of course, accumulators 2940, 2941, 2942 and 2943 are only necessary if more than one pulse (e.g., 100 pulses) is used to represent each data state (e.g., bits or bits). If each data state (e.g., bit pair) is represented by only one pulse, then output signals 2936, 2937, 2938 ans 2939 are provided directly (i.e., without the need for accumulators 2940, 2941, 2942 and 2943) to output selector 2948.

Lock path signals selector/inverter 2934, accumulators 2939, 2937, 2938 and 2939, and output selector 2948 can be thought of as being components of a time base adjustor 2949 (shown by dotted lines). This time base adjustor can be simplified in a similar manner as time base adjustor 1839 was simplified in the discussion of FIGS. 25 and 26 above.

III.2.B.iv.c. Use of a Subcarrier

Figure 33A:
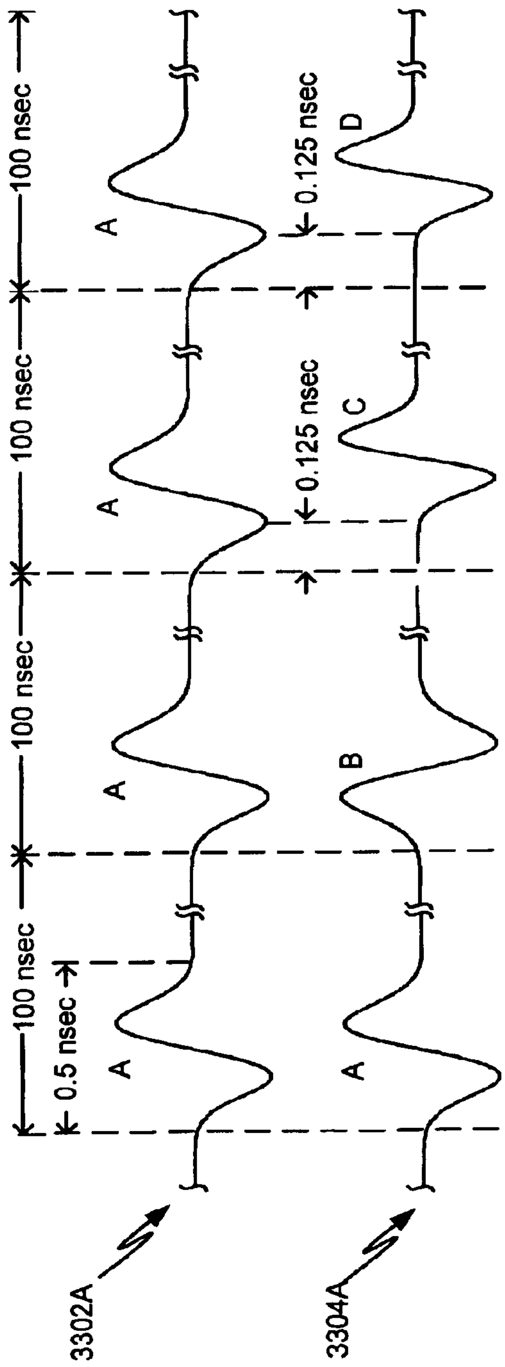
FIG. 33 illustrates signal waveforms that are useful in explaining subcarrier modulation.
Figure 33B:
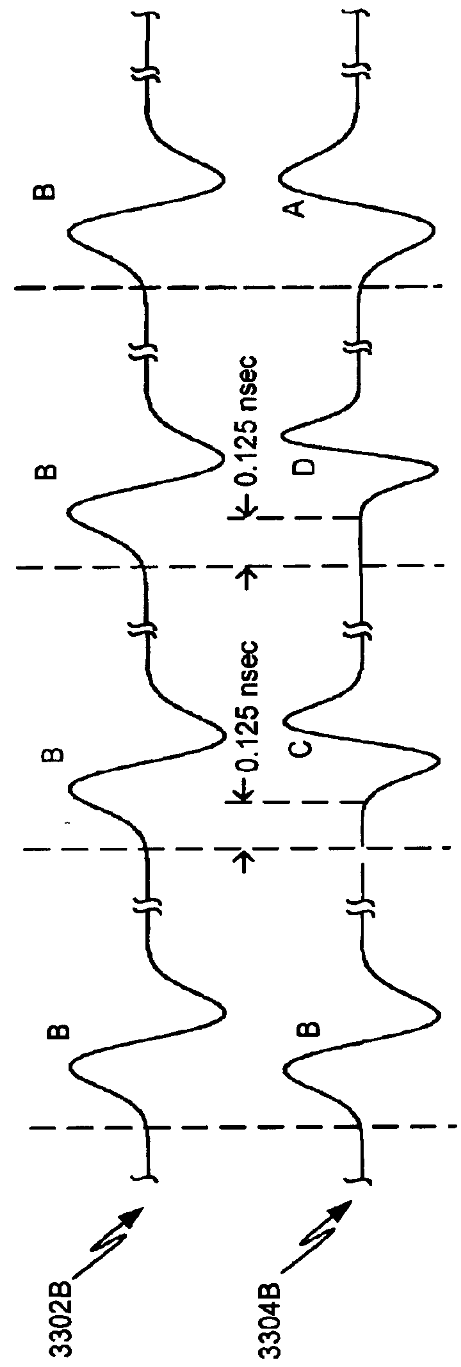

Another example of subcarrier modulation can be illustrated with reference to FIGS. 33A and 33B. Assume four transmit states: state A (impulse 2802), state B (inverted impulse 2804), state C (delayed impulse 2806), and state D (delayed and inverted impulse 2808), associated with data (e.g., bits) "00", "01", "10" and "11", respectively. Also assume that four impulses are transmitted for each data state. As shown in FIG. 33A, without subcarrier modulation (and assuming no coding), a signal 3302A consisting of AAAA (i.e., four impulses 2802) are transmitted to represent data "00". As shown in FIG. 33B, without subcarrier modulation, a signal 3302B consisting of BBBB (i.e., four impulses 2804) are transmitted to represent data "01". Similarly, without subcarrier modulation, a signal (not shown) consisting of CCCC (i.e., four impulses 2806) are transmitted to represent data "10" and a signal (not shown) consisting of DDDD (i.e., four impulses 2808) are transmitted to represent data "11". An example of a subcarrier modulation scheme can be to transmit a signal 3304A consisting of ABCD to represent data "00" (as shown in FIG. 33A), transmit a signal 3304B consisting of BCDA to represent data "01" (as shown in FIG. 33B), transmit a signal consisting of CDAB to represent data "10" (not shown), and transmit a signal consisting of DABC to represent data "11" (not shown). Of course, if for example 100 impulses are used to represent each data state, the patterns discussed above (e.g., ABCD) can be repeated as many times as necessary (e.g., 25 times). Additionally, many other patterns can be used to represent the various data states.

An impulse radio receiver is typically a direct conversion receiver with a cross correlator front end in which the front end coherently converts an electromagnetic pulse train of monocycle pulses to a baseband signal in a single stage. This same pattern is then used to reverse the process and restore the original data pattern just before detection.

In one embodiment of the present invention, it is the data path signal selector/inverter 2916 of impulse radio receiver 2902 that performs any necessary subcarrier demodulation. More specifically, data path signal selector/inverter 2916 provides its outputs 2918, 2919, 2920 and 2921 to the correct accumulators 2922, 2923, 2924 and 2925 so that max value selector 2930 can correctly determine which data state was represented by a train of pulses. Accordingly, the exact structure and function of data path signal selector/inverter 2916 is dependant on the subcarrier modulation pattern that is used by an impulse radio transmitter (e.g., by transmitter 902).

III.2.B.iv.d. Variable Delay

Due to the effect of multipath on the propagation of the transmitted signal, the received signal may have a different shape as a function of the propagation path. This may result in a narrower or wider or asymmetrical pulse shape when compared with the free space pulse shape. In one embodiment of the present invention, the time separation between the two correlators may be adjusted according to a measure of the signal quality. In a preferred embodiment, signal to noise may be measured for several different time offset values and then the time offset value is set to the offset value associated with the best signal to noise evaluation. This may be done periodically, or when signal to noise degrades from the established value. Methods of determining signal to noise may be found in commonly owned U.S. patent application No. 09/332,501, filed Jun. 14, 1999, entitled "System and Method for Impulse Radio Power Control", which is incorporated herein by reference in its entirely.

III.2.B.iv.e Gain Controlled Lock Loop

One issue associated with an impulse radio correlation receiver is that the sensitivity of the correlator derived synchronization error signal for deviations in time offset is a function of signal strength. This causes the control loop closed loop gain to vary as a function of signal strength. Since the dynamics of the control loop are a strong function of the loop gain, it is desirable to stabilize the loop gain with respect to variations in signal strength. This may be accomplished by adding an automatic gain control (AGC) loop, or by measuring the signal strength and dividing the loop gain by the measured signal strength. A preferred location within the control loop to provide this gain stabilization is before the loop filter, especially in the case of an integrating type loop filter. This will preserve loop states in the presence of variations in signal strength.

Further details and examples of lock loops and gain control can be found in commonly owned related U.S. patent application No. 09/538,519, entitled "Vector Modulation System and Method for Wideband Impulse Radio Communications," and U.S. patent application No. 09/538,292, entitled "System and Method for Impulse Radio Acquisition and Lock", both of which have been incorporated by reference above.

IV. Conclusion

In one embodiment of the present invention, what has been referred to as "flip modulation" is used. In "flip modulation" a first data state corresponds to a first impulse signal and a second data state corresponds to an inverse (i.e., flip) of the first impulse signal. In another embodiment, what has been referred to as "flip with shift modulation" or "quadrature flip time modulation" (QFTM) is used. In the QFTM embodiment, two additional data states are created. Of course the teachings of the present invention can be used to develop modulation schemes that include even more data states, while still being within the spirit and scope of the present invention. For example, the teachings of the present can be used to create modulations schemes with six, eight, or more different data states. Accordingly, the intention is for the present invention to encompass such additional modulation schemes and the apparatus, methods, and systems associated with them.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

It is anticipated that many features of the present invention can be performed and/or controlled by a control processor, which in effect comprises a computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCMCIA slot and card, etc. Software and data transferred via the communications interface are in the form of signals that can be electronic, electromagnetic, optical or other signals capable of being received by the communications interface. These signals are provided to the communications interface via a channel that can be implemented using wire or cable, fiber optics, a phone line, a cellular phone link, an RF link, and the like.

In this document, the term "computer program medium" and "computer usable medium" are used to generally refer to media such as removable storage device, a removable memory chip (such as an EPROM, or PROM) within a transceiver, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a transceiver.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

In yet another embodiment, features of the invention can be implemented using a combination of both hardware and software.

The previous description of the preferred embodiments is provided to enable any person skilled in the art to make or use the present invention. While the invention has been particularly shown and described with reference to preferred embodiment thereof, it will be understood by those skilled in the art that various changes in form and details may be made therein without departing from the spirit and scope of the invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An impulse radio transmitter, comprising:

a precision timing generator to receive a periodic timing signal and an information signal and to produce one of a first signal and a second signal based on said information signal and said periodic timing signal;

a first pulser to receive said first signal and to produce, in response to said first signal, a first impulse radio signal consisting of a first type of impulse waveform;

a second pulser to receive said second signal and to produce, in response to said second signal, a second impulse radio signal consisting of a second type of impulse waveform, wherein said second type of impulse waveform is substantially an inverse of said first type of impulse waveform; and a combiner to combine said first impulse radio signal and said second impulse radio signal and thereby produce a flip modulated impulse radio signal.

2. The impulse radio transmitter of claim 1, wherein said precision timing generator produces said first signal and said second signal based on at least said information signal and a code signal, and wherein said first signal comprises a first trigger signal and said second signal comprises a second trigger signal.

3. The impulse radio transmitter of claim 1, wherein said precision timing generator produces said first signal and said second signal based on at least said information signal and a code signal, and wherein said first signal comprises a first enable signal and said second signal comprises a second enable signal.

4. The impulse radio transmitter of claim 3, wherein said precision timing generator also produces a common trigger signal, and said first pulser and said second pulser are adapted to received said common trigger signal.

5. The impulse radio transmitter of claim 4, wherein:

said first pulser produces said first impulse radio signal in response to receiving both said common trigger signal and said first enable signal, and said second pulse produces said second impulse radio signal in response to receiving both said common trigger signal and said second enable signal.

6. The impulse radio transmitter of claim 1, wherein said first impulse waveform consists of a negative impulse and wherein said second impulse waveform consists of a positive impulse.

7. The impulse radio transmitter of claim 1, wherein said first impulse waveform corresponds to a first data state and said second impulse waveform corresponds to a second data state.

8. An impulse radio transmitter, comprising:

a precision timing generator to receive a periodic timing signal and an information signal and to produce, based on said information signal and said periodic signal, a first signal, a delayed first signal, a second signal, and a delayed second signal;

a first pulser to produce a first impulse radio signal, in response to said first signal, and a delayed first impulse radio signal, in response to said delayed first signal, wherein said first impulse radio signal and said delayed first impulse radio signal consist of a first type of impulse waveform;

a second pulser to produce a second impulse radio signal, in response to said second signal, and a delayed second impulse radio signal, in response to said delayed second signal, wherein said second impulse radio signal and said delayed second impulse radio signal consist of a second type of impulse waveform, wherein said second type of impulse waveform is substantially an inverse of said first type of impulse waveform; and a combiner to combine at least one of said first impulse radio signal and said delayed first impulse radio signal with at least one of said second impulse radio signal and said delayed second impulse radio signal, and thereby produce a flip modulated impulse radio signal.

9. The impulse radio transmitter of claim 8, wherein said precision timing generator produces said first signal, said delayed first signal, said second signal and said delayed second signal based on at least said information signal and a code signal, and wherein said first signal comprises a first trigger signal, said delayed first signal comprises a delayed first trigger signal, said second signal comprises a second trigger signal, and said delayed second signal comprises a delayed second trigger signal.

10. The impulse radio transmitter of claim 8, wherein said precision timing generator produces said first signal, said delayed first signal, said second signal and said delayed second signal based on at least said information signal and a code signal, and wherein said first signal comprises a first enable signal, said delayed first signal comprises a delayed first enable signal, said second signal comprises a second enable signal, and said delayed second signal comprises a delayed second enable signal.

11. The impulse radio transmitter of claim 10, wherein said precision timing generator also produces a common trigger signal, and said first pulser and said second pulser are adapted to receive said common trigger signal.

12. The impulse radio transmitter of claim 11, wherein:

said first pulser produces said first impulse radio signal in response to receiving both said common trigger signal and said first enable signal.

said first pulser produces said delayed first impulse radio signal in response to receiving both said common trigger signal and said delayed first enable signal, said second pulser produces said second impulse radio signal in response to receiving both said common trigger signal and said second enable signal, and said second pulser produces said delayed second impulse radio signal in response to receiving both said common trigger signal and said delayed second enable signal.

13. The impulse radio transmitter of claim 8, wherein said first impulse waveform consists of a negative impulse and wherein said second impulse waveform consists of a positive impulse.

14. The impulse radio transmitter of claim 8, wherein said first impulse waveform corresponds to a first data state and a second data state, and said second impulse waveform corresponds to a third data state and a forth data state.

15. A method for transmitting impulse radio signals, comprising the steps of:

a. producing a first signal and a second signal using a periodic timing signal and an information signal;

b. producing, in response to said first signal, a first impulse radio signal consisting of a first type of impulse waveform;

c. producing, in response to said second signal, a second impulse radio signal consisting of a second type of impulse waveform, wherein said second type of impulse waveform is substantially an inverse of said first type of impulse waveform; and d. combining said first impulse radio signal and said second impulse radio signal to thereby produce a flip modulated impulse radio signal.

16. The method according to claim 15, wherein step a. comprises producing said first signal and said second signal using at least said periodic timing signal, said information signal and a code signal, and wherein said first signal comprises a first trigger signal and said second signal comprises a second trigger signal.

17. The method according to claim 16, wherein step a. comprises producing said first signal and said second signal using at least said periodic timing signal, said information signal and a code signal, and wherein said first signal comprises a first enable signal and said second signal comprises a second enable signal.

18. The method according to claim 17, further comprising the step of producing a common trigger signal using at least said periodic timing signal and said information signal, and wherein step b. comprises producing said first impulse radio signal in response to said first enable signal and said common trigger signal, and wherein step c. comprises producing said second impulse radio signal in response to said second enable signal and said common trigger signal.

19. The method according to claim 18, wherein:

said first impulse radio signal is produced in response to reception of both said common trigger signal and said first enable signal, and said second impulse radio signal is produced in response to reception of both said common trigger signal and said second enable signal.

20. The method according to claim 15, wherein said first type of waveform comprises a negative impulse and said second type of waveform comprises a positive impulse.

21. The method according to claim 15, wherein said first type of impulse waveform corresponds to a first data state and said second type of impulse waveform corresponds to a second data state.

22. A method for transmitting impulse radio signals, comprising the steps of:

a. producing a first signal, a delayed first signal, a second signal, and a delayed second signal using periodic timing signal and an information signal;

b. producing, in response to said first signal, a first impulse radio signal consisting of a first type of waveform;

c. producing, in response to said delayed first signal, a delayed first impulse radio signal consisting of said first type of waveform;

d. producing, in response to said second signal, a second impulse radio signal consisting of a second type of waveform, wherein said second type of impulse waveform is substantially an inverse of said first type of impulse waveform;

e. producing, in response to said delayed second signal, a delayed second impulse radio signal consisting of said second type of waveform; and f. combining at least one of said first impulse radio signal and said delayed first impulse radio signal with at least one of said second impulse radio signal and said delayed second impulse radio signal, thereby producing a flip modulated impulse radio signal.

23. The method according to claim 22, wherein step a. comprises producing said first signal, said delayed first signal, said second signal and said delayed second signal based on at least said information signal and a code signal, and wherein said first signal comprises a first trigger signal, said delayed first signal comprises a delayed first trigger signal, said second signal comprises a second trigger signal, and wherein said delayed second signal comprises a delayed second trigger signal.

24. The method according to claim 22, wherein step a. comprises producing said first signal, said delayed first signal, said second signal and said delayed second signal based on at least said information signal and a code signal, and wherein said first signal comprises a first enable signal, said delayed first signal comprises a delayed first enable signal, said second signal comprises a second enable signal, and wherein said delayed second signal comprises a delayed second enable signal.

25. The impulse radio transmitter of claim 24, further comprising the step of producing a common trigger signal using said periodic timing signal and said information signal, and wherein said b. comprises producing said first impulse radio signal in response to said first enable signal and said common trigger signal, wherein step c. comprises producing said delayed first impulse radio signal in response to said delayed first enable signal and said common trigger signal, wherein step d. comprises producing said second impulse radio signal in response to said second enable signal and said common trigger signal, and wherein step e. comprises producing said delayed second impulse radio signal in response to said delayed second enable signal and said common trigger signal.

26. The method according to claim 25, wherein:

said first impulse radio signal is produced in response to reception of both said common trigger signal and said first enable signal, said delayed first impulse radio signal is produce in response to reception of both said common trigger signal and said delayed first enable signal, said second impulse radio signal is produced in response to reception of both said common trigger signal and said second enable signal, and said delayed second impulse radio signal is produce in response to reception of both said common trigger signal and said delayed second enable signal.

27. The method according to claim 22, wherein said first impulse waveform consists of a negative impulse and wherein said second impulse waveform consists of a positive impulse.

28. The method according to claim 22, wherein said first impulse waveform corresponds to a first data state and a second data state, and said second impulse waveform corresponds to a third data state and a forth data state.

29. A method for generating an impulse radio signal, comprising:

triggering at least one first pulser that generates at least one first impulse radio waveform in accordance with one of a plurality of states of an information signal; and triggering at least one second pulser that generates at least one second impulse radio waveform in accordance with another one of the plurality of states of the information signal, wherein the at least one first impulse radio waveform and the at least one second impulse radio waveform are not generated at the same time.

30. The method of claim 29, further comprising:

enabling one of the first pulser and the second pulser prior to the triggering of the at least one first pulser and the at least one second pulser.

31. The method of claim 29, wherein the at least one first pulser and the at least one second pulser are triggered in response to a common signal.

32. The method of claim 31, wherein the common signal comprises a complimentary signal.

33. The method of claim 29, wherein the at least one first pulser and the at least one second pulser comprise a differential circuit.

34. The method of claim 29, wherein one of the plurality of states of the information signal corresponds to a non-inverted impulse radio waveform and another one of the plurality of states of the information signal corresponds to an inverted impulse radio waveform.

35. The method of claim 34, wherein two of the plurality of states of the information signal comprise at least one of:

a first non-inverted impulse radio waveform and a second non-inverted waveform that is delayed relative to the first non-inverted impulse radio waveform by a delay; and a first inverted impulse radio waveform and a second inverted waveform, which is delayed relative to the first inverted impulse radio waveform by a delay.

36. The method of claim 35, wherein the delay comprises a quarter of wavelength.

37. A method for generating an impulse radio signal, comprising:

enabling at least one first pulser that generates at least one first impulse radio waveform in accordance with one of a plurality of states of an information signal; and enabling at least one second pulser that generates at least one second impulse radio waveform in accordance with another one of the plurality of states of the information signal, wherein the at least one first impulse radio waveform and the at least one second impulse radio waveform are not generated at the same time.

38. The method of claim 37, further comprising:

triggering at least one of the at least one first pulser and the at least one second pulser after enabling thereof.

39. The method of claim 38, wherein at least one of the at least one first pulser and the at least one second pulser is triggered in response to a timing signal.

40. The method of claim 39, wherein the timing signal comprises a common timing signal.

41. The method of claim 39, wherein the timing signal comprises a periodic timing signal.

42. The method of claim 37, wherein one of the plurality of states of the information signal corresponds to a non-inverted impulse radio waveform and another one of the plurality of states of the information signal corresponds to an inverted impulse radio waveform.

43. The method of claim 42, wherein at least two of the plurality of states of the information signal corresponds to one of:

a first non-inverted impulse radio waveform and a second non-inverted waveform that is delayed relative to the first non-inverted impulse radio waveform by a delay; and a first inverted impulse radio waveform and a second inverted waveform, which is delayed relative to the first inverted impulse radio waveform by a delay.

44. The method of claim 43, wherein the delay comprises a quarter of wavelength.

45. A method of generating an impulse radio signal, comprising:

timing at least one first trigger signal to trigger at least one first pulser that generates at least one first impulse radio waveform in accordance with one state of an information signal;

timing at least one second trigger signal to trigger at least one second pulser that generates at least one second impulse radio waveform in accordance with another state of the information signal, wherein the at least one first impulse radio waveform and the at least one second impulse radio waveform are not generated at the same time.

46. The method of claim 45, further comprising:

enabling one of the first pulser and the second pulser in accordance with a state of the information signal prior to the triggering of the at least one first pulser and the at least one second pulser.

47. The method of claim 45, wherein the at least one first pulser and the at least one second pulser are triggered in response to a common signal.

48. The method of claim 47, wherein the common signal comprises a complimentary signal.

49. The method of claim 45, wherein the at least one first pulser and the at least one second pulser comprise a differential circuit.

50. The method of claim 45, wherein one of the plurality of states of the information signal corresponds to a non-inverted impulse radio waveform and another one of the plurality of states of the information signal corresponds to an inverted impulse radio waveform.

51. The method of claim 50, wherein two of the plurality of states of the information signal comprise at least one of:

a first non-inverted impulse radio waveform and a second non-inverted waveform that is delayed relative to the first non-inverted impulse radio waveform by a delay; and a first inverted impulse radio waveform and a second inverted waveform, which is delayed relative to the first inverted pulse radio waveform by a delay.

52. The method of claim 51, wherein the delay comprises a quarter of wavelength.

53. An apparatus for generating an impulse radio signal, comprising:

at least one first pulser that generates at least one first impulse radio waveform in accordance with one of a plurality of states of an information signal;

at least one second pulser that generates at least one second impulse radio waveform in accordance with another state of the plurality of states of the information signal;

a first trigger signal generator for triggering the at least one first pulser; and a second trigger signal generator for triggering the at least one second pulser, wherein the at least one first impulse radio waveform and the at least one second impulse radio waveform are not generated at the same time.

54. The apparatus of claim 53, further comprising:

at least one enable signal generator for enabling one of the first pulser and the second pulser prior to the triggering of the at least one first pulser and the at least one second pulser.

55. The apparatus of claim 53, wherein the at least one first pulser and the at least one second pulser are triggered in response to a common signal.

56. The apparatus of claim 55, wherein the common signal comprises a complimentary signal.

57. The apparatus of claim 53, wherein the at least one first pulser and the at least one second pulser comprise a differential circuit.

58. The apparatus of claim 57, wherein the differential circuit comprises at first complimentary input and a second complimentary input, wherein the first complimentary input and second complimentary input are complimentary to each other.

59. The apparatus of claim 53, wherein one of the plurality of states of the information signal corresponds to a non-inverted impulse radio waveform and another one of the plurality of states of the information signal corresponds to an inverted impulse radio waveform.

60. The apparatus of claim 59, wherein two of the plurality of states of the information signal comprise at least one of:

a first non-inverted impulse radio waveform and a second non-inverted waveform that is delayed relative to the first non-inverted impulse radio waveform by a delay; and a first inverted impulse radio waveform and a second inverted waveform that is delayed relative to the first inverted impulse radio waveform by a delay.

61. The apparatus of claim 60, wherein the delay comprises a quarter of wavelength.

62. An apparatus for generating an impulse radio signal, comprising:

at least one first pulser that generates at least one first impulse radio waveform in accordance with one of a plurality of states of an information signal;

at least one second pulser that generates at least one second impulse radio waveform in accordance with another one of the plurality of states of the information signal;

a first enable signal generator that enables the at least one first pulse; and a second enable signal generator that enables the at least one second pulser, wherein the at least one first impulse radio waveform and the at least one second impulse radio waveform are not generated at the same time.

63. The apparatus of claim 62, further comprising:

at least one trigger signal generator that triggers at least one of the at least one first pulser and the at least one second pulser after the enabling thereof.

64. The apparatus of claim 63, wherein the at least one first pulser and the at least one second pulser are triggered in response to a timing signal.

65. The apparatus of claim 64, wherein the timing signal comprises a common timing signal.

66. The apparatus of claim 64, wherein the timing signal comprises a periodic timing signal.

67. The apparatus of claim 62, wherein the at least one first pulser and the at least one second pulser comprise a differential circuit.

68. The apparatus of claim 67, wherein the differential circuit comprises a first complimentary input and a second complimentary input, wherein the first complimentary input and second complimentary input are complimentary to each other.

69. The apparatus of claim 62, wherein one of the plurality of states of the information signal corresponds to a non-inverted impulse radio waveform and another one of the plurality of states of the information signal corresponds to an inverted impulse radio waveform.

70. The apparatus of claim 69, wherein at least two of the plurality of states of the information signal corresponds to one of:

a first non-inverted impulse radio waveform and a second non-inverted waveform, which is delayed relative to the first non-inverted impulse radio waveform by a delay; and a first inverted impulse radio waveform and a second inverted waveform, which is delayed relative to the first inverted impulse radio waveform by a delay.

71. The apparatus of claim 70, wherein the delay comprises a quarter of wavelength.

72. An apparatus for generating an impulse radio signal, comprising:

at least one first pulser that generates at least one first impulse radio waveform in accordance with one state of an information signal;

at least one second pulser that generates at least one second impulse radio waveform in accordance with another state of the information signal;

a first timing circuit for timing at least one first trigger signal to trigger the at least one first pulser; and a second timing circuit for timing at least one second trigger signal to trigger the at least one second pulser, wherein the at least one first impulse radio waveform and the at least one second impulse radio waveform are not generated at the same time.

73. The apparatus of claim 72, further comprising:

at least one enable signal generator that enables one of the first pulser and the second pulser in accordance with a state of the information signal prior to the triggering of the at least one first pulser and the at least one second pulser.

74. The apparatus of claim 72, wherein the at least one first pulser and the at least one second pulser are triggered in response to a common signal.

75. The apparatus of claim 74, wherein the common signal comprises a complimentary signal.

76. The apparatus of claim 75, wherein the different circuit comprises a first complimentary input and a second complimentary input, wherein the first complimentary input and second complimentary input are complimentary to each other.

77. The apparatus of claim 72, wherein one of the plurality of states of the information signal corresponds to a non-inverted impulse radio waveform and another one of the plurality of states of the information signal corresponds to an inverted impulse radio waveform.

78. The apparatus of claim 77, wherein two of the plurality of states of the information signal comprise at least one of:

a first non-inverted impulse radio waveform and a second non-inverted waveform that is delayed relative to the first non-inverted impulse radio waveform by a delay; and a first inverted impulse radio waveform and a second inverted waveform, which is delayed relative to the first inverted impulse radio waveform by a delay.

79. The apparatus of claim 78, wherein the delay comprises a quarter of wavelength.

80. The apparatus of claim 72, wherein the at least one first pulser and the at least one second pulser comprise a differential circuit.

* * * * *